United States Patent [19]
Krist et al.

[11] Patent Number: 6,038,540
[45] Date of Patent: Mar. 14, 2000

[54] SYSTEM FOR REAL-TIME ECONOMIC OPTIMIZING OF MANUFACTURING PROCESS CONTROL

[75] Inventors: Johannes H. A. Krist, Terneuzen, Netherlands; Martine R. Lapère, Knokke-Heist, Belgium; Steven Groot Wassink, Axel, Netherlands; Johannes L. A. Koolen; Jacobus C. M. Sprenkels, both of Terneuzen, Netherlands

[73] Assignee: The Dow Chemical Company, Midland, Mich.

[21] Appl. No.: 08/963,882

[22] Filed: Nov. 4, 1997

Related U.S. Application Data

[63] Continuation of application No. 08/399,288, Mar. 6, 1995, abandoned, which is a continuation-in-part of application No. 08/210,191, Mar. 17, 1994, Pat. No. 5,486,995.

[51] Int. Cl.[7] .......................... G06F 17/18; G05B 13/04
[52] U.S. Cl. ................................................ 705/8; 364/156
[58] Field of Search ................ 705/8, 9, 11; 364/148.01, 364/151, 152, 154, 156, 161–163

[56] References Cited

U.S. PATENT DOCUMENTS

| | | | |
|---|---|---|---|
| 4,547,858 | 10/1985 | Horak ...................................... | 364/513 |
| 4,723,214 | 2/1988 | Frei .......................................... | 364/434 |
| 4,809,154 | 2/1989 | Newton ................................... | 364/148 |
| 4,812,990 | 3/1989 | Adams et al. ........................... | 364/440 |
| 5,033,004 | 7/1991 | Vandivier, III ......................... | 364/468 |
| 5,396,416 | 3/1995 | Berkowitz et al. ..................... | 364/165 |

FOREIGN PATENT DOCUMENTS

| | | |
|---|---|---|
| 0236587 | 9/1987 | European Pat. Off. . |
| 0462815 | 12/1991 | European Pat. Off. . |
| 0520620 | 12/1992 | European Pat. Off. . |
| 9325953 | 12/1993 | WIPO . |

OTHER PUBLICATIONS

J.H.A. Krist et al., "Generic Systems for On–line Optimization & the Implementation in a Benzene Plant", European Symposium on Computer Aided Process Engineering, vol. 3, Jul. 5, 1993–Jul. 7, 1993 GRAZ AT, pp. s517–s524.

Patrap Naie, "Benefits from Unified Mirror–like Modeling in a Computer Integrated Processing", Advances in Instrumentation and Control, vol. 48, No.2, 1993 Research Triangle Park US, pp. 1367–1377.

G.B. Sheble, "Real–Time Economic Dispatch and Reserve Allocation Using Merit Order Loading and Linear Programming Rules", IEEE Transactions on Power Systems, vol. 4, No. 4, Nov. 1, 1989, pp. 1414–1420.

JP–57 197606 (Tokyo Shibaura KK) Dec. 3, 1982, Patent Abstracts of Japan vol. 7, No. 51 (p–179) Feb. 26, 1983.

K. Schittkowski, The Nonlinear Programming Method of Wilson, Han, and Powell with an Augmented Lagrangian Type Line Search Function, Part 2—AnEfficient Implementation with Linear Least Squares Subproblems, Numerical Mathematics 38 (1986) pp. 115–127.

S. Macchierto et al., "Application of an Improved SQP Method to the Optimization of Process Flowsheets," AICHE Annual Meeting, New York (1988).

(List continued on next page.)

*Primary Examiner*—Frantzy Poinvil
*Attorney, Agent, or Firm*—Dale H. Schultz

[57] ABSTRACT

The present invention provides an adaptive process control and profit depiction system which is responsive to both process measurement input signals, economic inputs, and physical environment inputs. The process control system features an interactive optimization modeling system for determining manipulated process variables (also known as setpoints). These manipulated process variables are used to position mechanisms which control attributes of a manufacturing system, such as a valve controlling the temperature of a coolant or a valve controlling the flow rate in a steam line.

18 Claims, 30 Drawing Sheets

OTHER PUBLICATIONS

R. Fletcher et al., "A Rapidly Convergent Descent Method for Minimization," Computer Journal 6 pp. 163–168, 1963.

J. B. Rosen, "The Gradient Projection Method for Non–linear Programming, Part–I; Linear Constraints." Journal of the Society of Industrial & Applied Mathematics, vol. 8, No. 1, Mar. 1960, pp. 181–217.

J. B. Rosen, "The Gradient Projection Method for Nonlinear Programming, Part–II; Nonlinear Constraints," Jpurnal of the Society of Industrial & Applied Mathematics, vol. 9, Dec. 1961, pp. 514–532.

M. Powell, "An Efficient Method for Finding the Minimum of a Function of Several Variables Without Calculating Derivatives," Computer Journal, vol. 7, pp. 155–162, 1964, George Danzig, "Linear Programming and Extensions," SIMPLES, Rand Corp. & Univ. of California, Berkeley, 1963.

P. McCrosky et al., "Integration of Model Development and Advanced Process Control," COPE–91, Oct. 1991, pp. 293–298.

Emile A. J. Ch. Baak et al., "Heat Balance Reconciliation in Chemical Processes," Identification, Modelling and Control, vol. 5, Delft University Press, Dec. 1992, pp. 53–61.

D. N. Kelly et al., "Implementation of a Closed Load Real–Time Optimzation System on a Large Scale Ethylene Plant." (1991).

Dr. IR. R. A. Van Wijk et al., "Advanced Process Control and On–Line Optimisation in Shell Refineries."(1992).

Pratap K. Nair et al., "On–Line Reconciliation of Steady State Process Plants," ChemShare Corporation.

Natori, Y. et al, "Application of Data Reconciliation and Simulation to a Large Chemical Plant", Large Chemical Plants 8th International Symposium, Proceedings, Antwerp, Belgium, Oct. 1992.

Tjoa, J.B., et al. "Simultaneous Strategies for Data Reconciliation and Gross Error Detection of Nonlinear Systems", Computers chem. Eng., vol. 15, No. 10, pp. 679–690, 1991.

Romagnoli, J.A., "On Data–Reconciliation: Constraints Processing and Treatment of Bias", Chem. Eng. Science, vol. 38, No. 7, pp. 1107–1117, 1983.

Walter, Hilger et al., International Application No. 93/11303, "Transmitter Freeze/Fault Detection." Filed on Nov. 19, 1993.

Walter, Hilger et al., International Application No. 94/00284, "Method for Adjusting an Adaptive Exponential Filter and Adaptive Exponential Filter," Filed Jan. 4, 1994.

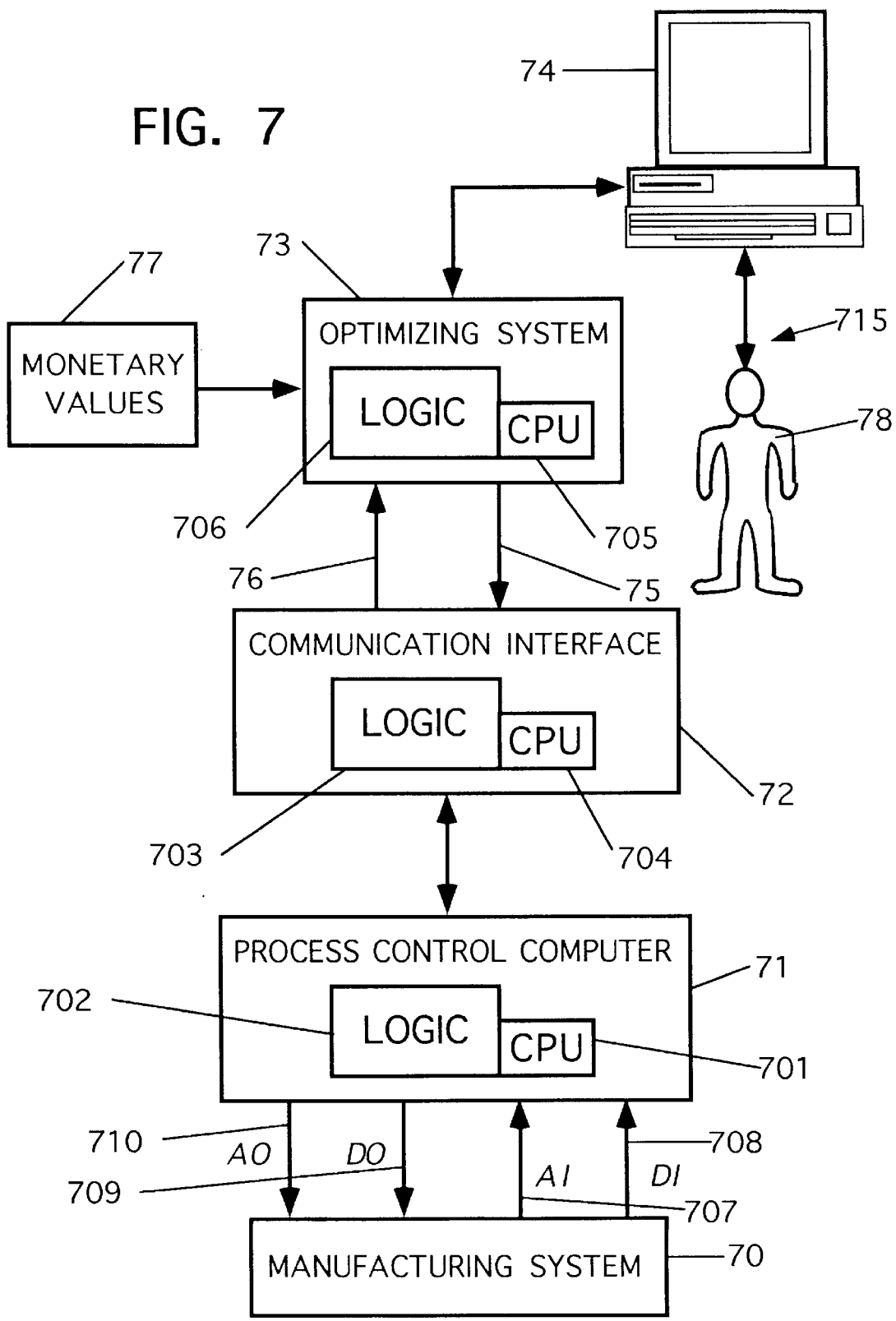

DIAGNOSTICS:

| INTERVAL: | PROFIT CHANGED, DUE TO: |
|---|---|
| 07:00 - 8:00 | FEED RATE (80 → 85MT/HR) |
| 08:00 - 9:00 | FEED PRODUCT PRICE (300 → 350$/MT) |
| 09:00 - 10:00 | STEAM UNIT - RATIO (1.2 → 1.3) |
| 10:00 - 10:30 | PRODUCT OFF-SPEC (RECYCLE TO FEED TANK) |

SYSTEM FOR REAL-TIME ECONOMIC OPTIMIZING OF MANUFACTURING PROCESS CONTROL

CROSS-REFERENCE TO RELATED APPLICATION

This is a continuation of application Ser. No. 08/399,288 filed Mar. 6, 1995, now abandoned and which is a continuation in part of Ser. No. 08/210,191 now U.S. Pat. No. 5,486,995 filed Mar. 17, 1994.

FIELD OF THE INVENTION

This invention relates to process control methodologies; the invention relates particularly to a process control system which implements real-time economic optimization of a manufacturing system (an apparatus facilitating the implementation of a useful process such as the manufacture of chemicals) through an adaptive optimizing controller which responds to the status of the manufacturing system and to the monetary value of relevant economic variables.

BACKGROUND OF THE INVENTION

Maximization of economic efficiency, the safe operation of facilities, minimization of negative environmental impact, and consistent control of product quality have all inspired an ongoing increase in the comprehensive deployment of increasingly sophisticated automated process control technology. Within the last 30 years, the technology has migrated from pneumatic control loop devices and electromechanical timer activated valve and motor switching to direct digital control by real-time computers. Initially, the methods deployed by computer controlled systems duplicated the traditional proportional (P), proportional-integral (PI), and proportional-integral-derivative (PID) controllers along with the use of valve and motor switching control enhanced by some straightforward boolean logic. Continuing exploitation of the computer environment further enhanced process control methodology to include adaptive controllers and systems with sophisticated capability for anticipating future manufacturing process states in order to define optimal control settings. An example of such an approach is described in "Integration of Model Development and Advanced Process Control", COPE-91, Oct., 1991, by Drs. McCroskey and Wassick. This article is hereby incorporated by reference.

Process control methods, in general, seek to enable stable, efficient, predictable, and robust control of manufacturing systems in a dynamic context. This control characterization is generally considered to be more "optimal" in an economic sense than a manufacturing system that is unstable, inefficient, and "out of control". A reference to such a process control methodology indirectly utilizing one of the more sophisticated optimization methods is U.S. Pat. No. 4,723,214 to Frei which utilizes wind tunnel data to determine a technologically optimal relationship of the control surfaces and components in an aircraft using a Lagrange Optimization Program—the results of the optimizing study are input as a reference table in the process control machine. However, the patent to Frei does not describe functionality related to decision making using an objective function referencing changing monetary economic values related to components used in the system as part of the input data. The cost of operating the aircraft is assumed to be minimized if the aircraft is optimized without regard to fluctuations in the price of fuel or maintenance since the goal of optimization implicitly seems to relate to technical system stability, controllability, dynamic robustness, speed, and efficiency. Furthermore, the invention according to Frei does not periodically attempt to reconcile the set of inputs used to derive the appropriate flight control settings.

The focus of process control development has traditionally been directed to the technical dynamic and configurational needs of the machine being operated, the focus very naturally growing out of the migration of the methodology from its pneumatic control beginnings. Process control methods, however, have not traditionally attempted to incorporate real-time shifts in the monetary value of resources being used in conjunction with the system. The price/cost of oil, of jet fuel, of working capital, of electrical power, and of the items being used and manufactured by the system have been usually examined at times related to general business accountability by the personnel of the business operating the system. Some general adjustments to the rate of machine operation might be made at those times to reflect changing economic conditions as the business operation was evaluated as a whole. In terms of real-time execution, however, the constantly changing real-time economic conditions in the environment of the system being operated have not been extensively utilized as real-time system control input data even though they have always virtually impacted the efficient use of the machine in the more rigorous real-time sense. The effective cost of working capital actually does vary with each transaction performed within the world's monetary system, and the cost of electricity varies with the particular time of the day, week, or month, and also with each transaction performed within the global oil and gas industry. The cost of manpower can also shift as a function of the particular time of the day during which operation of the system is occurring since different hours of the day frequently carry different contractual compensation considerations.

The sophisticated growth of electronic communication today enables the values of a number of fluctuating economic variables to be monitored on an immediate and real-time basis, and modern computers can easily provide real-time interpretation of complex entities such as electric utility contracts. This enables real-time data from the economy as a whole to be acquired by the control computer system even as it also acquires real-time sensor data from the technical system. The use of the subsequently combined set of real-time economic and technical data in the operation of a system enables the implementation of economic operation to acquire an additional dimension of sophistication over the traditional method of focus on technical system data.

What is needed, therefore, for comprehensive economic optimization of a manufacturing system is an adaptive controller which can change the operation of the process to reflect both the real-time movement of prices (monetary values) in the market place for components used in the manufacture as well as the real-time technical status of the manufacturing system. The present invention implements a solution to this need.

OBJECT OF THE INVENTION

It is a principal objective of the present invention to provide a system and method designed to operate a manufacturing system in an economically optimal manner by providing a facility that considers the real-time monetary value of different components used in the manufacturing operation and provides adaptive control functionality sensitive to both the economic variables and the data from the process sensors for periodically defining the control setpoints to economically operate the manufacturing system with minimal need for human involvement.

Another object of the present invention is to provide a method and means for enabling a traditionally (classically) configured and operating process control system to add the capability of real-time economic optimization functionality in such a manner that it is readily deployed with minimal disruption to the ongoing operation of the manufacturing system.

Another object of the present invention is to provide a method and means for early warning of potential errors in the instrumentation used to measure attributes of the associated manufacturing system.

Another object of the present invention is to provide a method and means to evaluate a status of agreement regarding interactive components in a manufacturing system.

Another object of the invention is to provide a method and means of estimating a balanced and reconciled set of parameters or an estimate of parameters based upon a balanced and reconciled set of input measurements for use by operation and engineering personnel in the operation of a manufacturing system.

A further object of the invention is to provide a method and means to define a real time comparison of the real-time profit being achieved by a manufacturing system and the real-time profit that could be theoretically achieved given the general status and condition of the process and the state of economic data associated with the various raw materials, products, resources, working capital, finished inventory capital, and the like which relate to the manufacturing system.

It is a further objective of the present invention to provide an adaptive process control system and method which integrates an economic model with other process models in real-time.

It is a further object of the invention to provide a display system for producing a graphical display of the variable manufacturing margin for the system of said physical process equipment in a context which enables an accommodation of both recency and rigor in the characterization of the data used to determine the margin. In this regard, the invention provides "profit meter" functionality in the operation of a manufacturing system.

It is a further object of the invention to the present invention to provide diagnostic functionality directed toward identification of issues related to significant changes in the operational variable manufacturing margin of a manufacturing process.

It is a further object of the invention to provide a system for evaluating simulation models which are useful in the characterization of a manufacturing system.

It is a further object of the invention to provide a system which can enable optimization with respect to both real-time movement of prices and the expected and real-time attributes of the actual and forecast weather conditions affecting the overall environment of a manufacturing system.

SUMMARY OF THE INVENTION

To achieve the foregoing objectives, the present invention provides an adaptive process control system which is responsive to both process measurement input signals and economic environment input signals. In this regard, the adaptive control system of the present invention may also be characterized as a real-time economic adaptive multivariable controller. The process control system features an interactive optimization modeling system for periodically determining one or more manipulated process variables (also known as setpoints). These manipulated process variables are used to position directly controllable process parameters and attributes of a manufacturing system, such as a valve controlling the temperature of a coolant or a valve controlling the flow rate in a steam line.

The interactive optimization modeling system comprises a plurality of mathematically-based models of the physical process and optimizing engines which are integrated by interactive communication paths to converge upon and determine an optimized set of values for the manipulated process variables.

In one form of the present invention, Lagrangian multipliers are used by the optimizing modeling system to facilitate the solution of the optimization models and establish a direct relationship between the current economic conditions and the status of the manufacturing system as a technical entity.

The application of the present invention is for a manufacturing system controlled by a process control computer system (a computer apparatus facilitating the implementation of at least one useful logical process) which is further connected to an additional optimization computer system. Alternatively, the process control computer system can have an integrated optimization capability. The present invention utilizes at least one model to characterize the manufacturing system. The components of the present invention reference the model, process variables acquired from the process control computer system, historical process variables, and at least one real-time monetary value related to a relevant economic variable. Each of the process variables has either a numeric or boolean value. The process variables characterize some of the attributes of the manufacturing system in real-time. In archived form, any process variable can also be stored over a period of time and reacquired to establish a historical context for the process variable. The components of the present invention generate at least one setpoint for input to the process control computer from the model, the process variables, the historical process variables, and the relevant economic variables. Alternatively, the components of the present invention generate at least one setpoint for communication to human operators who then can input the value of each setpoint into the process control computer. The setpoint is referenced by the process control computer system to operate the manufacturing system in a economically optimal manner. Alternatively, a set (or group) of setpoints is referenced by the process control computer system to operate the manufacturing system in a economically optimal manner.

To achieve the forgoing, the invention can be characterized as follows: in a process control system having first input means, for receiving input signals indicative of measured process attributes in physical process equipment, and output means, for transmitting command signals which include at least one manipulated parameter variable that is used to govern the physical process equipment, an adaptive controller comprising:

second input means for acquiring the monetary value of at least one fluctuating economic variable;

interactive optimization means for determining the value of at least one manipulated parameter variable for said physical process equipment at selected intervals, said interactive optimization means having at least an input signal reconciliation model, for deriving a reconciled input signal set from the input signals (using physical and chemical conservation laws to define equalities respecting the input signals), and an optimizing engine means, for converging upon an optimized value for said manipulated parameter variable in response to the reconciled input signal set and the monetary value of at least one fluctuating economic variable; and real-time executive means for directing the operation of said interactive optimization means, said real-time executive means having means for periodically transferring at least some of said input signals from said inputs means to said interactive optimization means and means for transferring at least one manipulated parameter variable from said interactive optimization means to said output means.

In more detailed form, the interactive optimization means further comprises:

first logic to define steady state status regarding said input signals, second logic, responsive to the steady state status, to generate a reconciled input signal set from said input signals;

third logic, responsive to the reconciled input signal set, to determine estimated process parameters, fourth logic, responsive to estimated process parameters and the monetary value of at least one fluctuating economic variable, to define at least one economic setpoint; and fifth logic, responsive to the at least one defined economic setpoint, to test each said economic setpoint and designate at least one manipulated parameter variable.

In achieving its functionality, the invention can also be characterized as follows: in a process control system receiving input signals, indicative of measured process attributes in physical process equipment, and transmitting command signals, which include at least one manipulated parameter variable that is used to govern the physical process equipment, an adaptive control method comprising:

acquiring the monetary value of at least one fluctuating economic variable;

determining in real-time the value of at least one manipulated parameter for said physical process equipment at selected intervals, said determining of the value of at least one manipulated parameter variable further comprising reconciling the input signals to derive a reconciled input signal set from the input signals, and converging upon an optimized value for said manipulated parameter variable in response to the reconciled input signal set.

In more detailed form, the step of determining in real-time the value of at least one manipulated parameter variable further comprises:

ascertaining the steady state status regarding said input signals, reconciling the input signals to derive a reconciled input signal set from the input signals in response to the steady state status, estimating process parameters from the reconciled input signal set, defining at least one economic setpoint from the estimated process parameters; and testing each economic setpoint to designate at least one manipulated parameter variable.

As an adaptive controller facilitating interaction of a manufacturing system with its economic climate and the "climate" associated with the weather at the location of the manufacturing system, the invention is characterized as a process control system having a mechanism and method for receiving input signals indicative of measured process attributes in physical process equipment, and an output system, for transmitting command signals which include at least one manipulated parameter variable that is used to govern the physical process equipment which provides:

a mechanism and method for acquiring the monetary value of at least one fluctuating economic variable;

a mechanism and method for acquiring the status of at least one fluctuating meteorological variable;

an interactive optimizer for determining the value of at least one of the manipulated parameter variables at selected intervals, which has at least an input signal reconciliation model, for deriving a reconciled input signal set from the input signals, and an optimizing engine for converging upon an optimized value for the manipulated parameter in response to the reconciled input signal set, the monetary value of the at least one fluctuating economic variable, and the status of the at least one fluctuating meteorological variable; and a real time executive subsystem for directing the operation of the optimization mechanism and method, which periodically transfers at least some of the input signals from the input mechanism and method to the interactive optimizer for transferring at least one manipulated parameter variable from the interactive optimizer to the output system.

The logic of the interactive optimizer has a number of logical subsections: steady state status logic regarding the input signals; logic responsive to the steady state status, to generate a reconciled input signal set from the input signals; logic, responsive to the reconciled input signal set and the status of the at least one fluctuating meteorological variable, to estimate a plurality of process parameters; logic, responsive to the plurality of process parameters and to the monetary value of the at least one fluctuating economic variable, to define at least one economic setpoint; and, finally, logic, responsive to the at least one defined economic setpoint, to test each economic setpoint and designate the at least one manipulated parameter variable.

As a profit meter facilitating interaction of a manufacturing system with its economic climate, the invention provides a mechanism and method for receiving input signals indicative of measured process attributes in physical process equipment, a computer monitor, and a real-time computer implemented display system for producing a graphical display of the variable manufacturing margin for the system of the physical process equipment further comprising:

an input mechanism and method for acquiring the monetary value of at least one fluctuating economic variable;

an interactive profit estimation mechanism and method for determining first, second, and third estimates of the variable manufacturing margin; and a display mechanism and method for generating and displaying, on the computer monitor, graphical information tokens correspondent to the estimates of variable manufacturing margin.

The profit meter functionality further has a number of logical subsections: logic for defining the steady state status regarding the input signals; logic, responsive to the steady state status, to generate a reconciled input signal set from the input signals; logic for determining the first estimate of the variable manufacturing margin from the reconciled input signal set and the value of at least one of the fluctuating economic variables; logic for determining the second estimate of the variable manufacturing margin from the input signals and the value of at least one of the fluctuating economic variables; logic for executing a smoothing process on the input signals to determine a smoothed input signal set; and, finally, logic for determining the third estimate of the variable manufacturing margin from the smoothed input signal set and the value of the at least one fluctuating economic variable.

As a simulation model evaluation system respecting a manufacturing system, the invention provides an input mechanism and method for receiving input signals indicative of measured process attributes in physical process equipment, a simulation model for estimating attributes of the physical process equipment, and a computer implemented display system for producing a display of a model validity statistical indicator respecting the simulation model. In achieving this functionality, the evaluation system also provides a simulation model status estimation mechanism and method for determining the model validity statistical indicator; and it provides an output display mechanism and method for generating and displaying information about the model validity statistical indicator. In doing this, the simulation model status estimation mechanism and method functionality further has a number of logical subsections: logic to separate the input signals into simulation model input signals and at least one measured attribute value; logic for defining the steady state status regarding the simulation model input signals; logic, responsive to the steady state status, to generate a reconciled input signal set from the simulation model input signals; logic, responsive to the reconciled input signal set and the simulation model, to estimate at least one simulated attribute value which is in logically identified correspondence to a measured attribute value; logic to retain at least one simulated attribute value and at least one logically identified correspondent measured attribute value as a model status data pair; logic to collect a plurality of the model status data pairs at selected intervals to form a set of comparative data; and logic to derive the model validity statistical indicator from the set of comparative data.

Additional features and advantages of the present invention will become more fully apparent from a reading of the detailed description of the preferred embodiment and the accompanying drawings in which:

BRIEF DESCRIPTION OF THE DRAWINGS

FIG. 7 depicts the relationship of the present invention to a general manufacturing system.

Figure 1:
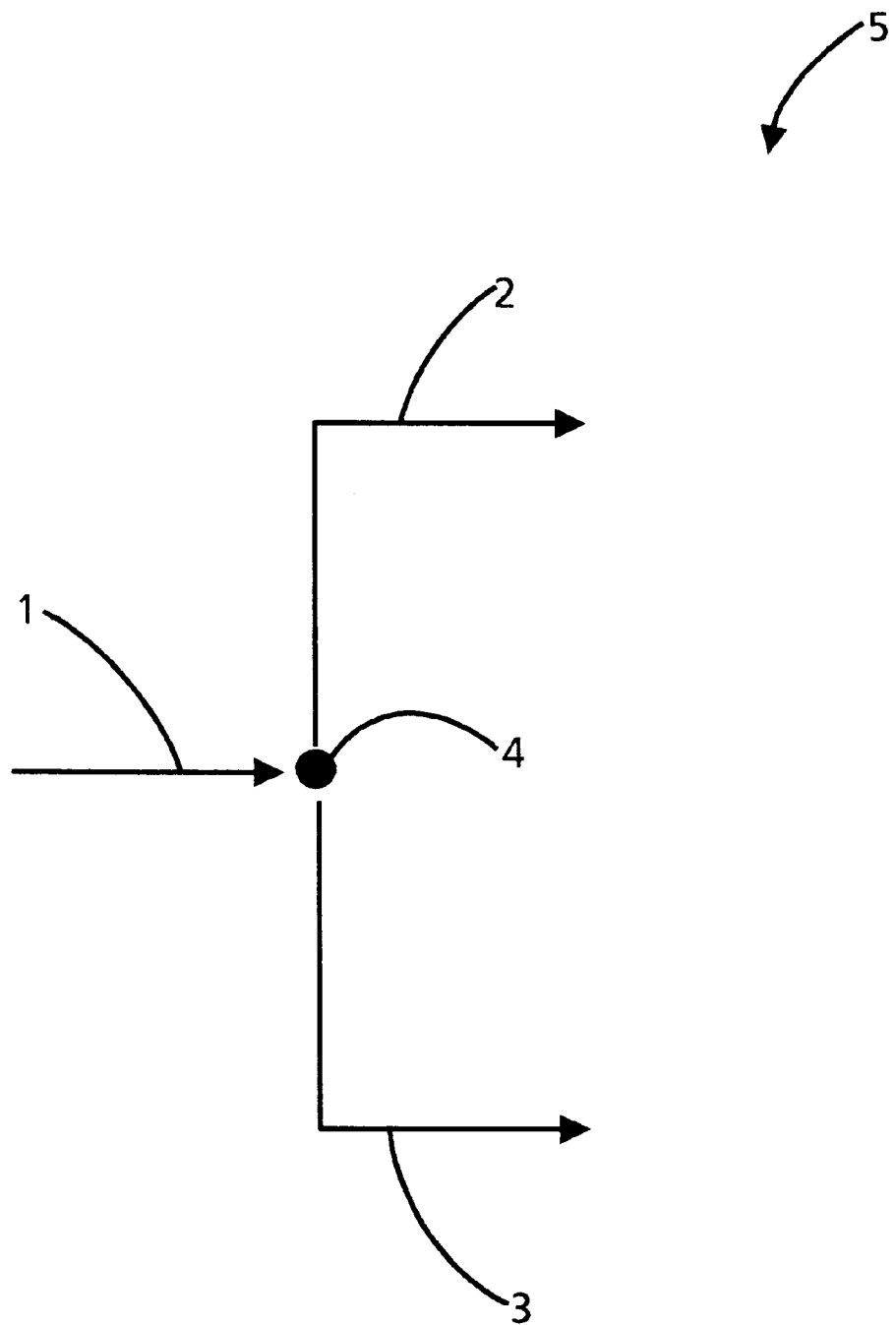
FIG. 1 is a diagram depicting an idealized separation of one stream into two derived streams.

As a general note to the Figures, the first digit of a two or three digit numerical element reference usually indicates the Figure number where the element is first introduced, and the first two digits of a four digit numerical element reference number indicates the Figure number where the element is first introduced.

DETAILED DISCUSSION OF THE INVENTION

Mathematical Basis and Orientation

The Field of Optimization can be characterized as relating to a situation where an Objective Function, expressed as a mathematical equation regarding defined variables, is solved with respect to a group of Constraints. The Constraints are mathematically expressed as either equations defining relationships between the defined variables or as limitations in the degrees of freedom (or range of acceptable variability) for any of the defined variables themselves. Optimization is an area of knowledge where various methods have evolved to solve the overall formulated problems. Examples of these solution methods (without limitation to the scope of the invention) are:

SQP (Sequential Quadratic Programming) as described in "The Nonlinear Programming Method of Wilson, Han, and Powell with an Augmented LaGrangian Type Line Search Function, Part 2—An efficient implementation with linear least squares subproblems", K. Schittkowski, Numerical Mathematics 38 (1986) pages 115–127 which is hereby incorporated herein for purposes of reference;

SRQP (Sequential Reduced Quadratic Programming) as described in "Application of an improved SQP method to the optimization of process flowsheets", AIChe, New York (1988) by S. Machietto and C. L. Chen, which is hereby incorporated herein for purposes of reference;

Feasible Path Method as described by R. Fletcher and M. Powell in "A rapidly convergent descent method for minimization", Computer Journal 6 (1963) pages 163–168 which is hereby incorporated herein for purposes of reference;

Conjugated gradient method as described by J. B. Rosen in "The gradient projection method for non-linear programming, part-1: Linear constraints", Industrial & Applied Mathematics 8 (1960) pages 181–217; and "The gradient projection method for non-linear programming, part-2: Non-linear constraints", Industrial & Applied Mathematics 9 (1961) pages 514–532; which are hereby incorporated herein for purposes of reference; and The direct search method as described by M. Powell in "An efficient method for finding the minimum of a function of several variables without calculating derivatives", Computer Journal 7 (1964) pages 155–162 which is hereby incorporated herein for purposes of reference.

Another solution method example is the SIMPLEX method developed by George Dantzig in 1947.

The referenced optimization solution methods can be expressed as computer programmed solutions. Commercial products such as SPEEDUP (by Aspentech Corporation of Cambridge, Mass.) or ASPENPLUS (also by Aspentech) are also available to execute some of the above optimization solution methods to problems expressed in a manner similar to the manner illustrated in the Field of Optimization example previously discussed.

Related to the characterization of an Objective Function $u(x)$ and its associated Constraints $\Phi_1(x)$ in a consideration and solution of an optimization involving variables $x_1$ to $x_n$ is the matrix of first derivatives known as the Jacobian matrix.

The description of the method used in the present invention also references one of the generic techniques used to solve formulated problems in optimization. This technique is known as the solution of a Lagrangian Expansion or the Method of Lagrangian Multipliers. The Method of Lagrangian Multipliers uses the theoretical basis of the calculus of variations. The first work on this subject was done by Isaac Newton, but the founders of the calculus of variations as a branch of mathematics were Lagrange (1736–1813) and Euler (1707–1783). In a formalized context, the goal of the Method of Lagrangian Multipliers is to locate an extreme of a function $u=f(x_1,x_2,\ldots,x_n)$ where a number of other m<n Constraints $\Phi(x_1,x_2,\ldots,x_n)=0$; $\Phi_2=0; \ldots \Phi m=0$ are also given. Using m constants, $\lambda_i$, where i=1 to m, called "Lagrangian Multipliers", one can construct the equation $\zeta=u(x)+\lambda_1\Phi_1+\lambda_2\Phi_2+\ldots \lambda_m\Phi_m$. If the n+m derivatives are forced to vanish (or $\delta\zeta/\delta x_1=0$; $\delta\zeta/\delta x_2=0;\ldots ; \delta\zeta/\delta x_n=0$; $\delta\zeta/\delta x_1=0$; $\delta\zeta/\delta \lambda_2=0; \ldots \delta\zeta/\delta\lambda_m=0$), it is possible to determine the m+n variables so that an extreemal or stationary value of u results.

The use of Lagrangian Multipliers requires that the Constraints be expressed as equality relationships. In a formal context: If $u(x)$ has a constrained extreemum at $x_1$ such that $\Phi_j(x)=0,(j=1,2,\ldots, m)$ and $u(x)$ and $\Phi_j(x)$ are differentiable at x, then the gradients $u(x)$, $\Phi_j(x)$, $(j=1,2,\ldots, m)$ are linearly dependent and:

Equation 1

$$\frac{\partial \mathcal{L}}{\partial x} = \overline{\gamma}u(x) + \sum_{j=1}^{m} \lambda_j \overline{\gamma}\phi_j(x) = 0$$

and
Equation 2

$$\frac{\partial \mathcal{L}}{\partial \lambda_j} = 0 \text{ where } j = 1 \text{ to } m$$

Note that the above situation has m Lagrangian multipliers $\lambda_j$ for j=1 to m (one for each Constraint $\Phi_j$) and n independent variables $x_i$ for i=1 to n. Since there are m+n equations and m+n variables, a specific solution of the problem can be achieved wherein a value for each of the variables $x_i$ for i=1 to n and $\lambda_j$ for j=1 to m can be specified.

Additionally, when the first derivative of the Lagrangian Expression is set to zero, the location of maxima, minima, and saddles should result unless the extreema of the primary equations exist at a boundary condition. The determinant of the second derivative matrix then can be used to determine if a saddle or maximal extreema has been located (from a resultant which is equal to 0 or not equal to 0, respectively); the solutions of interest are those with a determinant of the second derivative matrix having a resultant greater than 0.

As previously noted, in practical applications, determination of Lagrangian Multipliers is achieved through the use of computers executing Successive Quadratic Programming techniques (SQP) or, more specifically in the present invention, Sequential Reduced Quadratic Programming techniques (SRQP).

The use of the Method of Lagrangian Multipliers with respect to the present invention will be further discussed in the detailed discussion of the invention.

The Concept of Steady State operation of a system

The solution method of the present invention also includes a general reference to the concept of "steady state operation". "Steady state operation" is essentially a situation where (1) a process is dynamically regular and uniform in its operation over a time interval, (2) momentum, mass, and energy entities flowing into the process are essentially equal to the momentum, mass, and energy entities flowing out of the process, and (3) accumulations of momentum, mass, and energy within the process are essentially not occurring unless they are explicitly expected and factored into the relevant dynamic model. Solutions of the mathematical balances with respect to the status of steady state operation need to also accommodate expected chemical reactions. Steady state operation of a manufacturing system is an issue of importance to the present invention since the modeling equations are based upon the presumption that input real-time data used in a specific instance of a solution of a formulated optimization problem have an collective associated steady state relationship. A system in "steady state" is, therefore, characterized by dynamic balance, stability, steadiness, and equilibrium. The modeling equations used for the formulated optimization problems related to economic setpoint definition are based on the presumption of steady state.

The concept of Real-time computer process control

Real-time computer processing is generically defined as a method of computer processing in which an event causes a given reaction within an actual time limit and wherein computer actions are specifically controlled within the context of and by external conditions and actual times. As an associated clarification in the realm of process control, real-time computer controlled processing relates to the performance of associated process control logical, decision, and quantitative operations intrinsic to a process control decision program functioning as part of a controlled apparatus implementing a real-time process (such as the manufacturing system 70) wherein the process control decision program is periodically executed with fairly high frequency usually having a period of between 20 ms and 2 sec, although other time periods can be also utilized. Especially in the context of "on line" real-time advanced control routines, simulators, and optimizers (such as the present invention), the execution period can be, without limitation, on the order of 10 to 100,000 times the period of the associated process control decision program; although most such routines should usually execute within a 10 to 1000 multiplied factor of the period of the associated process control decision program. This larger period is frequently necessary to accommodate the substantial computer calculations which must be performed within one decision cycle of the advanced control routine, simulator, or optimizer. Alternatively, some routines are consistently executed on a daily or bi-daily basis, even though they could be executed with greater frequency. With further regard to the time period wherein the process control decision program is periodically executed, some operations are optionally performed on a multiple of the primary process control decision program execution period; this less frequent operation period is usually adopted for purposes related to tuning, sensitivity, and efficient resource utilization. In many instances, the relatively large time period for an iteration of an optimizer is inherently compensated for by the large relative time constant between the attributes being measured and the setpoints being defined.

DETAILED DESCRIPTION OF THE DRAWINGS

The detailed description of the drawings initiates with a further discussion of the method by which the theory used in the invention is transferred to the definition of useful models which can be used in the real-time optimization system itself; following this elaboration regarding the transition from theory to formulated modeling, the real-time optimization system is discussed in detail. In this regard, FIGS. 1 to 6 are directed to further comprehensive understanding of the invention and the associated construction of optimization models for use in the present invention. Detailed discussion of the optimizing system itself and the method of its operation to use a model (built with respect to the discussion of FIGS. 1 to 6) begins with the discussion of a general overall manufacturing system 715 of FIG. 7. The modeling related discussion of FIGS. 1 to 6 frequently cross-references elements in FIGS. 7–10 in order to facilitate relevancy and orientation with respect to the modeling considerations and the real-time optimizing system.

Referring now to FIG. 1, FIG. 1 is an idealized node diagram 5 which helps to introduce the concept of a node in an idealized and simplified sense by depicting the separation of a first flowing stream 1 in a manufacturing system into a second flowing stream 2 and a third flowing stream 3. At steady state conditions, the sum of (first) the rate of the flow of the second flowing stream 2 and (second) the rate of the flow of the third flowing stream 3 should be equal to the rate of the flow of the first flowing stream 1. The term "flow" is normally associated with mass or matter in a bulk sense. Alternatively, it could be either an energy quantity or a particular component of the bulk material being handled in the associated manufacturing system. The separation of the first flowing stream 1 into the second flowing stream 2 and the third flowing stream 3 occurs at a node 4. Node 4 can have a number of physical manifestations, depending on the situation being evaluated. In its most straightforward implementation, node 4 is a physical tee connector in a the linkage of three pipes. In this straightforward case, the node usually functions efficiently in a physical sense to keep the rate of flow of the first flowing stream 1, the second flowing stream 2, and the third flowing stream 3 in an equality relationship at all times.

In a more complex implementation, however, node 4 can be an entire manufacturing facility with internal repositories for material, energy, and material components (a repository is an entity in which accumulation of mass, energy, and/or material components can occur). In this more complex situation, the sum of the flows of the second flowing stream 2 and the third flowing stream 3 do not balance as frequently with the flow of the first flowing stream 1 as in the straightforward implementation, and the overall system does not be function in a mode where a change in the first flowing stream 1 is immediately reflected in changes in the second flowing stream 2 and/or the third flowing stream 3. Node 4 can, therefore, represent a unit operation or a collection of unit operations in any manufacturing system.

Figure 2:
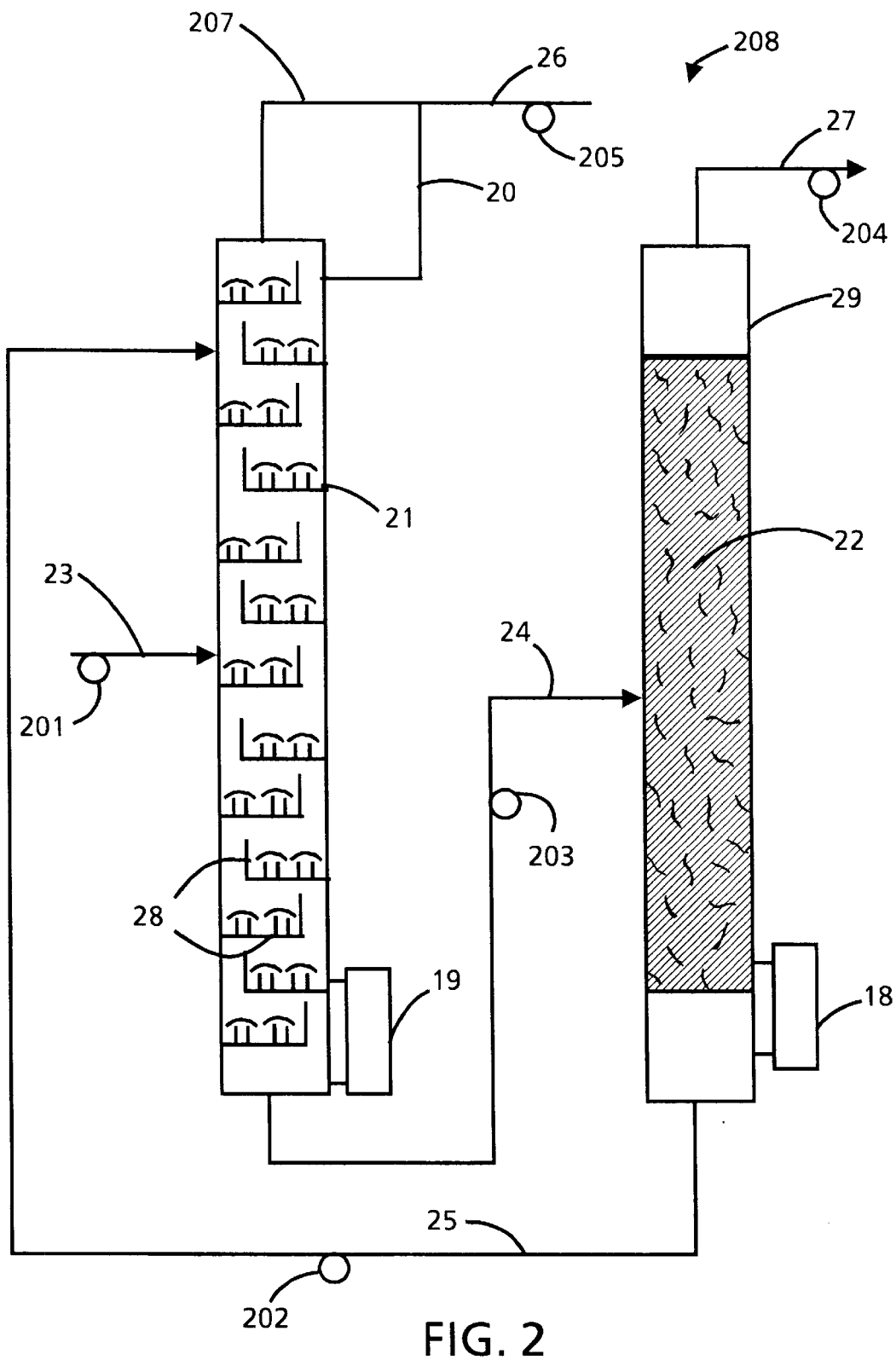
FIG. 2 is a flow chart representing two major unit operations in a chemical manufacturing system.

Referring now to FIG. 2 (and also to FIG. 7 as a parallel reference), FIG. 2 is a separations system flow chart 208 representing two major unit operations in a chemical manufacturing facility. The system of FIG. 2 is a specific exemplary instance of the generic manufacturing system 70 in the general overall manufacturing system 715 of FIG. 7. A feed stream 23 enters distillation tower 21 of FIG. 2 on the seventh bubble-cap tray 28 from the top of the distillation tower 21. The separation tower bottoms stream 25 also enters the distillation tower 21 on the third bubble-cap tray 28 from the top of the distillation tower 21. The lower boiling components of the feed stream 23 and the separation tower bottoms stream 25 exit the distillation tower 21 in distillation tower overhead stream 26. The higher boiling components of the feed stream 23 and the separation tower bottoms stream 25 exit the distillation tower 21 in distillation tower bottoms stream 24. A portion of the separation tower tops stream 207 is returned to the distillation tower 21 as the distillation tower reflux stream 20 on the second bubble-cap tray 28 from the top of the distillation tower 21. Modifications in the portion of the separation tower tops stream 207 being returned to the distillation tower 21 in the distillation tower reflux stream 20 can be used to help modify the purity of the distillation tower overhead stream 26. Energy is added to the distillation tower 21 via the distillation tower reboiler 19, which usually uses steam (not shown) as a heat source. The general manner in which the distillation tower 21 and its related components function to physically (but not necessarily at an economical optimum) achieve the separation of the components of the feed stream 23 and the distillation tower overhead stream 26 into the distillation tower overhead stream 26 and the distillation tower bottoms stream 24 should be apparent, and the description given herein is meant to establish an example system to help characterize the economic optimizing system in the present invention; various control components (not shown) are utilized to control the rate of flow in the various streams (such as the feed stream 23, the distillation tower bottoms stream 24, the distillation tower overhead stream 26, and the distillation tower reflux stream 20) related to the distillation tower 21 and to sense the attributes of the distillation tower 21 and its various associated streams within this particular subpart of an instance of a manufacturing system 70 (FIG. 7). The distillation tower 21 and its various associated streams further incorporate the use of Analog Outputs 710 and Digital Outputs 709 from Process Control Computer 71 to position, activate, and deactivate control valves, pumps, block valves, and other control elements (not shown) which are used to directly modify attributes of the distillation tower 21 in response to the decisions implemented in Process Control Computer 71. Process Control Computer 71 reads Analog Inputs 708 and Digital Inputs 707 in real-time. Analog Inputs 708 and Digital Inputs 707 are responsive to sensors attached to the distillation tower 21 to monitor attributes such as temperature, pressure, flow, level, and composition within the distillation tower 21.

With further reference to FIG. 2 (and to the general overall manufacturing system 715 of FIG. 7), FIG. 2 also includes a second major unit operation in the separation tower 29. The separation tower 29 is a packed tower using the separation tower packing 22 to provide surface area to enable separation of the distillation tower bottoms stream 24 into separation tower overhead stream 27 and separation tower bottoms stream 25. The separation tower bottoms stream 25 is fed back to the distillation tower 21 as was previously described. Energy is added to separation tower 29 using separation tower reboiler 18, which usually uses steam (not shown) as a heat source. The distillation tower bottoms stream 24 enters separation tower 29 at a point within the separation tower packing 22, and it is then separated, without benefit of external reflux, into the separation tower overhead stream 27 and the separation tower bottoms stream 25. Various control components (not shown) are utilized to control the rate of flow in the various streams (such as the distillation tower bottoms stream 24, the separation tower bottoms stream 25, and the separation tower overhead stream 27) related to the separation tower 29 in order to sense attributes of the separation tower 29 and its various associated streams. The separation tower 29 and its various associated streams further incorporate the use of Analog Outputs 710 and Digital Outputs 709 from Process Control Computer 71 to position, activate, and deactivate control valves, pumps, block valves, and other control elements (not shown) which are used to directly modify attributes of the separation tower 29 and its associated apparatus in its operation in response to decisions implemented in Process Control Computer 71. Process Control Computer 71 reads Analog Inputs 708 and Digital Inputs 707 from the separation tower 29. Instances of Analog Inputs 708 and Digital Inputs 707 are responsive to sensors attached to the separation tower 29 and its associated streams to monitor attributes such as temperature, pressure, flow, level, and composition. As an example, a specific instance of a temperature in separation tower 29 is physically measured by a sensor; the measurement is read by Process Control Computer 71 as a specific instance of an Analog Input 708; after reading the temperature as a specific instance of an Analog Input 708, Process Control Computer 71 incorporates it as an instance of a process variable for reference in the decision process further executed Process Control Computer 71. In this regard, a measurement in manufacturing system 70 is an instance of either a Digital Input (DI) 708 or Analog Input (AI) 707 until Process Control Computer 71 has read it; after the overall read process has been executed, the measurement is stored as a process variable within Process Control Computer 71 and thereafter referenced as a specific instance of a process variable within Process Control Computer 71. In the same manner, an output from the Process Control Computer 71 to the manufacturing system 70 is an instance of either a Digital Output (DO) 709 or Analog Output (AO) 710 at the time that Process Control Computer 71 is executing the output process; prior to the execution of the output process by Process Control Computer 71, the relevant data is stored within Process Control Computer 71 as a specific instance of a process variable within Process Control Computer 71. In regard to specific instances of process variables, associated logical identifiers (or names) will frequently incorporate an indication of the purpose of the process variable with respect to its use within either Process Control Computer 71 or manufacturing system 70. As an example, a process variable, which contains values resulting from an Analog Input (AI) 707 which is further responsive to a temperature sensor in the manufacturing system 70, has a logical identifier of AI42 (or, alternatively, TEMP42) in program coding to enable rapid communication to human beings. The interpretation of the example in the first case is that the temperature is the 42nd analog input (AI) in Process Control Computer 71; the interpretation of the example in the alternative case is that the temperature is the 42nd analog input used for temperatures (TEMP) in Process Control Computer 71. Process variables within Process Control Computer 71 also include other Process Control Computer 71 data values computed by or resident within Process Control Computer 71 during the general execution of its function.

With continuing reference to FIG. 2, one of the flow attributes is measured by feed stream flow measurement 201 which measures the rate of flow for the feed stream 23 and is further communicated as an instance of an analog input (or AI 707) to Process Control Computer 71 where a process variable within Process Control Computer 71 subsequently contains the current value of the measurement of the rate of flow for the feed stream 23.

Another one of the flow attributes is measured by distillation tower bottoms stream flow measurement 203 which measures the rate of flow for the distillation tower bottoms stream 24 and is further communicated as a second instance of an analog input (or AI 707) to Process Control Computer 71 where a process variable within Process Control Computer 71 subsequently contains the current value of the measurement of the rate of flow for the distillation tower bottoms stream 24.

Yet another one of the flow attributes is measured by separation tower bottoms stream flow measurement 202 which measures the rate of flow for the separation tower bottoms stream 25 and is further communicated as a third instance of an analog input (or AI 707) to Process Control Computer 71 where a process variable within Process Control Computer 71 subsequently contains the current value of the measurement of the rate of flow for the separation tower bottoms stream 25.

Yet another one of the flow attributes is measured by distillation tower overhead stream flow measurement 205 which measures the rate of flow for the distillation tower overhead stream 26 and is further communicated as a fourth instance of an analog input (or AI 707) to Process Control Computer 71 where a process variable within Process Control Computer 71 subsequently contains the current value of the measurement of the rate of flow for the distillation tower overhead stream 26.

Yet another one of the flow attributes is measured by separation tower overhead stream flow measurement 204 which measures the rate of flow for the separation tower overhead stream 27 and is further communicated as a fifth instance of an analog input (or AI 707) to Process Control Computer 71 where a process variable within Process Control Computer 71 subsequently contains the current value of the measurement of the rate of flow for the separation tower overhead stream 27.

Figure 3:
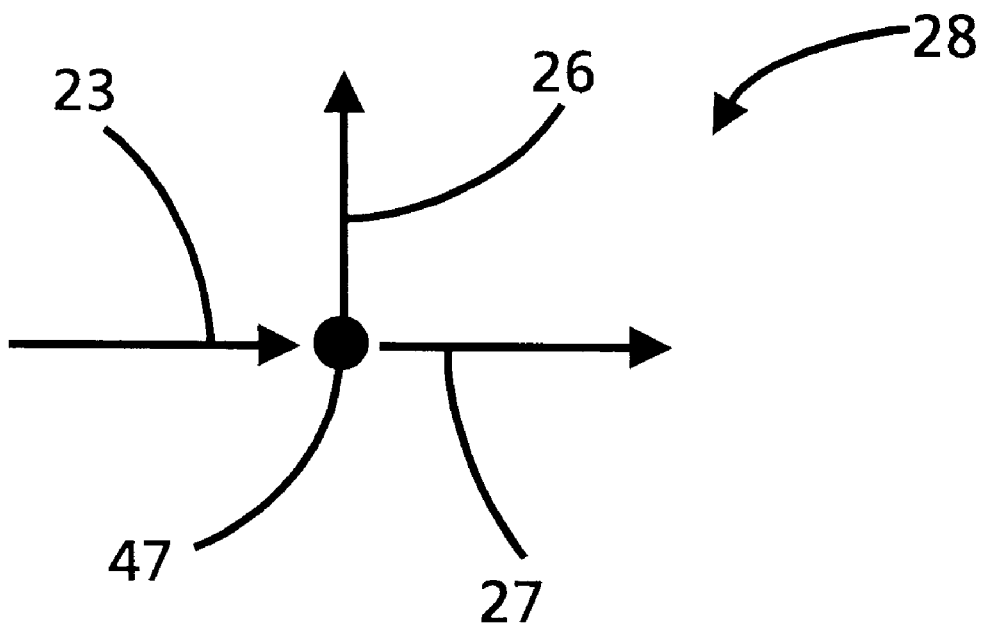
FIG. 3 depicts the nodal characterization of the portion of the manufacturing system of FIG. 2 at essentially the highest (or least detailed) level.

Turning now to a consideration of FIGS. 1–3, FIG. 3 depicts the least complex nodal characterization 28 of the portion of the manufacturing system of FIG. 2 at essentially the highest (or least complex) level. The characterization essentially is at the same level of complexity as the introductory nodal characterization in the idealized node diagram 5 described with respect to FIG. 1. Only the feed stream 23, the distillation tower overhead stream 26, and the separation tower overhead stream 27 are characterized as having an equality; all other parts of the manufacturing system exemplary instance of FIG. 2 is incorporated into node 47. Within this characterizing context, equations are defined characterizing the momentum, mass, and energy inter-relationships of the feed stream 23, the distillation tower overhead stream 26, and the separation tower overhead stream 27. However, all other parts of the manufacturing system of FIG. 2 must be ignored with respect to such equations since they have been virtually incorporated into node 47. The purpose of the equations written to characterize the portion of the manufacturing system shown in the separations system flow chart 208 of FIG. 2 relates to the construction of a useful model. A useful model is defined within the context of the use to be made of the model. If the use of a model built upon the least complex nodal characterization 28 of FIG. 3 is limited to resolution of issues related only to the feed stream 23, the distillation tower overhead stream 26, and the separation tower overhead stream 27, then the model is useful. If, however, usefulness requires that the distillation tower bottoms stream 24 needs to be adjusted in response to a model, a model built upon the least complex nodal characterization 28 of FIG. 3 is not useful since the distillation tower bottoms stream 24 is virtually a part of node 47 and cannot be characterized or examined as a distinct entity within any model based upon the nodal characterization of the portion of the manufacturing system of FIG. 2 as depicted in FIG. 3. Within the context of the present invention, if (1) the distillation tower bottoms stream 24 flow rate is perceived as having economic impact, and (2) the adjustment of the distillation tower bottoms stream 24 is perceived to be useful in modifying the operation of the portion of the manufacturing system of FIG. 2 to enable economically relevant response to changing economic conditions, then the least complex nodal characterization 28 of FIG. 3 is insufficient for modeling within the context of the present invention.

Figure 4:
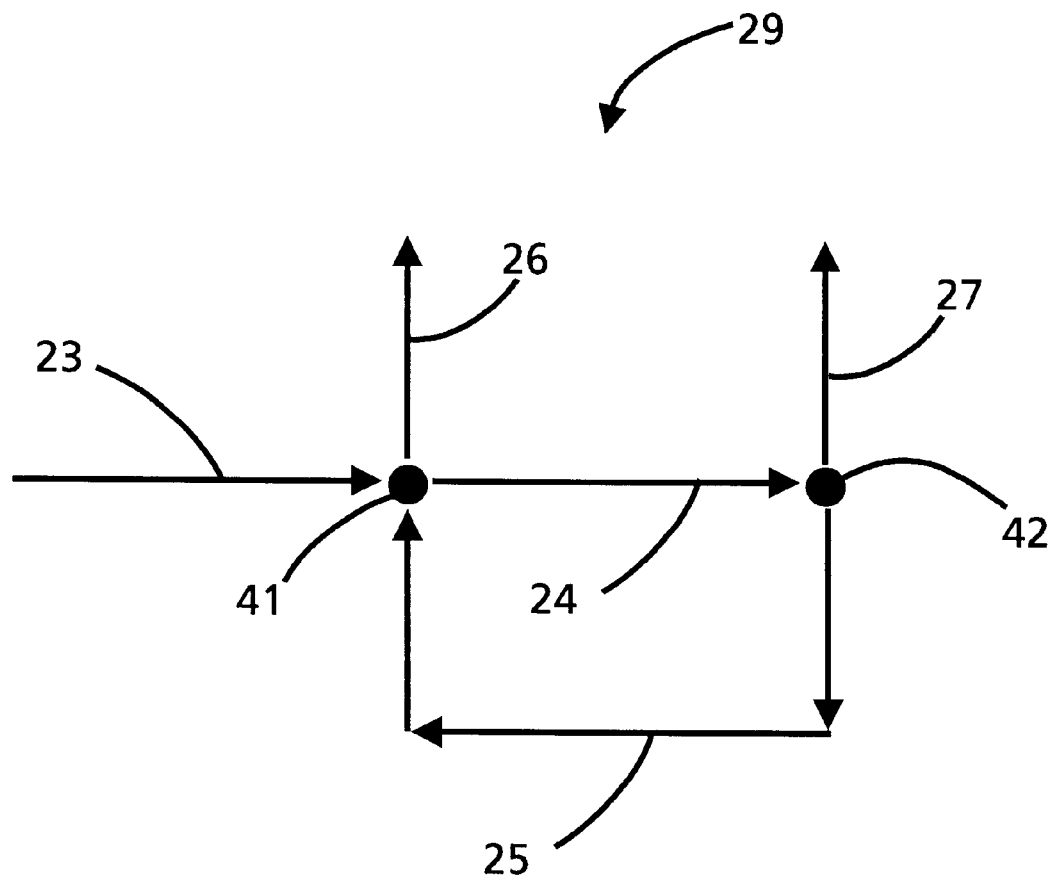
FIG. 4 depicts the nodal characterization of the portion of the manufacturing system of FIG. 2 at a more detailed level than FIG. 3.

Turning now to a consideration of FIGS. 2,3, and 4, FIG. 4 depicts the appropriate nodal characterization 29 of the portion of the manufacturing system of FIG. 2 at a more complex level than the least complex nodal characterization 28 of FIG. 3, sufficient in its complexity to characterize the distillation tower bottoms stream 24 as an entity. Node 41 characterizes the distillation tower 21 and its associated components including the separation tower tops steam 201, the distillation tower reflux stream 20, the bubble-cap trays 28, and the distillation tower reboiler 19 as a unified and indivisible entity. In a similar manner, node 42 characterizes the separation tower 29 and its associated components including the separation tower packing 22 and the separation tower reboiler 18 as a unified and indivisible entity. In comparison to the least complex nodal characterization 28 of FIG. 3, the appropriate nodal characterization 29 of FIG. 4 is useful for constructing a useful model in which the feed stream 23, the distillation tower bottoms stream 24, the separation tower bottoms stream 25, the distillation tower overhead stream 26, and the separation tower overhead stream 27 are perceived to be useful in modifying the operation of the portion of the manufacturing system of FIG. 2 to enable economically relevant response to changing economic conditions. However, it should be noted that the FIG. 4 appropriate nodal characterization 29 (of the portion of the manufacturing system depicted in the separations system flow chart 208 of FIG. 2) is not sufficient to address the status of the operation of the distillation tower reboiler 19 or the separation tower reboiler 18 since these components are assimilated into nodes 41 and 42, respectively. In considering the shift from the FIG. 3 least complex nodal characterization 28 of the portion of the manufacturing system of FIG. 2 to the FIG. 4 appropriate nodal 29 characterization of the portion of the manufacturing system of FIG. 2, characterizing every component in a process as a node appears to be advantageous for comprehensively modeling any process. However, in this regard, solution of any resultant formulated model on a large scale requires substantial computing resources, and the amount of time required to solve such a formulated model on a large scale renders the model relatively unuseful in the arena of real-time process control unless a very powerful computing system can be justified for the particular situation. The preferred implementation of an economic optimization system according to the present invention incorporates economic use of capital in the overall optimizer. In this regard, the nodal characterization (of the manufacturing system to be optimized using the present invention) should be as efficient as possible respecting the number of different entities defined while effectively representing all economically useful control points specifically and unambiguously. It should be further noted that different formulated optimization problems used within a specific instance of use of the present invention may have nodal characterizations at different levels of abstractions; for example, the nodal characterization for the Reconciliation Model 804 might use 2 nodes to abstract the process with regard to nodal characterization, and the accompanying nodal characterization for the parameter objective function and plant model 803 might use 6 nodes to abstract the process with regard to nodal characterization.

Figure 5:
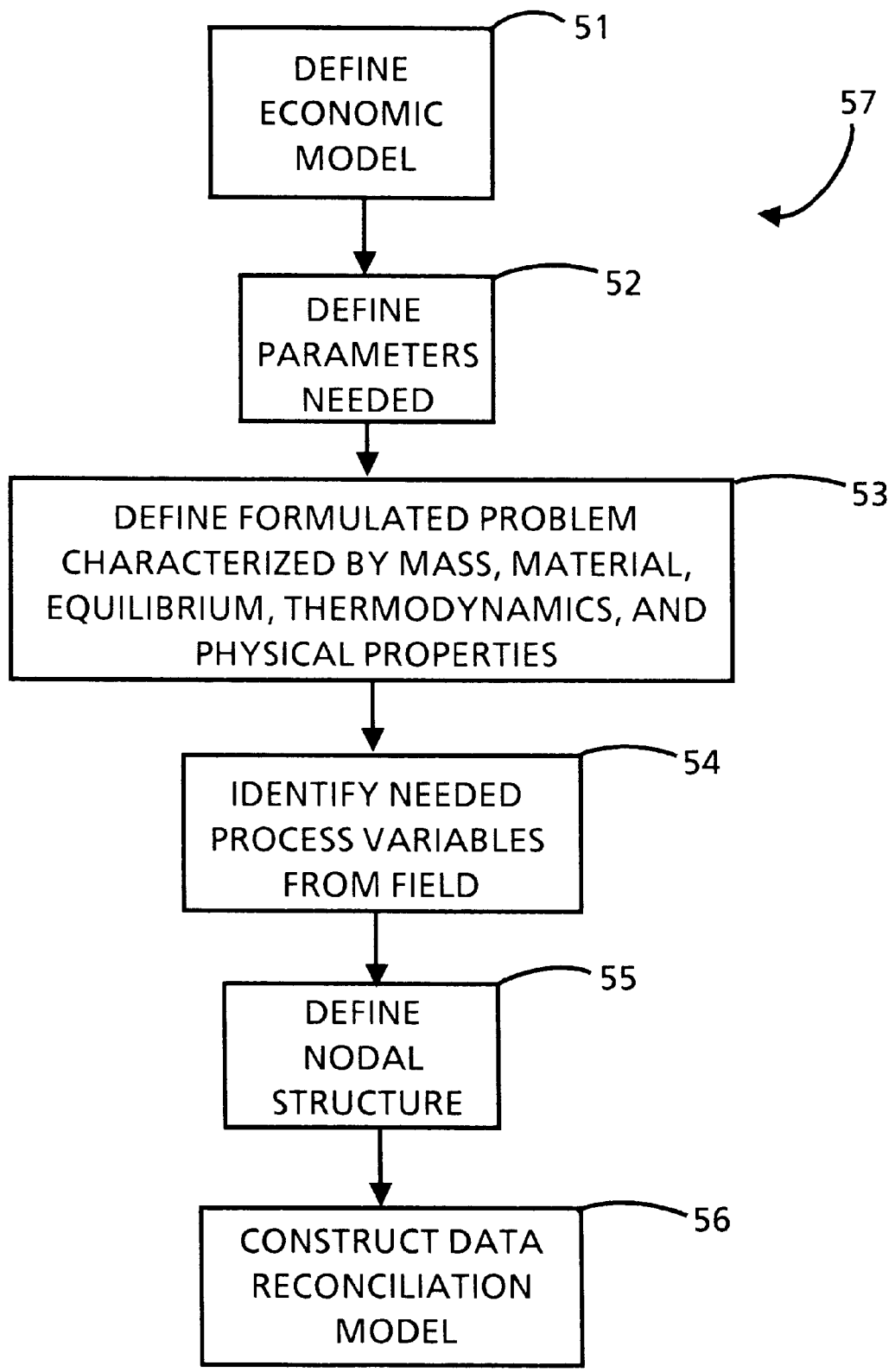
FIG. 5 presents an overview of the steps which are followed in defining an optimizing model.

Turning now to a consideration of FIG. 5 (with some parallel references to FIG. 7, FIG. 8, and FIG. 9) FIG. 5 presents an overview of the modeling steps 57 which are followed in defining the models, data, formulated problems, and other definitions for input into the Optimizing Reference Model and Schema 801 of Optimizing System 73.

Figure 9A:
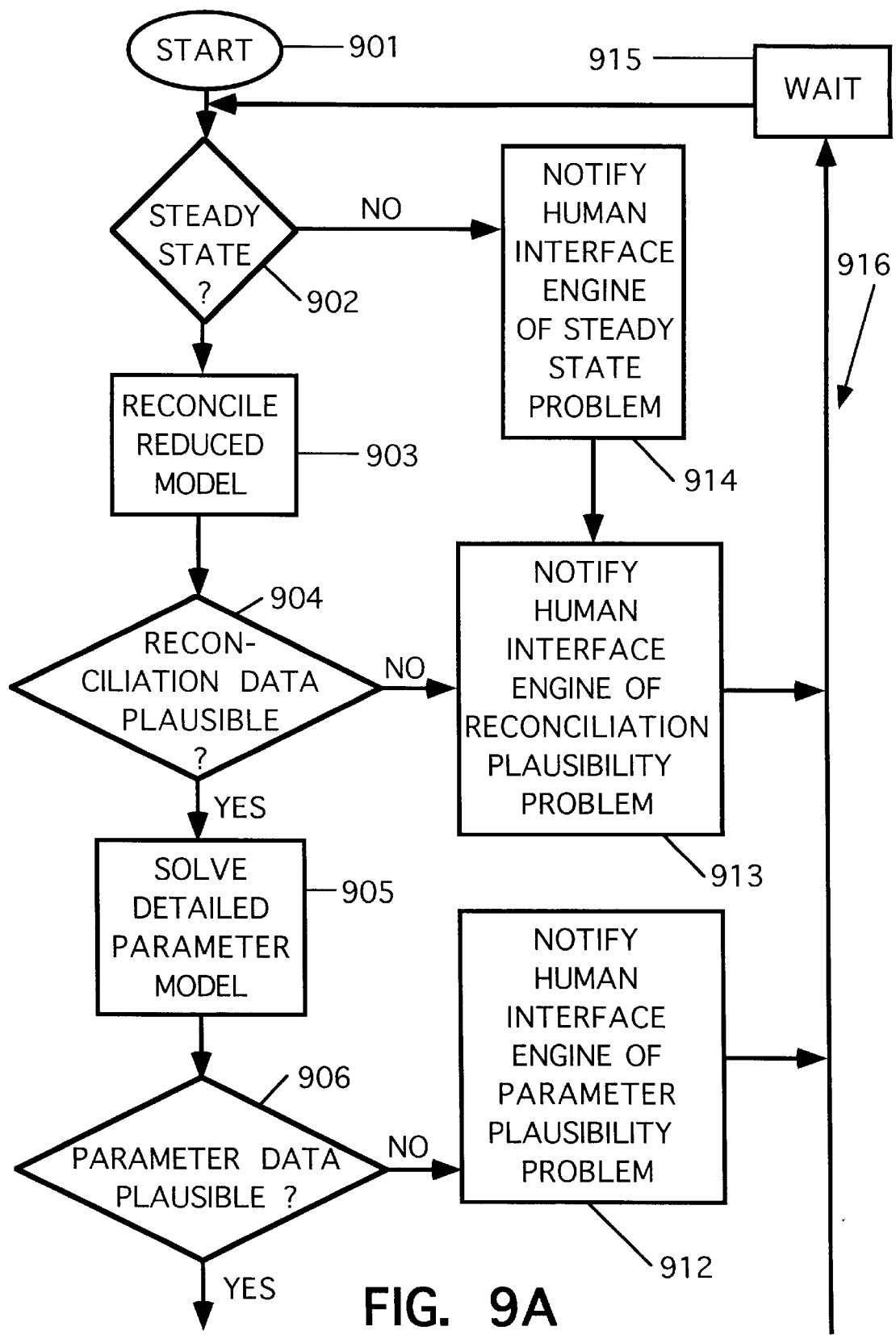
FIGS. 9A and 9B present a flowchart depicting the steps in the method executed by the SOLO (System for On-Line Optimization) Executive Engine.
Figure 9B:
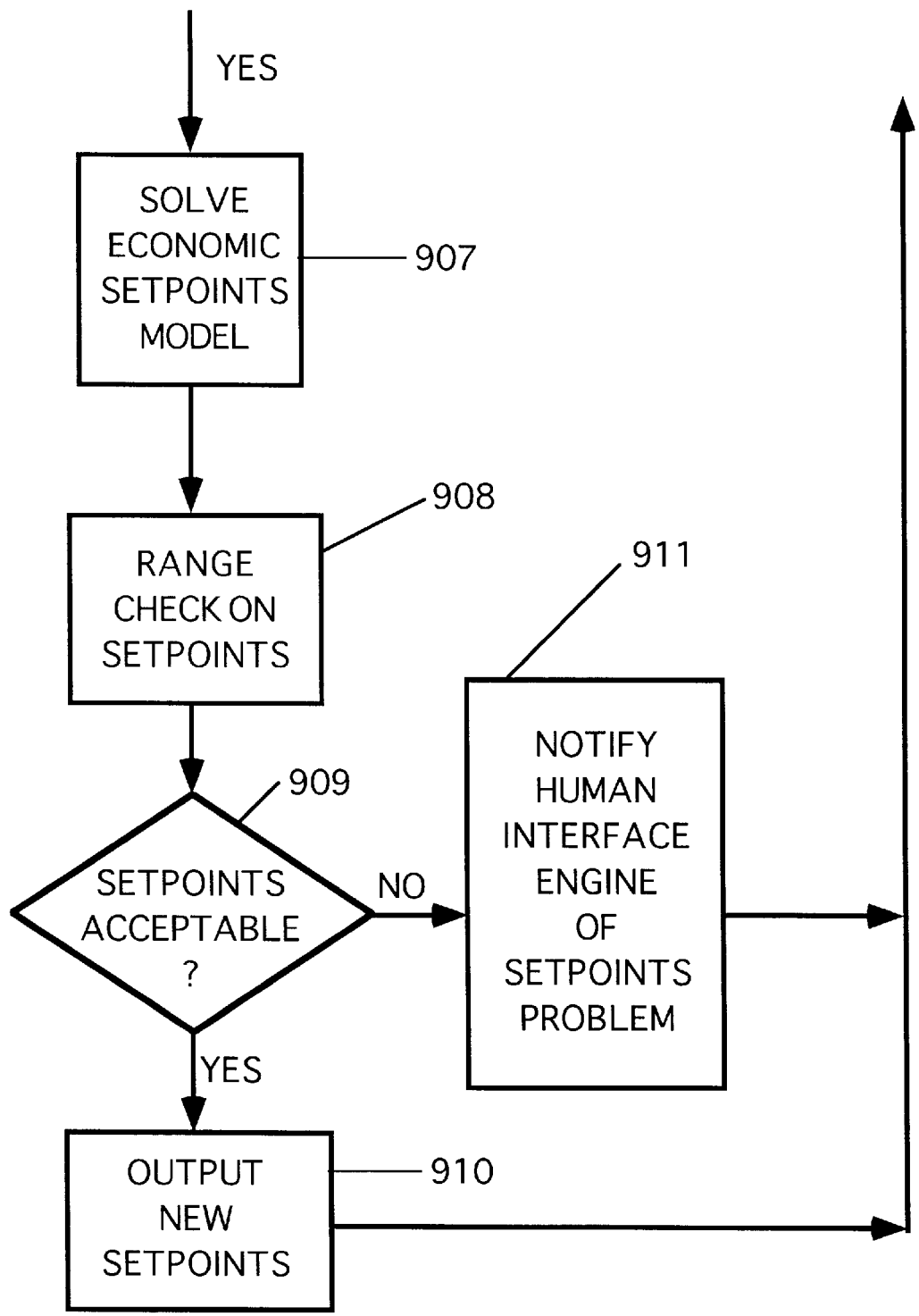

The modeling steps 57 process outlined in steps 51–55 generates models whose use is further described in the discussion of FIG. 9 relating to the operation of the optimizing system 73 in real-time mode; the use of the models (built in steps 51–55) in the flow chart of the optimization execution process 916 of FIG. 9 is in reverse order to the order in which they are defined in the modeling steps 57 of FIG. 5. The ultimate output of a cycle of optimizing system 73 is a group of economically optimal setpoints to the manufacturing system 70. The economically optimal setpoints (or at least one economic setpoint) are (is) transferred to Process Control Computer 71 during the execution of the output new setpoints step 910 of the optimization execution process 916 of FIG. 9 (essentially the last step in a successful cycle of the optimizing system 73) which results from the solution of the economic model defined in the first step of the modeling steps 57 of FIG. 5.

Turning now to a consideration of the economic model definition step 51, the economic model chosen, defined, and formulated determines the degree of comprehensiveness regarding the ability of the optimizing system 73 of the present invention to adjust variables in Process Control Computer 71 to control manufacturing system 70 and provide profitability information. In step 51, the economic objective function is written. In this regard, the economic objective function should reference those items relating to the manufacturing system which fluctuate in their real-time economic impact rather than items which have an essentially fixed economic status. In chemical processing, there is frequently a relative range of product mix that can be viably manufactured. The specific mix within the range at any time is based upon the manner in which the manufacturing system 70 is operated. For example, if an instance of manufacturing system 70 can produce a product output ranging from 40%–60% of product A and (comparably) 60%–40% of product B, the 40% of product A and 60% of product B product mix might be optimal during a first week when the price for product A is $1.00 per pound and the price for product B is $1.10 per pound. However, in an second week when the price for product A is $1.10 per pound and the price for product B is $1.00 per pound, it would be desirable to produce a 60% of product A and 40% of product B mix. On the other hand, if, for example, (1) products A and B are manufactured in a specific instance of a manufacturing system 70 having, as a portion, the manufacturing system depicted in the separations system flow chart 208 of FIG. 2, and (2) the separation tower bottoms stream 25 in the case of the second week must be operated at five times the rate necessary to meet the needs of the case of the first week, then the desirable product mix might not be 60% of product A and 40% of product B, but rather 50% of product A and 50% of product B, depending on other economically related considerations such as steam consumption required in the distillation tower reboiler 19 to handle the larger flow of the separation tower bottoms stream 25 in the distillation tower 21. The foregoing example scenario characterizes one example of the need for the invention. The example also helps to demonstrate the complexity of achieving optimal economic operation without the present invention, since the economic model relating to a large facility must address a substantial number of non-linear considerations within the context of shifting economic values relating to both resources and products. As an example, in the case of electrical power as either a product or resource, economic impacts shift by the hour and, further, by accumulated use during a specific calendar time period as weekend rates and bulk rate considerations impact the price related to the electrical power.

Turning now to a consideration of the parameter definition step 52, the economic model definition step 51 yields a useful economic objective function having component parameters. Some of the parameters are constant and fixed, some of the parameters are measured from the Process Control Computer 71 each time the optimizing system 73 executes its computational cycle, and some parameters are derived from the variables from the Process Control Computer 71. The derived parameters are calculated each time the optimizing system 73 executes its computational cycle using equations to characterize the derived parameters (variables) in a responsive manner to variables acquired from the Process Control Computer 71. Additionally, to facilitate secondary analysis with respect to degrees of freedom, additional parameters perceived as having economic impact may be added to the defined model even if not directly derived from economic model definition step 51.

Turning now to a consideration of the formulated plant model step 53, and with respect to the parameters defined in the parameter definition step 52, a comprehensive set of equations characterizing a plant model comprising (1) mass, material, equilibrium, thermodynamic, and physical property related equations, and (2) data (usually in table form) are defined to specify the parameters defined in the parameter definition step 52. In this regard, characterizing a derived parameter for use in the formulated economic problem from several parameters measured from the Process Control Computer 71 is illustrated here, without limitation, by example. The example is of the temperature of the feed stream 23 (as indicated in a process variable within the Process Control Computer 71 after being read as an Analog Input 707 by Process Control Computer 71) being used to reference a physical property table relating to the vapor pressures of the components of the feed stream 23. The vapor pressures of the components of the feed stream 23 are then used to further define the separation performed by the distillation tower 21 (since the separation is a function of the vapor pressures of the components of the feed stream 23 when the feed stream 23 enters the distillation tower 21). While the model characterizing the separation of the distillation tower 21 varies according to the physical size of the distillation tower 21, a high temperature in the feed stream 23 would usually indicate a more efficiently operating the distillation tower 21, and a low temperature would usually indicate a less efficiently operating the distillation tower 21. In any case, in the parameter definition step 52, each parameter of the model defined in the economic model definition step 51 must be defined by at least one constraint equation in the formulated plant model; the constraint equation could be, alternatively, the definition of a constant, the definition of a variable equal to the value of a process variable acquired from the Process Control Computer 71 each time the optimizing system 73 executes its computational cycle, a complex equation and table look-up sequence using at least one process variable acquired from the Process Control Computer 71 each time the optimizing system 73 executes its computational cycle, or a set of complex equations and table look-up sequences using at least one process variable acquired from the Process Control Computer 71 each time the optimizing system 73 executes its computational cycle. The more detailed approach of constructing these formulations should be apparent given the information in this specification.

Turning now to a consideration of the process variable definition step 54, the formulated set of equations related to the formulated plant model step 53 define (1) at least one parameter directly measured as a process variable from the Process Control Computer 71 each time the optimizing system 73 executes its computational cycle, (2) at least one parameter derived from solution to an equation or, alternatively, a table look-up sequence using at least one parameter measured as a process variable from the Process Control Computer 71 each time the optimizing system 73 executes its computational cycle, or (3) at least one parameter derived from solution to an equation or, alternatively, a table look-up sequence using at least one parameter measured as a process variable from the Process Control Computer 71 each time the optimizing system 73 executes its computational cycle. All parameters (process variables) needed from the Process Control Computer 71 each time the optimizing system 73 executes its computational cycle (for input into the formulated set of equations related to the formulated plant model step 53) are summarized into a process variable list for use in the nodal structuring step 55, the reconciliation model formulation step 56, and input into optimizing system 73.

Turning now to a discussion of the nodal structuring step 55, data reconciliation is discussed. The nodal structuring step 55 relates to the definition of the nodal and stream characterization to be used in resolving uncertainties in the process variables read from the Process Control Computer 71 in real-time. In this regard, it is indeed rare for an equation (that should theoretically balance) to balance numerically when both the variables and resultant of the equation are characterized with a set of real-time process variables read from Process Control Computer 71 at any moment in real-time. There are a number of reasons for this phenomenon. Instrument noise, intrinsic time constants (within the manufacturing system 70) which cause delays in the responses of some instrument signals a to small changes in the dynamic attributes of manufacturing system 70, hysteretic effects in instrumentation, and calibration induced differences are all examples of the reasons for which an equation (that should theoretically balance) does not usually balance numerically when characterized with a set of process variables read from Process Control Computer 71 in a given instant of real-time processing. Given this reality, a part of the process and method used in an effective optimizing system 73 must resolve the differences between the theoretical and the actual so that the models defined in the economic model definition step 51 and the formulated plant model step 53 (which presume an ideal situation characterized by both equilibrium and balance respecting the dynamics related to the manufacturing system 70) are solved and the results used to usefully compute setpoints for Process Control Computer 71. Without the resolution of these differences, the solution from the models defined in the economic model definition step 51 and the formulated plant model step 53 can be economically detrimental to the operation of the manufacturing system 70 by Process Control Computer 71 since errors intrinsic to the measured real-time variables can interact in a counterproductive manner. With respect to the process variable definition step 54 and the discussion related to FIGS. 1–4, a nodal characterization must be constructed that characterizes the critical process variables from the process variable definition step 54 at a sufficient level to enable differences between the variables measured in real-time (as defined by the list generated in the process variable definition step 54) to be reconciled prior to their use in solutions of formulated optimization problems related to economic model definition step 51 and the formulated plant model step 53. In this regard, the execution of the nodal structuring step 55 must define a sufficient set of process variables to be acquired from Process Control Computer 71 in order to achieve a useful reconciliation model in the reconciliation model formulation step 56.

The reconciliation model formulation step 56 is directed to the process of resolving differences among the measured variables from the Process Control Computer 71 within the context of the nodal and stream characterization performed in the nodal structuring step 55. The details of the reconciliation model formulation step 56 are further discussed with reference to FIG. 6.

Figure 6:
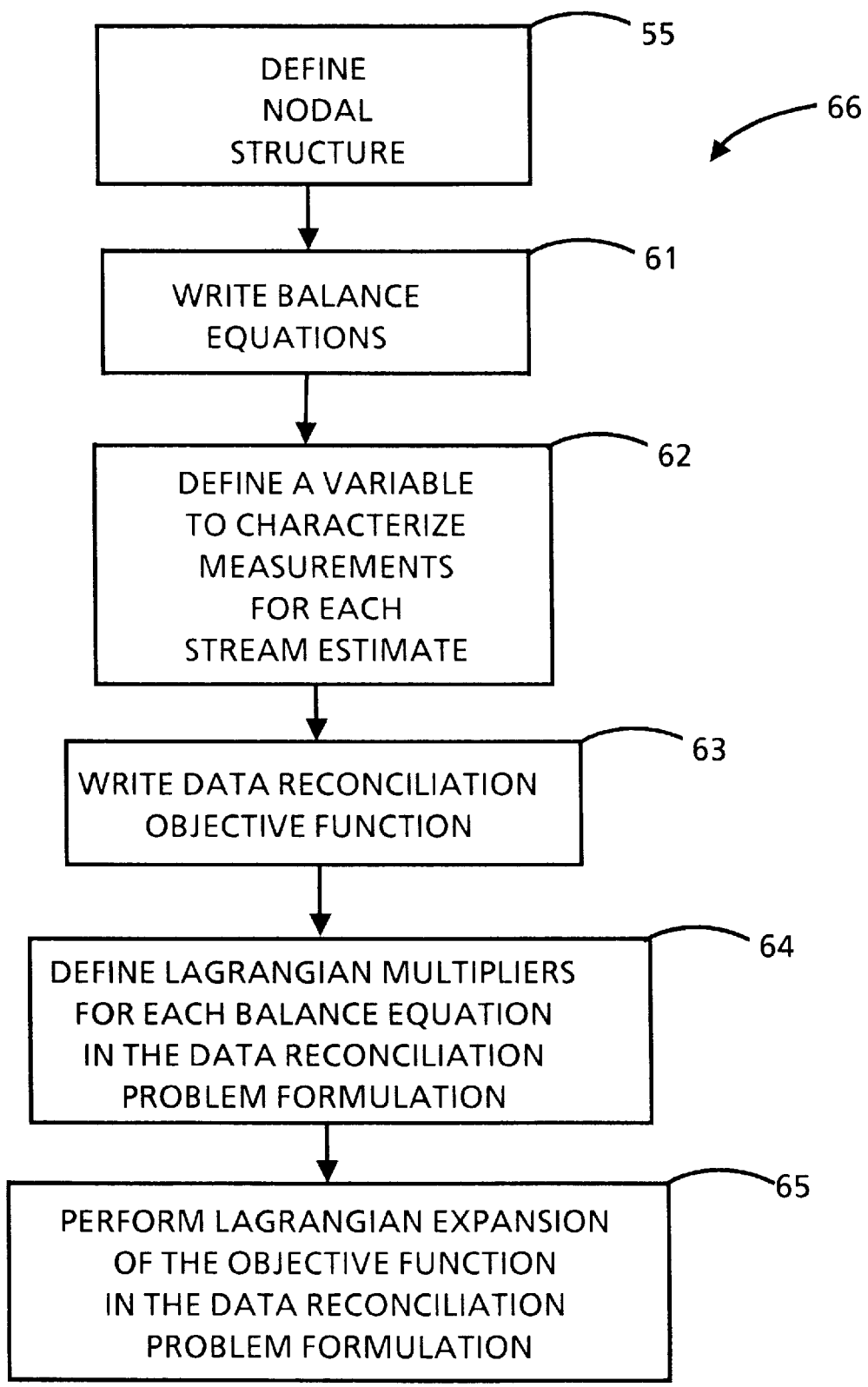
FIG. 6 is a detailed discussion of the reconciliation model formulation step.

Referring now to FIG. 6, FIG. 6 presents a ore detailed reconciliation model flow chart 66 of the reconciliation model formulation step 56. A discussion of the reconciliation model flow chart 66 of FIG. 6 is dependent upon the context of the mathematical basis for the reconciliation model. In this regard, and with additional reference to the idealized node diagram 5 of FIG. 1, the following example can serve as a basis to describe concepts related to the reconciliation modeling portion of the present invention, wherein the first flowing stream 1 is designated to relate to a mathematical variable S1 in the following discussion, the second flowing stream 2 is designated to relate to a mathematical variable S2 in the following discussion, and the third flowing stream 3 is designated to relate to a mathematical variable S3 in the following discussion. The purpose of the following discussion is to review a number of mathematical concepts relevant to the present invention to establish a basis and reference frame for the features of the present invention.

According to the idealized node diagram 5 of FIG. 1, then, $$S_1 = S_2 + S_3 \qquad \text{Equation 601}$$

in a theoretical and ideal sense given that node 4 is operating without any internal accumulation regarding the first flowing stream 1, the second flowing stream 2, and the third flowing stream 3.

As previously discussed with regard to the nodal structuring step 55, it is indeed rare that an equation such as Equation 601 (that should theoretically balance) can balance when it references and is characterized by a set of real values (real-time process variables in Process Control Computer 71) within Process Control Computer 71 at any point in time during the actual (another word for actual in this context is "real" as distinguished from the ideal and theoretical) operation of the manufacturing system 70. So, in a realistic and practical sense involving the use of Process Control Computer 71 to operate the manufacturing system 70 wherein measurements from Process Control Computer 71 are used as values for $S_1$, $S_2$, and $S_3$, it is very unlikely that Equation 601 would hold true numerically and that, $$S_1 = S_2 + S_3 + \text{ERROR} \qquad \text{Equation 602}$$

represents the mathematically rigorous representation characterizing the situation around node 4 at any time when measurements from Process Control Computer 71 are used as values within an equality relationship of the first flowing stream 1, the second flowing stream 2, and the third flowing stream 3, and the variable ERROR represents the necessary value enabling the equality of Equation 602 to numerically exist when $S_1$, $S_2$, and $S_3$ are values of process variables which exist in Process Control Computer 71 at any point in time.

Mathematically, the difference indicated in with respect to Equations 601 and 602 between the theoretical case and the realistic case (or "measured" case within the context of process variables in a Process Control Computer 71 at any point in time) is more rigorously represented for each of $S_1$, $S_2$, and $S_3$ by distinguishing each of $S_1$, $S_2$, and $S_3$ into an estimated entity (which in the case of $S_1$ is designated to $S_{1est}$) and a measured entity (which in the case of $S_1$ is designated to $S_{1meas}$). Note that $S_{1meas}$ mathematically represents the value of the associated process variable within Process Control Computer 71, and $S_{1est}$ represents the practically useful entity which interprets the theoretically accurate $S_1$ of Equation 1 into a practical application (the estimated value of the first flowing stream 1 as $S_{1est}$ is differentiated here from the theoretically "pure" or "ideal" value $S_1$ of the first flowing stream 1; $S_{1est}$ is an estimate of $S_1$ and is substituted for $S_1$ mathematically as the represented situation shifts from the ideal and theoretical to the real and practical and useful). In this regard, and with respect to Equation 601, $$S_{1est} = S_{2est} + S_{3est}; \qquad \text{Equation 606}$$

$$S_{1est} = S_{1meas} + \Delta S_1; \qquad \text{Equation 603}$$

$$S_{2est} = S_{2meas} + \Delta S_2; \qquad \text{Equation 604}$$

$$S_{3est} = S_{3meas} + \Delta S_3; \qquad \text{Equation 605}$$

where $\Delta S_1$, $\Delta S_2$, and $\Delta S_3$ represent the necessary values needed to enable the equalities of Equation 603, Equation 604, and Equation 605 to respectively exist in a practical situation.

The mathematical variables $\Delta S_1$, $\Delta S_2$, and $\Delta S_3$ are, therefore, the respective differences between the estimated values $S_{1est}$, $S_{2est}$, and $S_{3est}$ and the further respective measured values $S_{1meas}$, $S_{2meas}$, and $S_{3meas}$ related to theoretical entities Si, S2, and S3. In an ideal system, $S_1$, $S_{1est}$, and $S_{1meas}$ should be the same value and $\Delta S_1, \Delta S_2$, and $\Delta S_3$ and would each have a zero value quantity. However, in a real system (as is the likely case when the mathematical variables are set equal to data values representing process variables resident within Process Control Computer 71 when Process Control Computer 71 is controlling a manufacturing system 70) a non-zero value generally exists for each of $\Delta S_1$, $\Delta S_2$, and $\Delta S_3$ so that Equations 606, 603, 604, and 605 can exist as equalities with respect to node 4. Given that each of $\Delta S_1$, $\Delta S_2$, and $\Delta S_3$ are usually not zero in a real system, a best case scenario is that their accumulated impact should be as small as possible.

Therefore the desirable situation is that the sum of the absolute values of $\Delta S_1$, $\Delta S_2$, and $\Delta S_3$ should be as small as possible. An essentially equivalent desirable situation, used in an embodiment of the present invention (to minimize the use of computer resources related to optimizing system 73), is that the sum of the individual squares of $\Delta S_1$, $\Delta S_2$, and $\Delta S_3$ should be minimized.

The minimization of any positive objective function within a situation where constraints are defined relating to the objective function is essentially an optimization problem in a mathematical context. Projecting the example of the previous discussion into a generic context, it is valid to state that, for a system in balance, equilibrium, and steady state, having at least one balanced set of variables around at least one node defined for a manufacturing system 70, and further having a Process Control Computer 71 controlling a manufacturing system 70, the values of process variables in the Process Control Computer 71 at any point in time (which represent measurements from the manufacturing system 70) are reconciled to collectively represent estimates of the most reasonable and mathematically acceptable overall balance as a group if a formulated optimization problem is solved using the method of Lagrangian Multipliers wherein (1) the objective function of the formulated optimization problem is the sum of squares of the differences between estimates representing process variables in the Process Control Computer 71 and their associated measured values in Process Control Computer 71 and (2) the constraints of the formulated optimization problem are the balances that exist around each node defined for the system.

Continuing the discussion related to the example, a general Lagrangian expansion is $$\zeta = u(x) - \lambda \Phi(x) \qquad \text{Equation 606}$$

Where $\zeta$ defines the Lagrangian expansion, $u(x)$ is the objective function, Lambda($\lambda$) is the Lagrangian multiplier, and $\Phi(x)$ is the constraint in the situation. Within the context of the example and prior discussion, $u(x)$ in the reconciliation operation of the present invention is $\Delta S_1^2 + \Delta S_2^2 + \Delta S_3^2$; and $\Phi(x)$ is $S_{1est} - S_{2est} - S_{3est}$. Therefore, by substitution into Equation 606, $$\zeta = (\Delta S_1^2 + \Delta S_2^2 + \Delta S_3^2) - \lambda(S_{1est} - S_{2est} - S_{3est}). \qquad \text{Equation 607}$$

Expanding on Equation 607 with respect to Equations 603, 604, and 605, $$\zeta (\Delta S_1^2 + \Delta S_2^2 + \Delta S_3^2) - \lambda[(S_{1meas} + \Delta S_1) - (S_{2meas} + \Delta S_2) - (S_{3meas} + \Delta S_3)] \qquad \text{Equation 608}$$

Differentiating Equation 608 with respect to $\Delta S_1$,

Equation 609: $\partial \mathcal{L} / \partial \Delta S_1 = \partial [(\Delta S_1^2 + \Delta S_2^2 + \Delta S_3^2)] / \partial \Delta S_1 -$ $$\lambda \partial [(S_{1meas} + \Delta S_1) - (S_{2meas} + \Delta S_2) - (S_{3meas} + \Delta S_3)] / \partial \Delta S_1$$

yields $$\delta \zeta / \delta \Delta S_1 = [2\Delta S_1 + 0 + 0] - \lambda[(0+1) - (0+0) - (0+0)] \qquad \text{Equation 610}$$

In transitioning from Equation 609 to Equation 610, the derivatives of $\Delta S_2$ and $\Delta S_3$ with respect to $\Delta S_1$ are both zero since $S_1$, $S_2$, and $S_3$ are orthogonal given no predictable behavior of node 4 in the model of this example related to reconciliation; the derivatives of $S_{1meas}$, $S_{2meas}$, and $S_{3meas}$ are zero because they are known values and constant for the Equation 610. At any extreemum, $\delta \zeta / \delta \Delta S_1$ is zero and Equation 610 is either:

$$\delta \zeta / \delta \Delta S_1 0 = 2\Delta S_1 - \lambda \qquad \text{Equation 611}$$

or $$2\Delta S_1 = \lambda \qquad \text{Equation 612}$$

or $$\Delta S_1 = \lambda/2 \qquad \text{Equation 613}$$

In a similar manner, the estimate of $\Delta S_2$ and $\Delta S_3$ are equal to one-half of the Lagrangian multiplier since the Lagrangian multiplier relates to the balance around node 4. The progression related to Equations 606–613 within the context of the prior discussion should be apparent with respect to optimization, calculus, and the calculus of variations; it is presented here to characterize concepts related to the present invention and to establish a basis to present other features of the present invention.

Therefore, the estimate of the error related to each of the streams 1,2, and 3 in the idealized node diagram 5 of FIG. 1 is one-half of the respective Lagrangian Multiplier obtained by solving the Lagrangian formulation of the optimization problem as discussed above. Projecting beyond the example, where more than one node (and an accompanying set of additional Lagrangian Multipliers wherein each Lagrangian Multiplier is related to the constraint equation around each node used in the formulated optimization problem) is involved, the Lagrangian multipliers are further used to identify which measured node constraints in the overall set comprising the entire set of constraints related to the formulated optimization problem might be more significant with respect to contribution of error in representation of attributes of the manufacturing system 70 in the values of variables that Process Control Computer 71 uses in its operation of the manufacturing system 70. A Lagrangian Multiplier, therefore, also can represent a sensitivity respecting the degree to which a set of values (process variables within Process Control Computer 71) involved in one constraint of a formulated reconciliation optimization problem might be plausibly different from the degree to which the other sets of values (also process variables within Process Control Computer 71 involved in the other constraints of the same formulated reconciliation optimization problem) contributes to the overall error in a specific solution of the formulated optimization problem given that the entire set of variables and constraints involved in the generation of the relevant Lagrangian Multipliers is treated as an interactive (and balanced) whole.

As a further option regarding practical utility in application of the above concepts, the least squares objective function illustrated in Equation 607 is modified wherein the individual components in the objective function ($\Delta S_1^2 + \Delta S_2^2 + \Delta S_3^2$ in Equation 608 of the example) are multiplied by the reciprocal of the standard deviation (or variance) obtained during steady state conditions from the historical set of data for any measured data value (derived from process variables within Process Control Computer 71 when Process Control Computer 71 is controlling the manufacturing system 70). This further feature can help to decrease the significance of predictable noise effects in measurement of attributes within the manufacturing system 70. In this case, the sum of the squares of the quotients of $\Delta S_1 + \Delta S_2 + \Delta S_3$ and their respective standard deviations is the objective function to be minimized.

The reconciliation model flow chart 66 of FIG. 6 expands upon the reconciliation model formulation step 56 in which a reconciliation model is constructed using the nodal structure of the nodal structuring step 55. FIG. 6 first depicts nodal structuring step 55 as an orienting reference from FIG. 5 and then proceeds to expand upon reconciliation model formulation step 56 in steps 61 to 65.

As previously discussed, the nodal structuring step 55 relates to the definition of the nodal and stream characterization for resolving uncertainties in the process variables read from the Process Control Computer 71 in real-time. In balance equation writing step 61, a balance equation is written around each node (similar to nodes 4, 41, 42) to yield a set of equations similar to Equations 601–Equation 605. Balance equation writing step 61 includes the definition of variables for characterizing the estimate of each stream, the measurement of each stream, and a variable to represent the difference between the estimate and the measurement for each stream. In the next step of reconciliation model formulation, estimated stream variable definition step 62, a separate process variable for each stream (each stream identified in the nodal structuring step 55) is identified in Process Control Computer 71 to be the measurement of each respective stream for use in optimizing system 73.

In reconciliation objective function definition step 63, the data reconciliation objective function is defined as the sum of squares of the differences between the estimates and the measurements for each respective stream. The reconciliation objective function is similar to the u(x) in Equations 607 and 608. After reconciliation objective function definition step 63, a Lagrangian Multiplier is defined for each node (identified in the nodal structuring step 55) in a reconciliation model Lagrangian Multiplier definition step 64. Each Lagrangian Multiplier is similar to the $\lambda$ in the simplified single node case of in Equations 607 and 608.

Following the reconciliation model Lagrangian Multiplier definition step 64, the Lagrangian expansion of the objective function is performed in reconciliation model Lagrangian expansion step 65 to further formulate the reconciliation model. The expansion according to the present invention is performed in a similar manner to Equations 606–613, wherein the formalized u(x) is the sum of squares of the differences between the estimates and the measurements for each respective stream, $\lambda$ is the Lagrangian multiplier for each node, and $\Phi(x)$ is the balance equation around each node that was identified in the nodal structuring step 55.

With respect to the above, an illustration of the reconciliation model formulation is now shown by example with reference to FIGS. 2, 4, 5, and 6.

With reference to the separations system flow chart 208 of FIG. 2 and the example reconciliation model formulation, the following modeling variables are used in the reconciliation model formulation:

For feed stream flow measurement 201 which measures the rate of flow for the feed stream 23 and is further communicated as an instance of an analog input (an instance of AI 707) to Process Control Computer 71 where a process variable within Process Control Computer 71 subsequently contains the current value of the measurement of the rate of flow for the feed stream 23, SS23_FIELD represents the current value of the measurement of the rate of flow for the feed stream 23, SS23_EST represents the reconciled estimate of the rate of flow for the feed stream 23, and DELTA_SS23 represents the difference between SS23_EST and SS23_FIELD for the feed stream 23.

The following equation is therefore representative of the feed stream 23:

$$SS23\_EST = SS23\_FIELD + DELTA\_SS23 \qquad \text{Equation 614}$$

For distillation tower bottoms stream flow measurement 203 which measures the rate of flow for the distillation tower bottoms stream 24 and is further communicated as an instance of an analog input (an instance of AI 707) to Process Control Computer 71 where a process variable within Process Control Computer 71 subsequently contains the current value of the measurement of the rate of flow for the distillation tower bottoms stream 24, SS24_FIELD represents the current value of the measurement of the rate of flow for the distillation tower bottoms stream 24, SS24_EST represents the reconciled estimate of the rate of flow for the distillation tower bottoms stream 24, and DELTA_SS24 represents the difference between SS24_EST and SS24_FIELD for the distillation tower bottoms stream 24.

The following equation is therefore representative of the distillation tower bottoms stream 24:

$$SS24\_EST = SS24\_FIELD + DELTA\_SS24 \qquad \text{Equation 615}$$

For separation tower bottoms stream flow measurement 202 which measures the rate of flow for the separation tower bottoms stream 25 and is further communicated as an instance of an analog input (an instance of AI 707) to Process Control Computer 71 where a process variable within Process Control Computer 71 subsequently contains the current value of the measurement of the rate of flow for the separation tower bottoms stream 25, SS25_FIELD represents the current value of the measurement of the rate of flow for the separation tower bottoms stream 25, SS25_EST represents the reconciled estimate of the rate of flow for the separation tower bottoms stream 25, and DELTA_SS25 represents the difference between SS25_EST and SS25_FIELD for the separation tower bottoms stream 25

The following equation is therefore representative of the separation tower bottoms stream 25:

$$SS25\_EST = SS25\_FIELD + DELTA\_SS25 \qquad \text{Equation 616}$$

For distillation tower overhead stream flow measurement 205 which measures the rate of flow for the distillation tower overhead stream 26 and is further communicated as an instance of an analog input (an instance of AI 707) to Process Control Computer 71 where a process variable within Process Control Computer 71 subsequently contains the current value of the measurement of the rate of flow for the distillation tower overhead stream 26, SS26_FIELD represents the current value of the measurement of the rate of flow for the distillation tower overhead stream 26, SS_EST represents the reconciled estimate of the rate of flow for the distillation tower overhead stream 26, and DELTA_SS26 represents the difference between SS26_EST and SS26_FIELD for the distillation tower overhead stream 26.

The following equation is therefore representative of the distillation tower overhead stream 26:

$$SS26\_EST = SS26\_FIELD + DELTA\_SS26 \quad \text{Equation 617}$$

For separation tower overhead stream flow measurement 204 which measures the rate of flow for the separation tower overhead stream 27 and is further communicated as an instance of an analog input (an instance of AI 707) to Process Control Computer 71 where a process variable within Process Control Computer 71 subsequently contains the current value of the measurement of the rate of flow for the separation tower overhead stream 27, SS27_FIELD represents the current value of the measurement of the rate of flow for the separation tower overhead stream 27, SS27_EST represents the reconciled estimate of the rate of flow for the separation tower overhead stream 27, and DELTA_SS27 represents the difference between SS27_EST and SS27_FIELD for the separation tower overhead stream 27.

The following equation is therefore representative of the separation tower overhead stream 27:

$$SS27\_EST = SS27\_FIELD + DELTA\_SS27 \quad \text{Equation 618}$$

With reference to the example and the nodal structuring step 55, the appropriate nodal characterization 29 of FIG. 4 represents a sufficient characterization of the manufacturing system 70 depicted in the separations system flow chart 208 of FIG. 2 to enable reconciliation model formulation in order to reconcile the flows related to feed stream flow measurement 201, separation tower bottoms stream flow measurement 202, distillation tower bottoms stream flow measurement 203, separation tower overhead stream flow measurement 204, and distillation tower overhead stream flow measurement 205 into a comprehensively reconciled set of flows which can then be further used in parameter estimation and economic modeling related to the optimizing system 73.

With reference to the example and balance equation writing step 61, the following balance equations would be written for the nodes in the appropriate nodal characterization 29 of FIG. 4:

For the node 41, a balance of the feed stream 23, the distillation tower bottoms stream 24, the separation tower bottoms stream 25, and the distillation tower overhead stream 26 yields:

$$SS23\_EST + SS25\_EST\_SS24\_EST\_SS26\_EST = 0 \quad \text{Equation 619}$$

Or, expanding Equation 619 with respect to Equations Equation 614–Equation 617, yields Equation 620:

$$(SS23\_FIELD + DELTA\_SS23) + (SS25\_FIELD + DELTA\_SS25)\_$$
$$(SS24\_FIELD + DELTA\_SS24)\_$$
$$(SS26\_FIELD + DELTA\_SS26) = 0$$

For the node 42, a balance of the distillation tower bottoms stream 24, the separation tower bottoms stream 25, and the separation tower overhead stream 27 yields:

$$SS24\_EST\_SS25\_EST\_SS27\_EST = 0 \quad \text{Equation 621}$$

Or, expanding Equation 621 with respect to Equations Equation 615, Equation 616, and Equation 618, yields Equation 622:

$$(SS24\_FIELD + DELTA\_SS24) + (SS25\_FIELD + DELTA\_SS25)\_$$
$$(SS27\_FIELD + DELTA\_SS27) = 0$$

With reference to the example and estimated stream variable definition step 62, SS23_FIELD, SS24_FIELD, SS25_FIELD, SS26_FIELD, and SS27_FIELD are used from Process Control Computer 71 to be, respectively, the measurements of the feed stream 23, the distillation tower bottoms stream 24, the separation tower bottoms stream 25, the distillation tower overhead stream 26, and the separation tower overhead stream 27 in each cycle of dynamic execution of the optimizing system 73. The locations of these variables within the LOGIC 702 in Process Control Computer 71 are entered into data to read from PCC 809 within Optimizing Reference Models and Schema 801.

With reference to the example and reconciliation objective function definition step 63, the data reconciliation objective function for the example is:

Equation 623: $(DELTA\_SS23 * DELTA\_SS23) +$
$(DELTA\_SS24 * DELTA\_SS24) + (DELTA\_SS25 * DELTA\_SS25) +$
$(DELTA\_SS26 * DELTA\_SS26) + (DELTA\_SS27 * DELTA\_SS27)$ With reference to the example and reconciliation model Lagrangian Multiplier definition step 64, LAMBDA41 is defined as the Lagrangian Multiplier to reference the mass balance equation 621 on node 41, and LAMBDA42 is defined as the Lagrangian Multiplier to reference the mass balance equation 622 on node 42.

With reference to the example and reconciliation model Lagrangian expansion step 65

Equation 624: $LAGRANGIAN =$
$(DELTA\_SS23 * DELTA\_SS23)(DELTA\_SS24 * DELTA\_SS24)$
$(DELTA\_SS25 * DELTA\_SS25)(DELTA\_SS26 * DELTA\_SS26)$
$(DELTA\_SS27 * DELTA\_SS27)\_ LAMBDA41 *$
$(SS23\_EST + SS25\_EST\_SS24\_EST\_SS26\_EST)\_$
$LAMBDA42 * (SS24\_EST\_SS25\_EST\_SS27\_EST)$ The foregoing example demonstrates the step by step development of the modeling equations necessary to formulate a reconciliation model into pseudo code from the theoretical basis used in the present invention. The equations of the formulated optimized reconciliation model are input into optimizing system 73. Steady state operation is presumed in the formulated optimized reconciliation model; in the description of the invention, steady state status determination is treated as an area of modeling in its own right; however, the definition of steady state status can also be alternatively virtually considered as a part of the more general and expanded data reconciliation decision process.

Referring now to FIG. 7, FIG. 7 depicts the optimizing system 73 of the present invention and its relationship to other entities in a general overall manufacturing system 715. Manufacturing system 70 is an apparatus which is at least a part of a general overall manufacturing system wherein the general overall manufacturing system manufactures at least one useful article. In addition to being a manufacturing system, the manufacturing system 70 is,alternatively, broadly defined herein to include other systems (such as, without limitation, an aircraft, a ship, a truck, a nuclear power station, an automobile, a turbine, a chemical manufacturing system, or a spacecraft) which perform at least one useful function. Process Control Computer 71 and its associated LOGIC 702 (within Process Control Computer 71 and executing therein as an associated process using CPU 701 within Process Control Computer 71) effect control of the manufacturing system 70 through the transmission of at least one Analog Output (A0) 710 and at least one Digital Output (D0) 709. In one alternative embodiment, control is effected by transmission of at least one Analog Output (A0) 710. In another alternative embodiment, control is effected by transmission of at least one Digital Output (D0) 709. Process Control Computer 71 and its associated LOGIC 702 (within Process Control Computer 71 and executing therein as an associated process using CPU 701 within Process Control Computer 71) measure and evaluate the status of at least two attributes associated with the manufacturing system 70 through the reception of at least one Analog Input (AI) 707 and at least one Digital Input (DI) 708. In one alternative embodiment, Process Control Computer 71 and its associated LOGIC 702 (within Process Control Computer 71 and executing therein as an associated process using CPU 701 within Process Control Computer 71) measure and evaluate the status of at least one attribute associated with the manufacturing system 70 through the reception of at least one Analog Input (AI) 707. In another alternative embodiment, Process Control Computer 71 and its associated LOGIC 702 (within Process Control Computer 71 and executing therein as an associated process using CPU 701 within Process Control Computer 71) measure and evaluate the status of at least one attribute associated with the manufacturing system 70 through the reception of at least one Digital Input (DI) 708.

In a controlled system such as manufacturing system 70 where control is implemented using Process Control Computer 71, various attributes of manufacturing system 70 are monitored to determine the status of the implemented and executing manufacturing system at any point in time. To this end, sensors and transducers (not shown) within the manufacturing system 70 are used to generate sensor output signals which represent the values of various attributes (such as temperature, pressure, flow rate, RPM, and vessel level) characteristic of the manufacturing system 70. A sensor is a device which is constructed to respond to a given event, occurrence, or state and to produce an accordingly predetermined sensor output signal representing the aforementioned state, occurrence, or event as either an analog signal or a digital signal (or, in an abstracted algebraic sense, as a numeric or Boolean quantity). Feed stream flow measurement 201, separation tower bottoms stream flow measurement 202, distillation tower bottoms stream flow measurement 203, separation tower overhead stream flow measurement 204, and distillation tower overhead stream flow measurement 205 are all examples of sensors in the context of the flow chart representing two major unit operations in a chemical facility shown in the separations system flow chart 208 of FIG. 2. The term "sensor" also includes, as a further component, a device which is designated as an interactive measuring device (a transducer) which is in physical contact with the manufacturing system 70, and this general device is hereinafter considered as being incorporated into the sensor. The sensor output signal is transferred to Process Control Computer 71 through a communication method which is alternatively based on electrical, optical, or radio-frequency means. Within the context of process control, the sensor output signal from the sensor then is then further transferred into a process variable which is the representation of the sensor output signal as a logically identified quantity within and for use by Process Control Computer 71 as it executes decisions for the process executed in the manufacturing system 70. The process executed in the manufacturing system 70 derives its decision base from real-time execution of a process control program also resident within Process Control Computer 71.

Outputs from the Process Control Computer 71 are communicated as Process Control Computer 71 output signals to the manufacturing system 70 from Process Control Computer 71. The outputs from Process Control Computer 71 are used by control elements to modify the environment of the manufacturing system 70 (for instance, the alteration of the effective inside cross sectional opening in a pipe caused by the partial closing of an analog control valve). To this end, control elements (not shown but which should be apparent) within the manufacturing system 70 are used to receive output signals from Process Control Computer 71. Process Control Computer 71 output signals are transmissions which represent instances of process variable values within Process Control Computer 71. Process Control Computer 71 output signals further interact with operating various control elements (such as pumps, block valves, and control valves) within the manufacturing system 70 to modify the environment and attributes of the manufacturing system 70. A control element is a device which is constructed to respond to an output signal from Process Control Computer 71 to produce an accordingly predetermined operation representing the strength of the output signal. The output signal is transferred from Process Control Computer 71 to a control element within the manufacturing system 70 through a communication method which could be either based on electrical, optical, or radio-frequency means. An output signal is communicated from Process Control Computer 71 to the manufacturing system 70 as either an Analog Output (A0) 710 or a Digital Output (D0) 709, depending upon the type of sensor utilized.

Instances of values of process variables within Process Control Computer 71 are transferred to Communication Interface 72 and instances of values of process variables from Communication Interface 72 are transferred to Process Control Computer 71 through the use of a communication method which is alternatively based on electrical, optical, or radio-frequency means. Communication Interface 72 and its associated LOGIC 703 (within Communication Interface 72 and executing as an associated process using CPU 704 within Communication Interface 72) provides an interface to enable various queuing, buffering, and communication management functionality to effect communication between Process Control Computer 71 and other associated systems. In one alternative embodiment, the functionality of communication Interface 72 and its associated CPU 704 and LOGIC 703 are incorporated into Process Control Computer 71 and its associated CPU 701 and LOGIC 702. In a second alternative embodiment, the functionality of Communication Interface 72 and its associated CPU 704 and LOGIC 703 are incorporated into Optimizing System 73 and its associated CPU 705 and LOGIC 706. In a third alternative embodiment, Process Control Computer 71 incorporates Optimizing System 73, CPU 705, LOGIC 706, Communication Interface 72, CPU 704, and LOGIC 703.

Optimizing system 73, using its associated CPU 705 and LOGIC 706, provides the unique functionality (to the overall system related to and including the manufacturing system 70) which is the subject of the present invention. Instances of values of process variables from Communication Interface 72 are transferred to optimizing system 73 via Read PCS Data Vector 76. Instances of values of process variables from optimizing system 73 are transferred to Communication Interface 72 via Write to PCS Data Vector 75. Write to PCS Data Vector 75 and Read PCS Data Vector 76 are physically implemented through the use of a communication method which could be alternatively based on electrical, optical, or radio-frequency means. In a further logically symbolized and characterized context, Write to PCS Data Vector 75 and Read PCS Data Vector 76 are usually serial data streams further comprising at least one data message. The functionality of optimizing system 73 is further described in this specification in conjunction with other figures.

CPU 701 within the Process Control Computer 71, CPU 704 within Communication Interface 72, and CPU 705 within Optimizing System 73 are central processing units which execute LOGIC 702 within Process Control Computer 71, LOGIC 703 within Communication Interface 72, and LOGIC 706 within Optimizing System 73, respectively.

Process Control Computer 71, Communication Interface 72, and optimizing system 73 also optionally incorporate and utilize various display means, data storage means, and communications means to facilitate the useful operation and execution of these elements. In an alternative embodiment, CPU 701 within the Process Control Computer 71, CPU 704 within Communication Interface 72, and CPU 705 within Optimizing System 73 are combined into one central processing unit, and LOGIC 702 within Process Control Computer 71, LOGIC 703 within Communication Interface 72, and LOGIC 706 within Optimizing System 73 are combined into one logically identified virtual entity. In the alternative embodiment, the functionality of Optimizing System 73, Communication Interface 72, and Process Control Computer 71 is combined into one virtual entity. The characterization of the general overall manufacturing system 715 of FIG. 7 is the embodiment of the invention representing an efficient deployment of process control technology and systems.

In the preferred embodiment, the computer hardware portions of the Optimizing System 73 and computer monitor 74 of the present invention are a model 4200 VAX microcomputer with at least 32 megabytes of RAM, an associated hard disk drive having at least 650 megabytes of storage capacity, and a graphical interface such as a VT340 with an extended keyboard and a mouse. The computer hardware is all available from Digital Equipment Corporation of Maynard, Mass.

Computer monitor 74 interacts with optimizing system 73 to provide an interface for a human operator 78 to access information within optimizing system 73 and to input information into optimizing system 73.

Monetary Values 77 are input automatically into optimizing system 73 from an electronic system such as a commodity trading floor computer, a business computer system interacting with world or local markets, or other such computerized system which is available to electronically communicate recent prices (monetary values) of, without limitation, products of manufacturing system 70, and/or resources used by manufacturing system 70. In an alternative embodiment, the human operator 78 could periodically communicate prices of either products of the manufacturing system 70 or resources used by the manufacturing system 70 to the optimizing system 73 (in a manner described in another part of this specification). Monetary Values 77 can be (without limitation) market prices, prices, computed accounting values, contractual prices, or conditional prices. The prices can be communicated either using actual price values (within the context of a national currency) or any proportioned system which references prices on some relative (rather than absolute) basis.

Figure 8A:
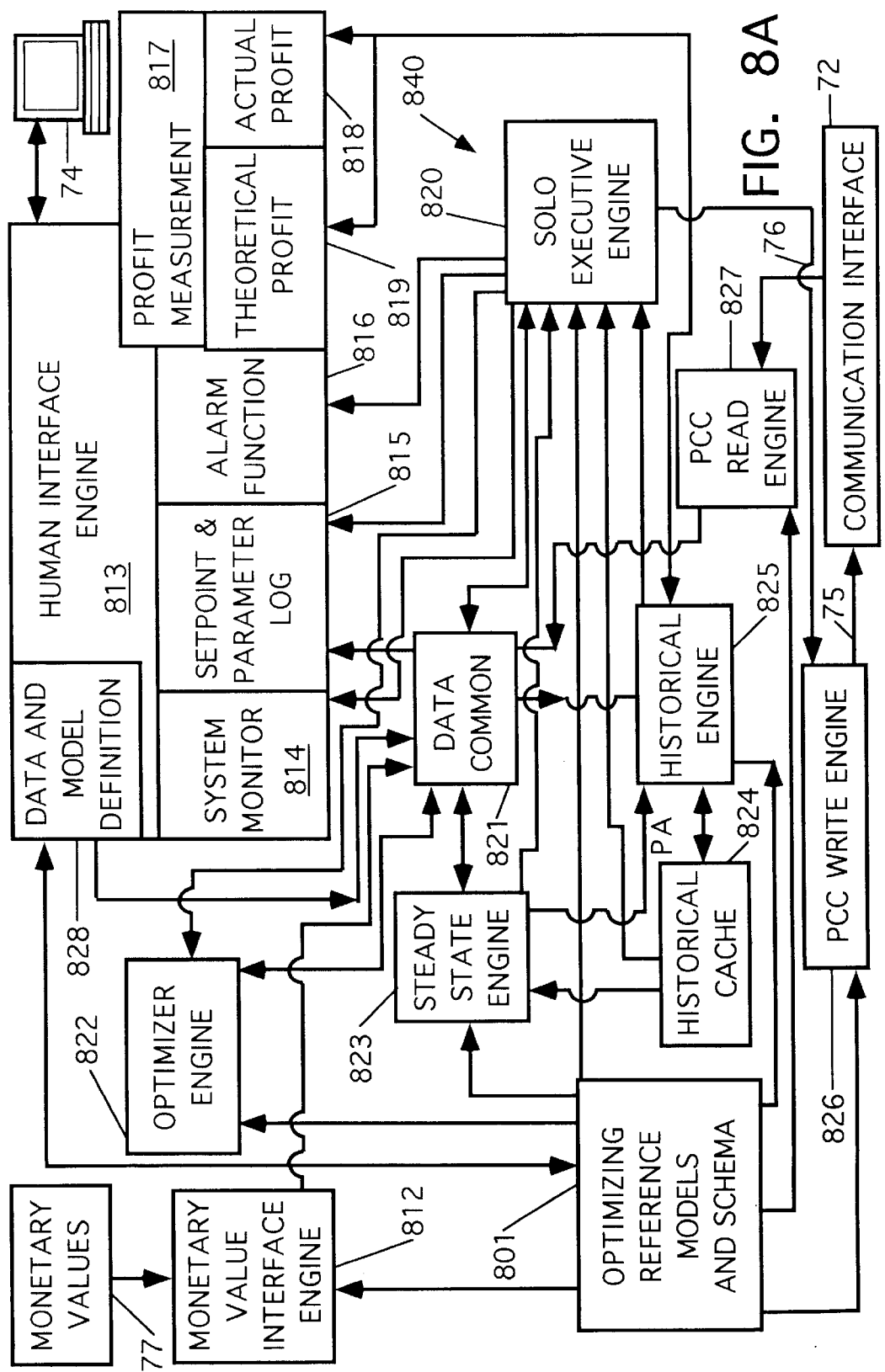
FIGS. 8A and 8B depict design level process block flow diagrams for the generic logical components in the present invention.
Figure 8B:
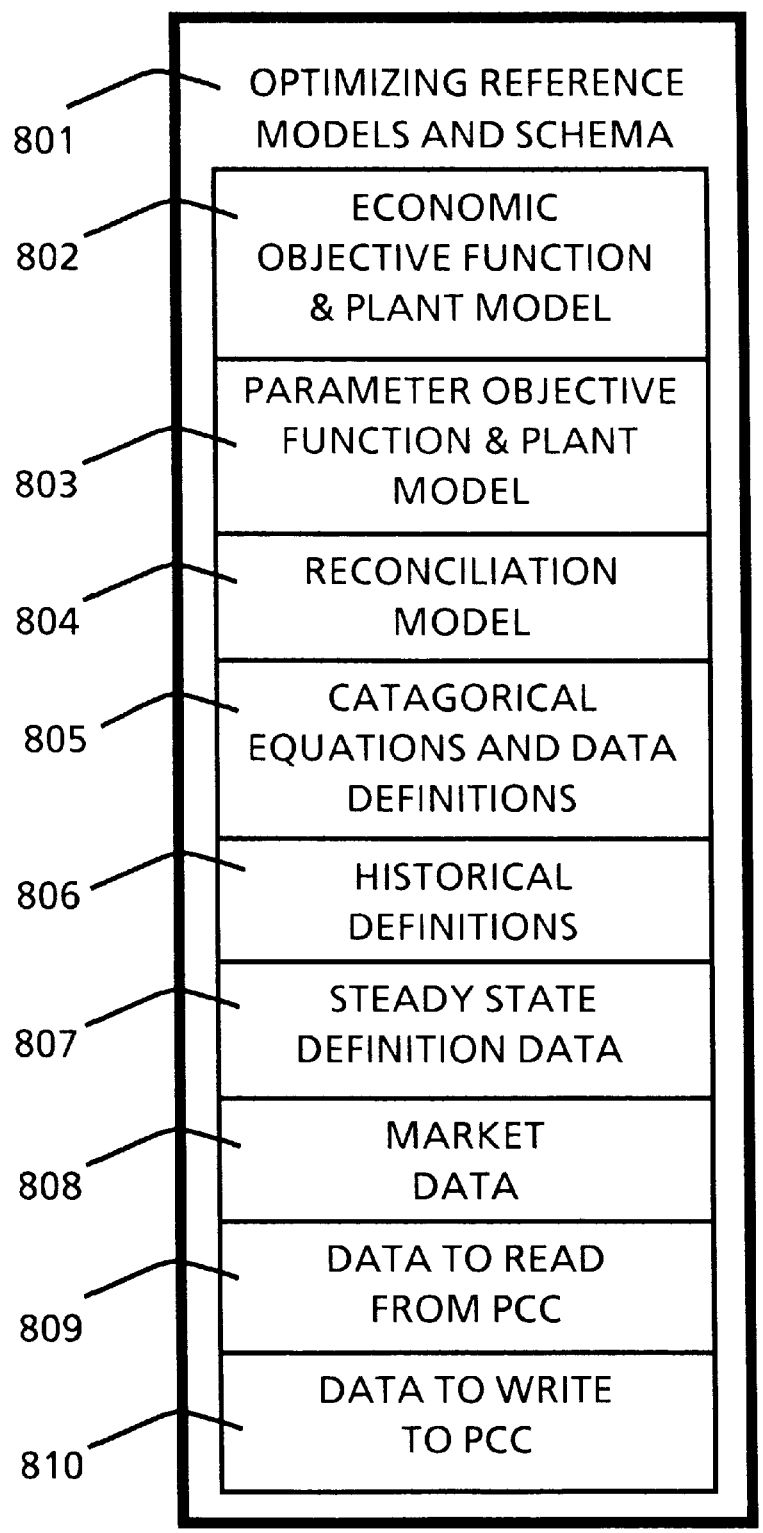

Referring now to FIG. 8A and FIG. 8B, FIGS. 8A and 8B depict the virtual functional and data structural elements 840 within the optimizing system 73 and their relationship to the (previously discussed) elements Monetary Values 77, computer monitor 74, Communication Interface 72, Write to PCS Data Vector 75, and Read PCS Data Vector 76. Although each virtual functional element and data structural element is considered by the applicants to be necessary to achieve full use of the invention, alternative source code and machine code groupings derived from the virtual functional and data structural elements 840 depicted in FIGS. 8A and 8B can be formulated depending upon design considerations related to reduction to practice and requirements of specific computers. FIGS. 8A and 8B therefore also outline a design level process block flow diagram of the application software for optimizing system 73. FIGS. 8A and 8B further virtually help to characterize the application part of the LOGIC 706 within Optimizing System 73. LOGIC 706 within Optimizing System 73 further comprises an appropriate operating system and, optionally, at least one associated functional operations shell (appropriate to CPU 705 within Optimizing System 73). FIG. 8B is an expansion of the Optimizing Reference Models and Schema 801 element within FIG. 8A. FIG. 8A designates some elements as "engines"; in this regard, "engines" generally reference virtual functional elements within optimizing system 73 which primarily perform tasks which read data, write data, calculate data, and perform decision operations related to data. In this regard, "Engines" usually acquire data from one source or cache or a plurality of sources or caches, act upon the set of acquired data to define new data in a more useful form, and output the new data to either a new data cache or device. "Engines" optionally provide some limited data storage related to indicators, counters, and pointers, but most data storage within optimizing system 73 is facilitated within Optimizing Reference Models and Schema 801, Data Common 821, and Historical Cache 824. Optimizing Reference Models and Schema 801, Data Common 821, and Historical Cache 824 are data structural elements which hold data and information related to the use of optimizing system 73 in a specific instance. These data structural elements are primarily dedicated to holding data instead of performing tasks on data. "Engines" further comprise logic within LOGIC 706 wherein each engine performs a generally identified function. Data structural elements further comprise logic within LOGIC 706 wherein each data structural element contains a generally identified stored set of information.

FIG. 8A depicts the overall relationship between the the virtual functional and data structural elements 840 within the optimizing system 73.

FIG. 8B depicts further detail regarding data structural elements within the general Optimizing Reference Models and Schema 801 data structural element.

The monetary value interface engine 812 is the virtual functional element within optimizing system 73 that references monetary value definition data 808 within Optimizing Reference Models and Schema 801 to identify and read the specific monetary values of products and resources within Monetary Values 77 which need to be queried on a periodic basis to maintain sufficiently accurate economic value data regarding products of the manufacturing system 70 and resources needed by the manufacturing system 70. The specific monetary values of products and resources which are periodically acquired by the monetary value interface engine 812 are written and input into the Data Common 821 for further reference by optimizing system 73.

Optimizing Reference Models and Schema 801 holds the models and data identifiers (logical address indicators) which enable the optimizing system 73 to be customized to a particular application for a specific manufacturing system. Models and data identifiers appropriate to the particular application are written and input into Optimizing Reference Models and Schema 801 from the data and model definition 828 functional block within human interface engine 813, and the models and data identifiers within Optimizing Reference Models and Schema 801 are read, viewed, modified, and deleted from the data and model definition 828 functional block within human interface engine 813. Monetary value interface engine 812, human interface engine 813, steady state engine 823, historical engine 825, PCC write engine 826, PCC read engine 827, and SOLO Executive Engine 820 all read and reference the models and data identifiers within Optimizing Reference Models and Schema 801 as they execute their respective tasks in implementing the functionality of optimizing system 73.

Optimizer engine 822 solves any formulated optimization problem utilized in optimizing system 73 upon command from SOLO Executive Engine 820. (SOLO is an acronym for System for On-Line Optimization). In the preferred embodiment, the optimizer engine 822 is a commercially available software product known as SPEEDUP which is available from Aspentech Inc. of Cambridge, Mass. As one of its features, SPEEDUP executes an SRQP solution for a formulated optimization problem such as those utilized in the present invention. In alternative embodiments, optimizer engine 822 executes other formulated optimization problem solution methods as referenced in the background section of this specification. Optimizer engine 822 executes solutions to formulated optimization problems upon reading a request from SOLO Executive Engine 820. During the execution of its task, optimizer engine 822 reads and references information and data contained in the initial prompting request from SOLO Executive Engine 820; it also reads and references data contained in Data Common 821. Additionally, during execution of its task, optimizer engine 822 reads and references formulated models, data identifiers, and certain data resident within Optimizing Reference Models and Schema 801. Especially relevant in this regard are formulated models, data identifiers, and certain data resident within economic objective function and plant model 802, parameter objective function and plant model 803, and Reconciliation Model 804. The results from completed optimization solution cycles are written and stored by optimizer engine 822 into Data Common 821 for further reading and reference by other engines in optimizing system 73.

Steady state engine 823 is used by optimizing system 73 to determine the steady state status of the process executing within manufacturing system 70. In this regard, steady state engine 823 reads and references data values in Data Common 821 which data values indicate the value and status of instances of values of selected process variables from Process Control Computer 71. Steady state engine 823 reads and references other data values in Data Common 821 which indicate statuses and values relevant to other processes executing within optimizing system 73. Steady state engine 823 also reads and references historical data in Historical Cache 824 which historical data indicate the historical behavior of certain statuses and values relevant to both selected process variable data values from Process Control Computer 71 and other processes executing within optimizing system 73. Steady state engine 823 reads and references formulated models, data identifiers, and certain data resident within Optimizing Reference Models and Schema 801. Especially relevant in this regard are formulated models, data identifiers, and certain data resident within Steady State Definition Data 807 of Optimizing Reference Models and Schema 801. The relevance of steady state determination in the present invention is discussed in another part of this specification. Steady state engine 823 writes and outputs data values to Data Common 821 and writes and outputs certain data values and status indicators directly to historical engine 825.

Historical Cache 824 is used as a repository of historical data used by optimizing system 73. Historical data stored, updated, modified, and deleted in Historical Cache 824 indicates historical behavior of certain statuses and values relevant to both selected process variables from Process Control Computer 71 and other processes executing within optimizing system 73. Other data in Historical Cache 824 is alternatively used as an index or locating reference for historical data in Historical Cache 824. Historical Cache 824 receives historical data and other data from historical engine 825 and has its contents modified, deleted, and otherwise updated by historical engine 825. Historical data and other data in Historical Cache 824 are used and read by historical engine 825, steady state engine 823, and SOLO Executive Engine 820 in execution of their respective tasks. Within the context of any specific logically identified status, value, and process variable data value, historical data is a listing of a set of the values or statuses that have existed at different times wherein each logically referenced status or value has an associated set of individual historical values wherein each individual historical value is further associated with a time tag. As an example, consider a temperature reading which is identified as a process variable in Process Control Computer 71 (and a data value in Data Common 821) known as Analog Input (301) or, in abbreviated form, AI301. AI301 has a value in Process Control Computer 71 of 100 degrees Celsius at 0800 hours, 110 degrees Celsius at 0830 hours, and 120 degrees Celsius at 0900 hours. The historical engine 825 acquires the different historical values for AI301 from Data Common 821 (following transmission of AI301 related information into Data Common 821 by PCC read engine 827) at the respective times indicated in historical definitions 806 and stores a set made up of 3 individual historical values regarding this elementary example in Historical Cache 824; the first historical value in the set is 0800100, the second historical value in the set is 0830110, and the third historical value in the set is 0900120. The various engines executing within optimizing system 73 unbundle the data stream by assigning the first 4 digits to be the time tag and the second three digits to be the historical value of AI301 (related to the time tag) to study or characterize the history of AI301 as they execute their respective tasks. The history storage feature of the optimizing system 73 enables decisions to incorporate an understanding of the time functional behavior of any data value relevant to selected process variables from Process Control Computer 71 and other processes executing within optimizing system 73.

Historical engine 825 is the virtual functional element within optimizing system 73 which manages functionality to retain historical data within a historical context for Historical Cache 824. As previously discussed with respect to Historical Cache 824, the functional purpose of historical engine 825 and its associated Historical Cache 824 is to store, update, modify, and delete data indicating historical behavior of certain statuses and values relevant to both selected process variables from Process Control Computer 71 and other processes executing within optimizing system 73. Other data managed by historical engine 825 in Historical Cache 824 is alternatively read and used as an index or locating reference for historical data in Historical Cache 824. Historical engine 825 therefore reads and writes historical data and other data with respect to Historical Cache 824, and it further reads data values in Data Common 821. The historical information models and historical data identifiers (logical address indicators), which enable the optimizing system 73 to be customized to a particular application for a specific manufacturing system, are located in historical definitions 806 within Optimizing Reference Models and Schema 801; this information is read and referenced by historical engine 825 in the execution of its tasks.

The PCC write engine 826 (PCC is an abbreviation for Process Control Computer) functions to periodically input and write setpoints into Communication Interface 72 (via Write to PCS Data Vector 75) for further transmission into Process Control Computer 71. The PCC write engine 826 identifies data which is to be transferred to Communication Interface 72 by reading logically referenced status or value identifiers from the data structure Data to Write to PCC 810 within Optimizing Reference Models and Schema 801. PCC write engine 826 has its own data storage area to hold setpoints written from SOLO Executive Engine 820. In an alternative embodiment, PCC write engine 826 reads and references setpoints in Data Common 821 upon notification from SOLO Executive Engine 820 or, alternatively, upon reading and acquisition of a status indicator from Data Common 821 indicating that a setpoint transmission to Communication Interface 72 (and subsequently to Process Control Computer 71) should be executed.

Data Common 821 holds the data values which depict, at any point in time, status and value measurements relevant to the use of optimizing system 73 in a particular application for a specific manufacturing system. As a general characterization, data values in Data Common 821 change fairly frequently as different engines perform write operations to Data Common 821; data referenced and read from Data Common 821 is usually not time tagged and represents real-time data (within the real-time context of optimizing system 73) instead of the historically oriented data contained within Historical Cache 824. Data and Model definition 828 functional block within human interface engine 813 enables read and write access to data within Data Common 821 to facilitate human intervention into the common. Data Common 821 is established by the SOLO Executive Engine 820 upon startup of the optimizing system 73, and it is open to access for both read and write operations by the various engines executing tasks within optimizing system 73. Status and value measurements within Data Common 821 are be stored, updated, modified, and deleted by steady state engine 823, SOLO Executive Engine 820, PCC read engine 827, data and model definition 828 functional block within human interface engine 813, monetary value interface engine 812, and optimizer engine 822. Steady state engine 823, SOLO Executive Engine 820, data and model definition 828 functional block within human interface engine 813, monetary value interface engine 812, Setpoint and Parameter Log 815 within human interface engine 813, historical engine 825, optimizer engine 822, and (optionally in an alternative embodiment) PCC write engine 826 read and reference data within Data Common 821.

PCC read engine 827 (PCC is an abbreviation for Process Control Computer) functions to periodically read data from Communication Interface 72 (via Read PCS Data Vector 76) to access the values of process variables and statuses within Process Control Computer 71. PCC read engine 827 identifies data which is to be retrieved by reading logically referenced status or value identifiers in Data to Read from PCC 809 within Optimizing Reference Models and Schema 801. PCC read engine 827 writes statuses and values retrieved from Communication Interface 72 as data values into Data Common 821.

Write to PCS Data Vector 75 is physically implemented through the use of a communication method which is alternatively based on either electrical, optical, or radio-frequency means. In a logically symbolized context, Write to PCS Data Vector 75 is a serial data stream which further comprises a data message. Virtually, Write to PCS Data Vector 75 is the path which is used by optimizing system 73 to transmit setpoints to Communication Interface 72; the setpoints are further transmitted from Communication Interface 72 to Process Control Computer 71 to enable the results of optimizing system 73 to effect economically efficient operation of the manufacturing system 70.

Read PCS Data Vector 76 is physically implemented through the use of a communication method which is alternatively based on either electrical, optical, or radio-frequency means. In a logically symbolized context, Read PCS Data Vector 76 is a serial data stream which further comprises a data message. Virtually, Read PCS Data Vector 76 is the path which is used by optimizing system 73 to acquire values of process variables and statuses from Process Control Computer 71 via Communication Interface 72. The values of process variables and statuses are then input as data values into Data Common 821.

Communication Interface 72 was previously discussed with respect to Figure to general overall manufacturing system 715 of FIG. 7.

SOLO Executive Engine 820 is the virtual functional element within optimizing system 73 that implements the overall decision process and method which examines monetary value data, process variables and statuses, and other data values within Data Common 821 within the context of formulated models and schema resident within Data Common 821 to periodically determine the economically effective mode of operation for the manufacturing system 70. SOLO Executive Engine 820 reads data values, other data, and historical data values (as appropriate) from Data Common 821, Historical Cache 824, historical engine 825, Optimizing Reference Models and Schema 801, and steady state engine 823 in performance of its tasks to acquire data and evaluate the status of supporting engines within optimizing system 73. SOLO Executive Engine 820 effects operation and control of optimizer engine 822 and outputs (writes) information to Data Common 821, system monitor 814 within human interface engine 813, Setpoint and Parameter Log 815 within human interface engine 813, and alarm function 816 within human interface engine 813. The functionality of SOLO Executive Engine 820 is further described in this specification in conjunction with other figures in this specification.

Human interface engine 813 provides a number of different functions to enable the interaction of a human operator 78 to various data structures and virtual functional elements within optimizing system 73. The various key functions are separately discussed. Human interface engine 813 interacts with computer monitor 74 to enable human operator 78 to use an interactive computer monitor to access the information relevant to the various functions. Human operator 78 uses an interactive computer monitor to access the information relevant to the various functions by reading information that human interface engine 813 writes to computer monitor 74 and by inputting information via mechanical means which is then read by human interface engine 813.

One function available through human interface engine 813 is the data and model definition 828 functional block. This functional block enables interaction between the human operator 78 and all data structures within Optimizing Reference Models and Schema 801 to enable configuration of optimizing system 73 for a particular application for a specific manufacturing system or a system performing some other useful function. Models and data identifiers appropriate to the particular application are written and input into Optimizing Reference Models and Schema 801 from the data and model definition 828 functional block within human interface engine 813, and the models and data identifiers within Optimizing Reference Models and Schema 801 are read by the data and model definition 828 functional block within human interface engine 813 when viewed, modified, and/or deleted by human operator 78. Data values in Data Common 821 are also read by the data and model definition 828 functional block within human interface engine 813 when viewed, modified, and/or deleted by human operator 78. Modification and deletion operations are written by data and model definition 828 functional block within human interface engine 813 to Data Common 821. One example of the value of this feature is that monetary values are written and input into Data Common 821 by human operator 78 through the use of computer monitor 74 and data and model definition 828 functional block within human interface engine 813 if the link from Monetary Values 77 to monetary value interface engine 812 is non-functional.

Another function available through human interface engine 813 is the system monitor 814. This functional block enables interaction between the human operator 78 and system level information regarding the status of various engines and data structures within Optimizing Reference Models and Schema 801. Secondary features of system monitor 814 within human interface engine 813 include the ability to directly invoke standard utility monitoring functions available in the operating system of any specific embodiment of the present invention.

Another function available through human interface engine 813 is the setpoint and parameter log 815. This functional block enables interaction between the human operator 78 and a log of key events related to operations of SOLO Executive Engine 820. Setpoint and Parameter Log 815 within human interface engine 813 writes information to computer monitor 74 as appropriate to execute its function. Setpoint and Parameter Log 815 within human interface engine 813 reads information from computer monitor 74 as appropriate to execute its function.

Another function available through human interface engine 813 is the alarm function 816. This functional block enables interaction between the human operator 78 and alarms generated by SOLO Executive Engine 820 alerting the human operator 78 to possible concerns. Alarm function 816 within human interface engine 813 alerts human operator 78 with both textual and aural indicators which are written and output from alarm function 816 within human interface engine 813 to computer monitor 74. In this regard, and with respect to solutions of the formulated data reconciliation problem, optimizing system 73 identifies potential errors in measurement of attributes relating to the manufacturing system 70 by comparison of Lagrangian multipliers (one Lagrangian multiplier per node) to the standard deviations of measurements related to the respective nodes. As previously discussed, each Lagrangian Multiplier is related to the constraint equation around each node used in the formulated optimization problem. A Lagrangian Multiplier therefore represents a sensitivity respecting the degree to which a set of values (measurements within the Process Control Computer 71) involved in one constraint of a formulated reconciliation optimization problem might be plausibly different from the degree to which the other sets of values (also measurements within Process Control Computer 71 involved in the other constraints of the same formulated reconciliation optimization problem) contribute to the overall error in a specific solution of the formulated optimization problem given that the entire set of variables and constraints involved in the generation of the relevant Lagrangian Multipliers is treated as an interactive (and presumably balanced) whole. The least squares objective function illustrated in Equation 607 is alternatively modified wherein the individual components in the objective function ($\Delta S_1^2 + \Delta S_2^2 + \Delta S_3^2$ in Equation 608 of the example given in conjunction with FIG. 6) are multiplied by the reciprocal of the standard deviation (or, alternatively, the variance) obtained during steady state conditions from the historical set of data for any measured data values (acquired over time from process variables within Process Control Computer 71 when Process Control Computer 71 is controlling the manufacturing system 70). This further feature helps to decrease the significance of predictable noise effects in either measurement systems or attributes within the manufacturing system 70. When a Lagrangian multiplier in the solution of the formulated data reconciliation problem deviates unacceptably from a historically expected value, the weighted standard deviations of its related measurement inputs are compared to the Lagrangian multiplier to identify particular measurements that are likely contributors to the magnitude of the subject Lagrangian multiplier. Depending upon a ratio of the weighted standard deviation to the Lagrangian multiplier, an alarm signal is written and input by the SOLO Executive Engine 820 to the alarm function 816 within human interface engine 813 for communication via a subsequent write operation to human operator 78 via computer monitor 74. The human operator 78 responds to the information with appropriate actions to examine the measurement identified by the alarm function 816 within human interface engine 813 and correct defaults within either the relevant sensor or the manufacturing system 70.

Another function available through human interface engine 813 is profit measurement 817. This functional block enables interaction between the human operator and the values computed by optimizing system 73 relating to profitability (economic efficiency) in the operation of the manufacturing system 70 through the use of Process Control Computer 71, Communication Interface 72, and optimizing system 73. In this regard, the human operator 78 examines results (written by profit measurement 817 within human interface engine 813 to computer monitor 74) from recent execution cycles of optimizing system 73 to ascertain the status respecting the rate of improvement regarding economic efficiency in the operation of the manufacturing system 70. Actual profitability and theoretically achievable profitability are computed by SOLO Executive Engine 820 during the solution of the Economic Setpoints Model Solution Step 907. Various data values related to this solution are input to Data Common 821 by SOLO Executive Engine 820, and said data values are subsequently stored by historical engine 825 into Historical Cache 824. Upon request to historical engine 825 by profit measurement 817 within human interface engine 813 via either its associated theoretical profit 819 or actual profit 818 subfunctions, historical engine 825 accesses and reads Historical Cache 824 to retrieve historical data values related to profitability (economic efficiency) and communicates and writes the retrieved historical data values to the appropriate subfunction of profit measurement 817 so that human interface engine 813 displays profitability information to human operator 78 via a write operation to computer monitor 74.

The theoretical profit 819 subfunction of profit measurement 817 within human interface engine 813 relates to the profitability (economic efficiency) achievable given the setpoints computed in a solution cycle of the Economic Setpoints Model Solution Step 907. The actual profit 818 subfunction of profit measurement 817 within human interface engine 813 relates to the profitability (economic efficiency) computed in a solution cycle of the Economic Setpoints Model Solution Step 907 given the process values and statuses from Process Control Computer 71 and monetary values 77 which are represented as data values within Data Common 821 at the time the solution of the Economic Setpoints Model Solution Step 907 is being executed. Profit measurement 817 within human interface engine 813 further compares and combines the data values acquired by the actual profit 818 and theoretical profit 819 subfunctions to present human operator 78 useful information (by writing the data values acquired to computer monitor 74 through human interface engine 813) relevant to the optimizing system 73, Process Control Computer 71, and the manufacturing system 70.

Figure 21:
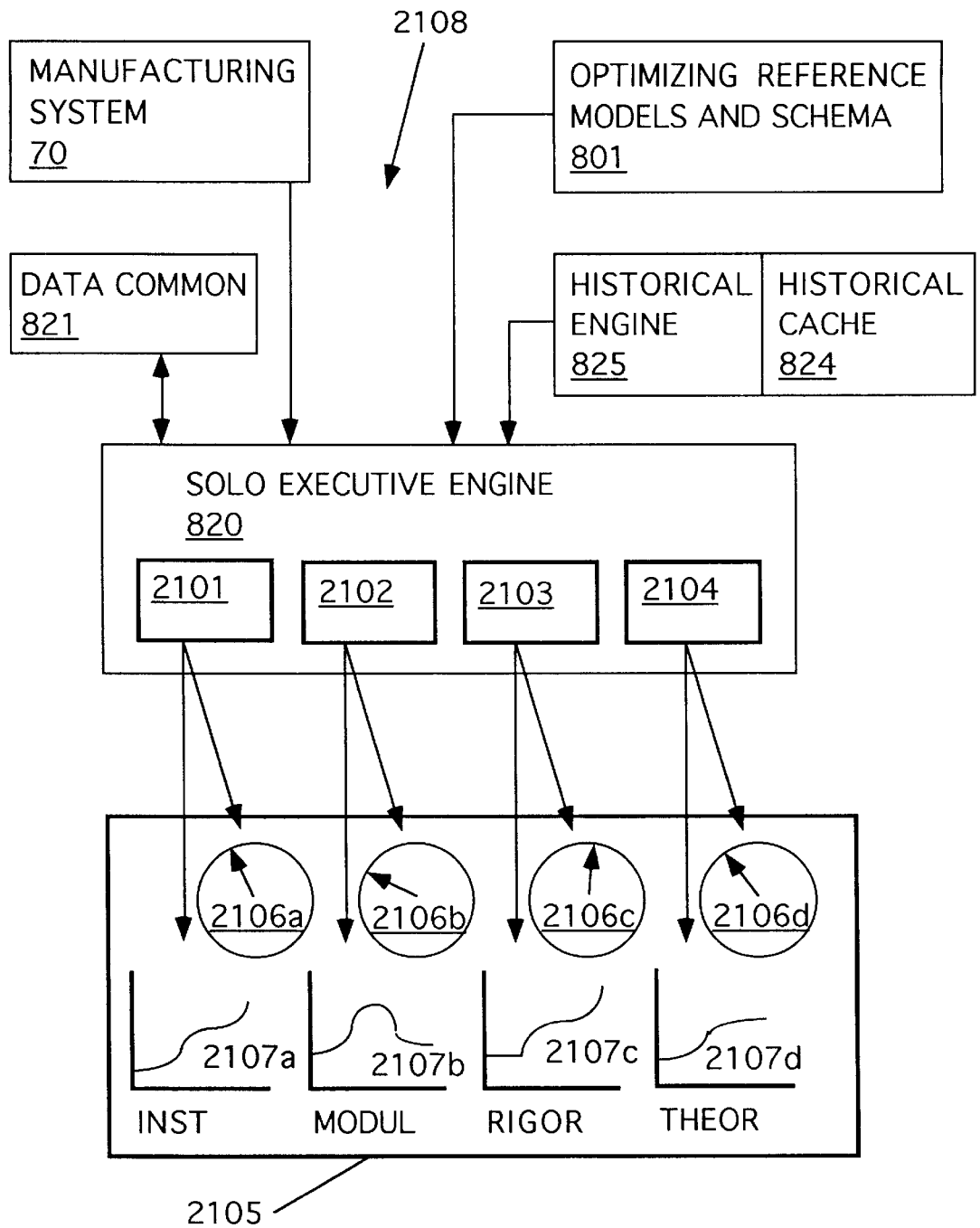
FIG. 21 shows elements of the present invention related to the "profit meter" functionality.
Figure 22:
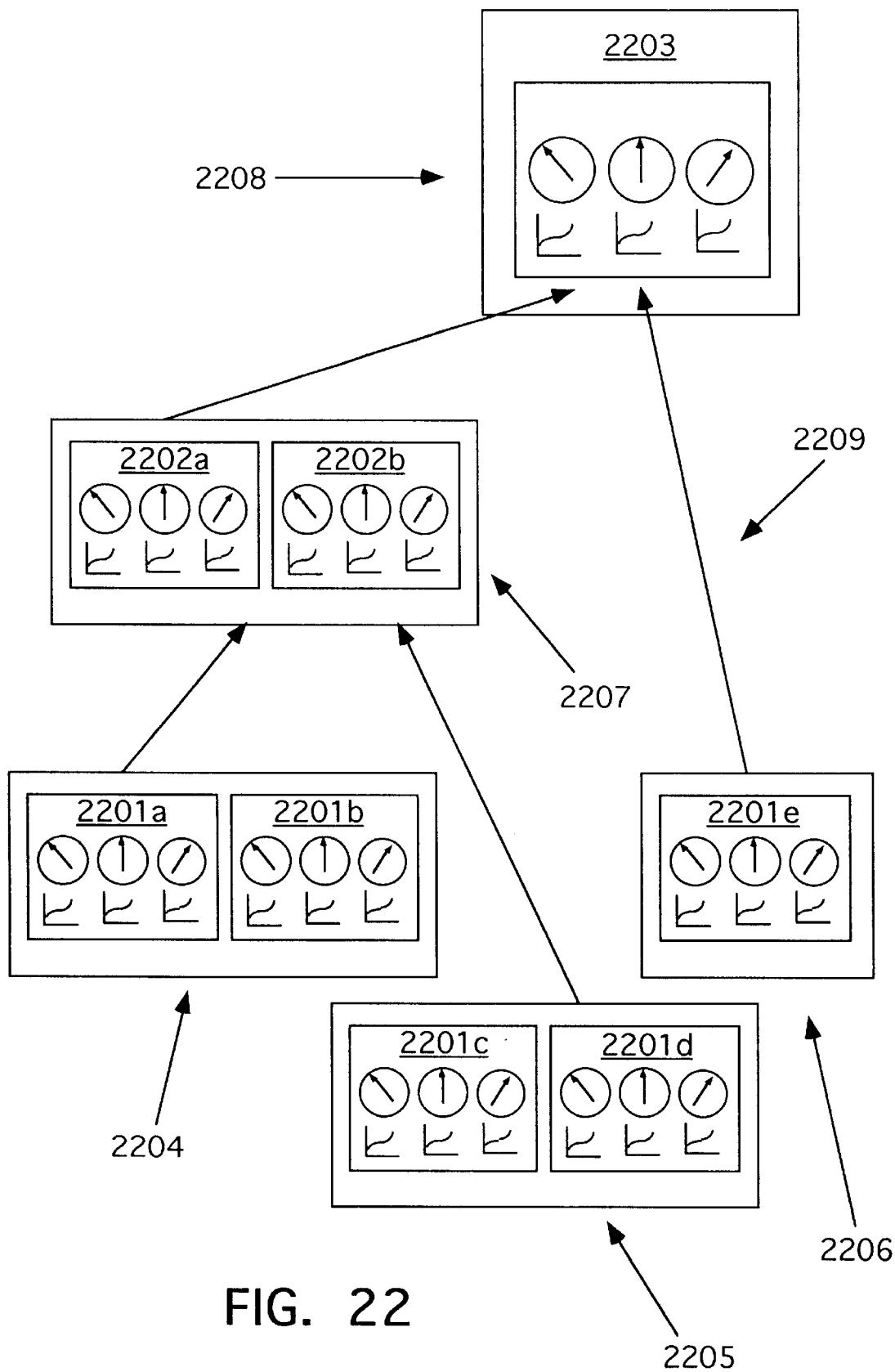
FIG. 22 presents a set of "profit meter" screen displays to show use of the "profit meter" functionality to help in real-time control, monitoring, and optimization of a number of manufacturing plants within a manufacturing division.
Figure 23:
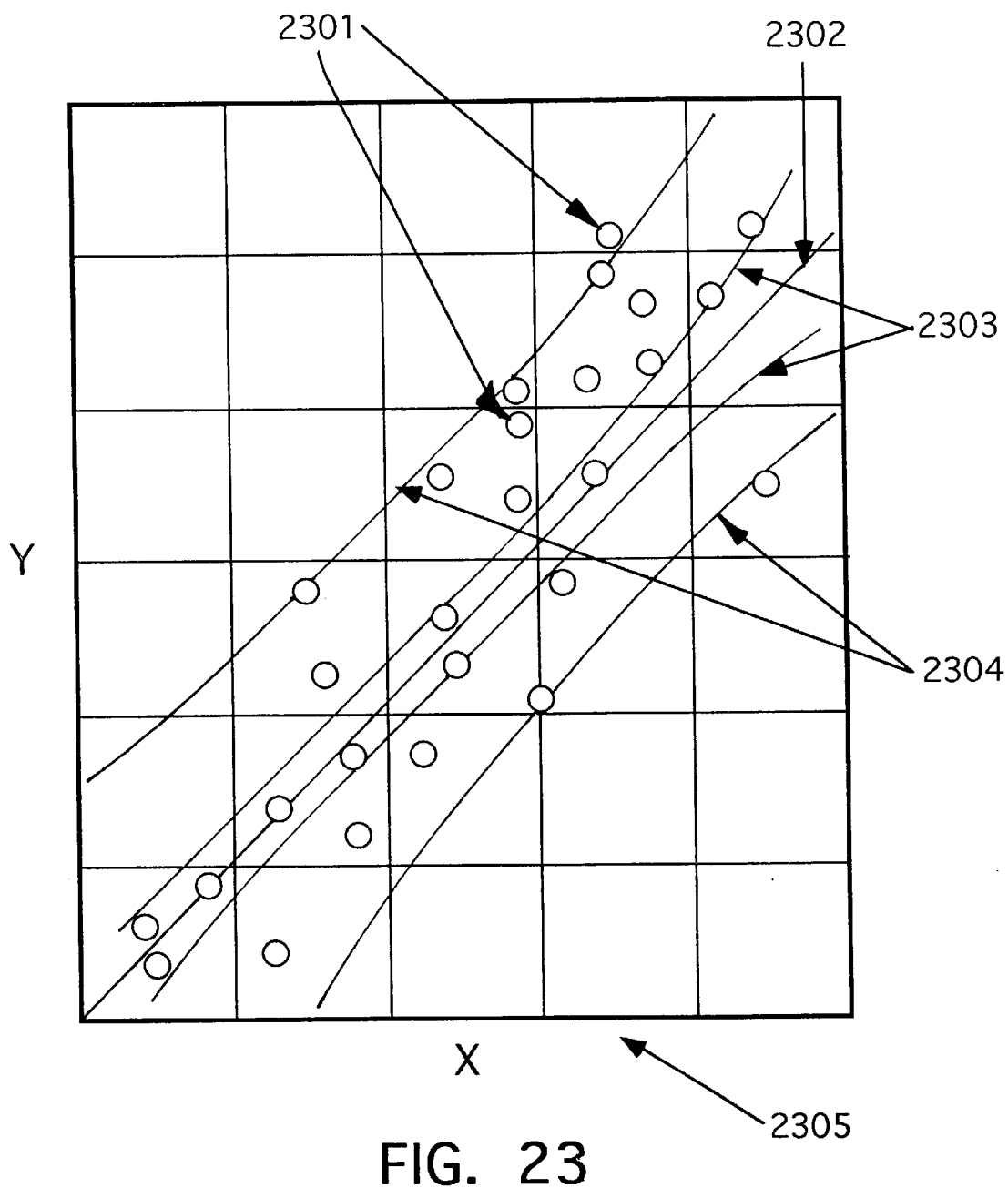
FIG. 23 presents illustrative output from the invention in a statistical context relevant to validation of the integrity of a simulation model used in conjunction with a manufacturing system.

Further details respecting profitability measurement will be discussed with reference to "profit meter" functionality as shown in FIGS. 21, 22, and 23.

Computer monitor 74 interfaces between human interface engine 813 and human operator 78 to enable data to be transmitted between the human and optimizing system 73. Computer monitor 74 further comprises a display means and data input means such as a keyboard, cursor positioner (also known as a mouse or trackball). In alternative embodiments, data input means includes either a tablet, lightpen, or touch screen means. In this regard, the human operator 78 utilizes the display means to read data written by human interface engine 813 to computer monitor 74; and human operator 78 utilizes a data input means to write data to human interface engine 813.

Turning now to a discussion of FIG. 8B FIG. 8B depicts the general Optimizing Reference Models and Schema 801 data structural element of the virtual functional and data structural elements 840 in expanded detail. As previously discussed, Optimizing Reference Models and Schema 801 holds the models and data identifiers (logical address indicators) which enable the optimizing system 73 to be customized to a particular application for a specific manufacturing system.

The data structural element known as economic objective function and plant model 802 holds the models and data identifiers (logical address indicators) which enable the optimizing system 73 to solve the formulated economic optimization problem for a specific case of a manufacturing system. The formulated economic model is structured in a manner to be compatible with the datalogical requirements of optimizer engine 822, and the formulated economic model is input and written into economic objective function and plant model 802 via data and model definition 828 functional block within human interface engine 813 by human operator 78 using computer monitor 74. The formulated economic model is read from economic objective function and plant model 802 by optimizer engine 822 during the execution of the Economic Setpoints Model Solution Step 907.

The data structural element known as parameter objective function and plant model 803 holds the models and data identifiers (logical address indicators) which enable the optimizing system 73 to solve the formulated parameter estimation problem for a specific case of a manufacturing system. The formulated parameter estimation model is structured in a manner to be compatible with the datalogical requirements of optimizer engine 822, and the formulated parameter estimation model is input and written into parameter objective function and plant model 803 via data and model definition 828 functional block within human interface engine 813 by human operator 78 using computer monitor 74. The formulated parameter estimation model is read from parameter objective function and plant model 803 by optimizer engine 822 during the execution of the Detailed Parameter Model Solution Step 905.

The data structural element known as Reconciliation Model 804 holds the models and data identifiers (logical address indicators) which enable the optimizing system 73 to solve the formulated data reconciliation problem for a specific case of a manufacturing system. The approach used in formulation of the relevant data reconciliation model and associated constraints was discussed with respect to FIG. 6 in this specification. The formulated data reconciliation model is structured in a manner to be compatible with the datalogical requirements of optimizer engine 822, and the formulated data reconciliation model is input and written into Reconciliation Model 804 via data and model definition 828 functional block within human interface engine 813 by human operator 78 using computer monitor 74. The formulated data reconciliation model is read from Reconciliation Model 804 by optimizer engine 822 during the execution of the solution of the Detailed Parameter Model 905.

The data structural element known as Categorical Equations and Data Definitions 805 holds the models and data identifiers (logical address indicators) which enable the optimizing system 73 to characterize statistical and miscellaneous equations related to a specific case of a manufacturing system. The formulated statistical and miscellaneous equations are structured in a manner to be compatible with the datalogical requirements of SOLO Executive Engine 820 and steady state engine 823, and the formulated statistical and miscellaneous equations are input and written into Categorical Equations and Data Definitions 805 via data and model definition 828 functional block within human interface engine 813 by human operator 78 using computer monitor 74. The formulated statistical and miscellaneous equations are read from Reconciliation Model 804 by SOLO Executive Engine 820 and steady state engine 823 during the execution of their tasks related to general operation of the optimizing system 73 and the determination of steady state status within the manufacturing system 70 and Process Control Computer 71 as is discussed in another part of this specification. In a manner which should be apparent, the statistical and miscellaneous equations within Categorical Equations and Data Definitions 805 are individually tagged by type for reference by steady state engine 823 and SOLO Executive Engine 820 as their respective functions are executed.

The data structural element known as historical definitions 806 holds the data identifiers (logical address indicators) which enable the optimizing system 73 to store needed historical data in Historical Cache 824 for a specific case of a manufacturing system. The historical data identifiers are structured in a manner to be compatible with the datalogical requirements of historical engine 825, and the historical data identifiers are input and written into historical definitions 806 via data and model definition 828 functional block within human interface engine 813 by human operator 78 using computer monitor 74. The historical data identifiers are read from historical definitions 806 by historical engine 825 during the execution of its task.

The data structural element known as Steady State Definition Data 807 holds the models and data identifiers (logical address indicators) which enable the optimizing system 73 to determine the steady state status of the manufacturing system 70 for a specific case of a manufacturing system. The determination of steady state is discussed in details in another part of the specification. The models and data identifiers (logical address indicators) which enable the optimizing system 73 to determine the steady state status of the manufacturing system 70 are structured in a manner to be compatible with the datalogical requirements of steady state engine 823 and the models and data identifiers (logical address indicators) which enable the optimizing system 73 to determine the steady state status of the manufacturing system 70 are input and written into Steady State Definition Data 807 via data and model definition 828 functional block within human interface engine 813 by human operator 78 using computer monitor 74. The models and data identifiers (logical address indicators) which enable the optimizing system 73 to determine the steady state status of the manufacturing system 70 are read from Steady State Definition Data 807 by steady state engine 823 during the execution of its task.

The data structural element known as monetary value definition data 808 holds the data identifiers (logical address indicators) which enable the optimizing system 73 to acquire needed economic variable values from Monetary Values 77 for a specific case of a manufacturing system. The monetary value identifiers are structured in a manner to be compatible with the datalogical requirements of monetary value interface engine 812, and the market data identifiers are input and written into monetary value definition data 808 via data and model definition 828 functional block within human interface engine 813 by human operator 78 using computer monitor 74. The market data identifiers are read from monetary value definition data 808 by monetary value interface engine 812 during the execution of its task.

The data structural element known as Data to Read from PCC 809 holds the data identifiers (logical address indicators) which enable the optimizing system 73 to acquire needed process variable and status data from Process Control Computer 71 (via Communication Interface 72) for a specific case of a manufacturing system. The process variable and status data are structured in a manner to be compatible with the datalogical requirements of PCC read engine 827, and the process variable and status data identifiers are input and written into Data to Read from PCC 809 via data and model definition 828 functional block within human interface engine 813 by human operator 78 using computer monitor 74. The process variable and status data identifiers are read from Data to Read from PCC 809 by PCC read engine 827 during the execution of its task.

The data structural element known as Data to Write to PCC 810 holds the data identifiers (logical address indicators) which enable the optimizing system 73 to write new setpoints into Process Control Computer 71 (via Communication Interface 72) for a specific case of a manufacturing system. The identifiers for setpoints to be written are structured in a manner to be compatible with the datalogical requirements of PCC write engine 826, and the identifiers for setpoints to be written are input and written into Data to Write to PCC 810 via data and model definition 828 functional block within human interface engine 813 by human operator 78 using computer monitor 74. The identifiers for setpoints to be written are read from Data to Write to PCC 810 by PCC write engine 826 during the execution of its task.

FIG. 9 presents a flowchart of the optimization execution process 916 depicting the fundamental steps in the method (decision process) executed by the SOLO Executive Engine 820. With respect to FIG. 9 and also to FIGS. 8A and 8B, the manner in which the SOLO Executive Engine 820 executes its task is now discussed.

Start 901 is an initiating step in the method of optimizing system 73 which is executed by SOLO Executive Engine 820 upon boot up of optimizing system 73. Start 901 is alternatively initiated by input of a restarting command from system monitor 814 within human interface engine 813. During Start 901, other virtual functional elements and data structural elements are initiated within optimizing system 73.

The Steady State Decision Step 902 is executed after either Start 901 or the Wait Operation Step 915. During the Steady State Decision Step 902, data (data values) are read and evaluated from Data Common 821 by SOLO Executive Engine 820 regarding the steady state status of the manufacturing system 70 as it is controlled and operated in conjunction with the method executing within the LOGIC 702 within Process Control Computer 71. The data values resident within Data Common 821 regarding steady state are generated from the method further discussed with respect to FIGS. 15, 16, and 17 which is executed by steady state engine 823 to evaluate data values from Data Common 821 and Historical Cache 824. As was discussed with respect to FIG. 6, a Lagrangian Multiplier represents a sensitivity respecting the degree to which a set of values (process variables within Process Control Computer 71) involved in one constraint of a formulated reconciliation optimization problem might be plausibly different from the degree to which the other sets of values (also process variables within Process Control Computer 71 involved in the other constraints of the same formulated reconciliation optimization problem) contributes to the overall error in a specific solution of the formulated optimization problem given that the entire set of variables and constraints involved in the generation of the relevant Lagrangian Multipliers is treated as an interactive (and presumably balanced) whole. The formulated models resident within economic objective function and plant model 802, parameter objective function and plant model 803, and Reconciliation Model 804 of Optimizing Reference Models and Schema 801 are based upon a presumption that all streams related to nodes (defined for the process of economic optimization of manufacturing system 70) are in a relationship of balance (that steady state operation exists). As previously discussed with respect to FIG. 1, a node such as node 4 represents a substantial apparatus or, alternatively, an entire manufacturing facility with internal repositories for material, energy, and material components; in this situation, the overall system is not consistently functioning in a mode where a change in the first flowing stream 1 is immediately reflected by changes in the second flowing stream 2 and/or the third flowing stream 3. A node such as node 4, therefore, represents a unit operation or, alternatively, a collection of unit operations in any manufacturing system. For steady state operation to exist, the rate of unexpected accumulation of material, energy, and material components (within the operating manufacturing system 70) should be essentially zero for any relevant streams in the nodes relating to the manufacturing system 70 (within the context of expected chemical reactions). The economic objective function and plant model 802, parameter objective function and plant model 803, and Reconciliation Model 804 of Optimizing Reference Models and Schema 801 are Steady State Definition Datas which presume the existence of general equilibrium, balance, and stability in the dynamic operation of the manufacturing system 70. Therefore, steady state operation is a prerequisite for relevancy in the use of data values related to the relevant streams within the operating manufacturing system 70 when the economic objective function and plant model 802, parameter objective function and plant model 803, and Reconciliation Model 804 of Optimizing Reference Models and Schema 801 are solved by optimizer engine 822 using those data values as inputs. If steady state operation does not exist, then the formulated problems of the economic objective function and plant model 802, parameter objective function and plant model 803, and Reconciliation Model 804 are not mathematically valid since they do not have components characterized in their internal equations and functions to relate to accumulations within associated nodes.

If the evaluation of steady state data values and statuses from Data Common 821 indicates that steady state exists, then SOLO Executive Engine 820 proceeds to Reconcile Reduced Model Operation Step 903. If steady state does not exist, SOLO Executive Engine 820 proceeds to Steady State Problem Notification Step 914.

In its execution of the Steady State Decision Step 902, models and logical identifiers are read and acquired by SOLO Executive Engine 820 from Categorical Equations and Data Definitions 805, historical definitions 806, and Steady State Definition Data 807.

The Reconcile Reduced Model Operation Step 903 is performed by SOLO Executive Engine 820 after a Yes conclusion to the Steady State Decision Step 902. SOLO Executive Engine 820 writes to and prompts optimizer engine 822 to solve the formulated reconciliation model for the reduced set of measurements within the manufacturing system 70 discussed with respect to FIGS. 1–6. Optimizer engine 822 reads and references Reconciliation Model 804 to acquire the formulated reconciliation problem, and optimizer engine 822 subsequently reads and references Data Common 821 for data values to solve the formulated reconciliation problem. Optimizer engine 822 then writes and inputs data resulting from the solution of the formulated reconciliation problem into Data Common 821. SOLO Executive Engine 820 proceeds to Reconciliation Data Plausibility Decision Step 904 after optimizer engine 822 completes its task.

Reconciliation Data Plausibility Decision Step 904 is performed by SOLO Executive Engine 820 after Reconcile Reduced Model Operation Step 903. Reconciliation Data Plausibility Decision Step 904 reads and evaluates the data in Data Common 821 which was generated in Reconcile Reduced Model Operation Step 903 to determine if the data is acceptable for further use in Detailed Parameter Model Solution Step 905. regard, statuses respecting rules, relationships and statuses sufficient to establish validity are executed in Reconciliation Data Plausibility Decision Step 904 to establish confidence concerning the validity of the solution data in Data Common 821 from Reconcile Reduced Model Operation Step 903. In executing Reconciliation Data Plausibility Decision Step 904, rules and relationships and statuses defined in Reconciliation Model 804 and Categorical Equations and Data Definitions 805 are read and referenced by SOLO Executive Engine 820. Statuses related to the operation of optimizer engine 822 (such as a status regarding existence of singularity in the solution, or, alternatively, a status regarding convergence) in Data Common 821 are also read and evaluated by SOLO Executive Engine 820 in Reconciliation Data Plausibility Decision Step 904. The general method used as part of the decision regarding plausibility is further discussed with reference to FIG. 19 and FIG. 20.

If the reading and subsequent evaluation of data values and statuses from Data Common 821 indicates plausibility regarding data in Data Common 821 which was generated in Reconcile Reduced Model Operation Step 903, then SOLO Executive Engine 820 proceeds to Detailed Parameter Model Solution Step 905 from Reconciliation Data Plausibility Decision Step 904. If plausibility regarding data in Data Common 821 which was generated in Reconcile Reduced Model Operation Step 903 does not exist, SOLO Executive Engine 820 proceeds to Reconciliation Problem Notification Step 913 from Reconciliation Data Plausibility Decision Step 904.

Detailed Parameter Model Solution Step 905 is performed by SOLO Executive Engine 820 after a Yes conclusion to Reconciliation Data Plausibility Decision Step 904. SOLO Executive Engine 820 writes to and prompts optimizer engine 822 to solve the detailed parameter model for the entire set of parameters needed by the Economic Setpoints model. In executing Detailed Parameter Model Solution Step 905, data values which were solved for as a balanced set in Reconcile Reduced Model Operation Step 903 are read from Data Common 821 and used in place of the real-time values resident in Data Common 821 (as acquired from Process Control Computer 71 via Communication Interface 72) associated with the same logical identifier in Process Control Computer 71. In this regard, the estimated data (as a balanced set) resulting from the solution of the formulated reconciliation problem is more appropriate for the solution of the formulated parameter estimation problem since local noise effects and minor process transients have been mathematically reconciled in the prior Reconcile Reduced Model Operation Step 903. It is an important feature of this invention that the solution of Detailed Parameter Model Solution Step 905 using input data values from Reconcile Reduced Model Operation Step 903 is superior in the optimization process to a solution of Detailed Parameter Model Solution Step 905 using input data values from process variables within Process Control Computer 71 without a prior reconciliation process. Economic balances are best performed using defined parameters, and defined parameters are best calculated based upon balanced components. A steady state dynamic status to indicate equilibrium in the operation of the manufacturing system 70 is a prerequisite for a balanced component determination. SOLO Executive Engine 820 writes to and prompts optimizer engine 822 to solve the detailed parameter model for the manufacturing system 70. Optimizer engine 822 reads and references parameter objective function and plant model 803 to acquire the formulated detailed parameter problem, and optimizer engine 822 subsequently reads and references Data Common 821 for data values to solve the detailed parameter problem. Optimizer engine 822 then writes and inputs data resulting from the solution of the formulated detailed parameter problem into Data Common 821. SOLO Executive Engine 820 proceeds to Parameter Data Plausibility Decision Step 906 after optimizer engine 822 completes its task.

Parameter Data Plausibility Decision Step 906 is performed by SOLO Executive Engine 820 after Detailed Parameter Model Solution Step 905. Parameter Data Plausibility Decision Step 906 reads and evaluates the data in Data Common 821 which was generated in Detailed Parameter Model Solution Step 905 to determine if the data is acceptable for further use in Economic Setpoints Model Solution Step 907. In this regard, certain rules and relationships and statuses sufficient to establish reasonable validity of the parameters are executed in Parameter Data Plausibility Decision Step 906 to establish a set of confidence concerning the validity of the solution data in Data Common 821 from Detailed Parameter Model Solution Step 905. In executing Parameter Data Plausibility Decision Step 906, rules and relationships and statuses defined in Reconciliation Model 804 and Categorical Equations and Data Definitions 805 are referenced by SOLO Executive Engine 820. Statuses related to the operation of optimizer engine 822 (such as status regarding existence of singularity in the solution, or status regarding convergence) in Data Common 821 are also evaluated in Detailed Parameter Model Solution Step 905. Optionally, in very substantial deployments, a more comprehensive evaluation of extended fault data acquired from Process Control Computer 71 can be retrieved from Data Common 821 to facilitate an extended fault detection evaluation (such as, without limitation, status of manufacturing system 70, status of key controllers, status of solving engine, and status of the real-time interface) prior to proceeding to Economic Setpoints Model Solution Step 907. In this regard, some parameters calculated in the Detailed Parameter Model Solution Step 905 can be artfully selected for comparison to particular real-time process variables to confirm reasonability in the execution of the method. The general method used as part of the decision regarding plausibility is further discussed with reference to FIG. 19 and FIG. 20.

If the reading and subsequent evaluation of data values and statuses read from Data Common 821 indicates plausibility regarding data in Data Common 821 which was generated in Detailed Parameter Model Solution Step 905, then SOLO Executive Engine 820 proceeds to Economic Setpoints Model Solution Step 907 from Parameter Data Plausibility Decision Step 906. If plausibility regarding data in Data Common 821 which was generated in Detailed Parameter Model Solution Step 905 does not exist, SOLO Executive Engine 820 proceeds to Parameter Plausibility Problem Notification Step 912 from Parameter Data Plausibility Decision Step 906. Economic Setpoints Model Solution Step 907 is performed by SOLO Executive Engine 820 after a Yes conclusion to Parameter Data Plausibility Decision Step 906. SOLO Executive Engine 820 writes and prompts optimizer engine 822 to solve the detailed economic setpoint model to define economic setpoints for the manufacturing system 70 and Process Control Computer 71. In executing Economic Setpoints Model Solution Step 907, data values in Data Common 821 which resulted from Reconcile Reduced Model Operation Step 903 and Detailed Parameter Model Solution Step 905 are read and used by optimizer engine 822. SOLO Executive Engine 820 writes to and prompts optimizer engine 822 to solve the economic setpoint model for the manufacturing system 70. Optimizer engine 822 reads and references economic objective function and plant model 802 to acquire the formulated economic setpoint problem , and optimizer engine 822 subsequently reads and references Data Common 821 for data values to solve the economic setpoint problem. Optimizer engine 822 then writes and inputs data resulting from the solution of the formulated economic setpoint problem into Data Common 821. SOLO Executive Engine 820 proceeds to Setpoint Range Check Operation Step 908 after optimizer engine 822 completes its task.

Setpoint Range Check Operation Step 908 is performed after Economic Setpoints Model Solution Step 907 to check that the setpoints generated in Economic Setpoints Model Solution Step 907 are appropriate for further transmission to Process Control Computer 71. SOLO Executive Engine 820 reads and references Categorical Equations and Data Definitions 805 to access various rules and relationships to evaluate the setpoints; SOLO Executive Engine 820 then reads and references Data Common 821 to acquire the data values and new setpoints for examination. If the new setpoints fall within an acceptable range, a status value indicating acceptability for automatic electronic transmission to Process Control Computer 71 is written and entered by SOLO Executive Engine 820 into Data Common 821.

Setpoint Acceptability Decision Step 909 is performed by SOLO Executive Engine 820 after Setpoint Range Check Operation Step 908. Setpoint Acceptability Decision Step 909 evaluates the data in Data Common 821 which was generated in Economic Setpoints Model Solution Step 907 to determine if the data is acceptable for further use in Process Control Computer 71. In this regard, certain rules and relationships and statuses sufficient to establish reasonable validity of the setpoints are executed in Setpoint Acceptability Decision Step 909 to establish a set of confidence concerning the validity of the solution data in Data Common 821 from Economic Setpoints Model Solution Step 907; this execution includes a check on the value of the status value determined in Setpoint Range Check Operation Step 908. In executing Setpoint Acceptability Decision Step 909, rules and relationships and statuses defined in economic objective function and plant model 802 and in Categorical Equations and Data Definitions 805 are read and referenced by SOLO Executive Engine 820. Statuses related to the operation of optimizer engine 822 (such as status regarding existence of singularity in the solution, or status regarding convergence) in Data Common 821 are also read and evaluated in Setpoint Acceptability Decision Step 909. The general method used as part of the decision regarding plausibility is further discussed with reference to FIG. 19 and FIG. 20.

If the reading and subsequent evaluation of data values and statuses from Data Common 821 indicates plausibility regarding data in Data Common 821 which was generated in Economic Setpoints Model Solution Step 907, then SOLO Executive Engine 820 proceeds to Setpoint Output Operation Step 910 from Setpoint Acceptability Decision Step 909. If plausibility regarding data in Data Common 821 which was generated in Economic Setpoints Model Solution Step 907 does not exist, SOLO Executive Engine 820 proceeds to Setpoints Problem Notification Step 911 from Setpoint Acceptability Decision Step 909.

In Setpoint Output Operation Step 910, the new economic setpoints are transmitted to Process Control Computer 71. SOLO Executive Engine 820 reads and references Data Common 821 to acquire the economic setpoints and writes and transmits said setpoints to PCC write engine 826. PCC write engine 826 references and reads Data to Write to PCC 810 to define and confirm validity of logical identifiers for the setpoints, formulates a message to be transmitted as Write to PCS Data Vector 75, and formulates, writes, and transmits Write to PCS Data Vector 75 to Communication Interface 72. Communication Interface 72 subsequently first reads and then writes and transmits the message containing the new economic setpoints to Process Control Computer 71 for use in control of the manufacturing system 70 in an economic manner.

In an alternative embodiment (not shown in FIG. 8A), SOLO Executive Engine 820 writes to and prompts PCC write engine 826 to read and acquire setpoints directly from Data Common 821. PCC write engine 826 references and reads Data to Write to PCC 810 to define data values and logical identifiers in Process Control Computer 71 for the setpoints, reads and acquires the relevant setpoint data values from Data Common 821, formulates a message to be transmitted as Write to PCS Data Vector 75, and writes and transmits Write to PCS Data Vector 75 to Communication Interface 72.

Following execution of Setpoint Output Operation Step 910, SOLO Executive Engine 820 proceeds to Wait Operation Step 915. In Wait Operation Step 915, the SOLO Executive Engine 820 pauses for a defined period of time prior to executing the Steady State Decision Step 902. In an alternative embodiment, SOLO Executive Engine 820 pauses until a status value entered into Data Common 821 from PCC read engine 827 indicates that Process Control Computer 71 is open to an economic setpoint input. The purpose of Wait Operation Step 915 relates to loose synchronization of optimizing system 73 to the time constant within the manufacturing system 70 needed for meaningful response to a set of setpoints from the previous solution cycle of optimizing system 73; the manufacturing system 70 usually requires a period of time to respond to setpoints prior to being in a situation wherein setpoints from another cycle of optimizing system 73 are useful. In one embodiment, the time elapse of Wait Operation Step 915 is a multiple of the real-time period executed by Process Control Computer 71.

Parameter Plausibility Problem Notification Step 912 is entered if a No decision is reached by Parameter Data Plausibility Decision Step 906. Reconciliation Problem Notification Step 913 is entered if a No decision is reached by Reconciliation Data Plausibility Decision Step 904. Steady State Problem Notification Step 914 is entered if a No decision is reached by the Steady State Decision Step 902. Setpoints Problem Notification Step 911 is entered if a No decision is reached by Setpoint Acceptability Decision Step 909. Reconciliation Problem Notification Step 913, Steady State Problem Notification Step 914, and Setpoints Problem Notification Step 911 all output and write a plausibility problem message (specific to each step) to Setpoint and Parameter Log 815 within human interface engine 813, alarm function 816 within human interface engine 813, and system monitor 814 within human interface engine 813. Following writing and output of the message by SOLO Executive Engine 820 to Setpoint and Parameter Log 815 within human interface engine 813, alarm function 816 within human interface engine 813, and system monitor 814 within human interface engine 813 (indicating that a plausibility problem in execution of optimizing system 73 was encountered) Reconciliation Problem Notification Step 913, Steady State Problem Notification Step 914, and Setpoints Problem Notification Step 911 each respectively proceed to Wait Operation Step 915.

Figure 10:
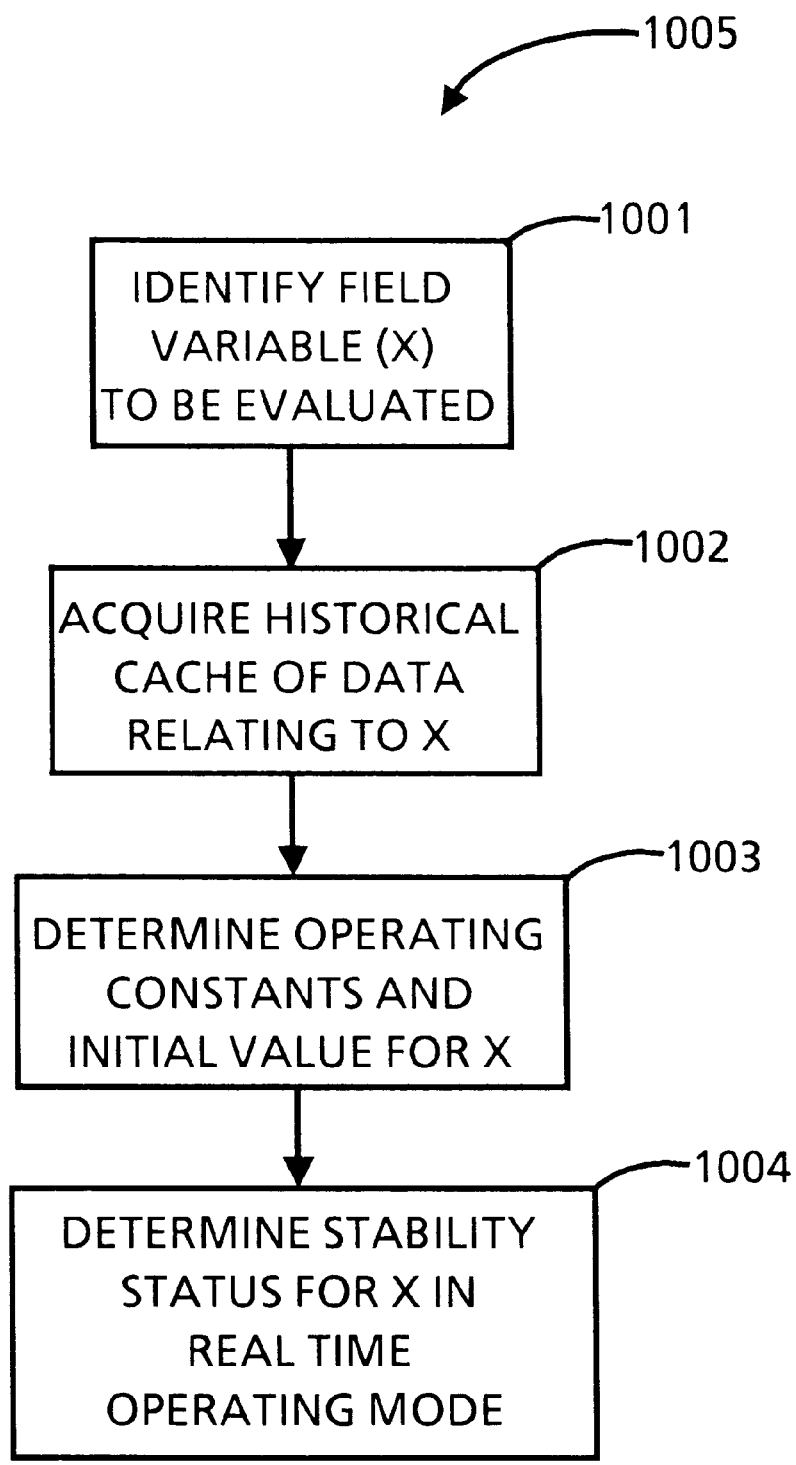
FIG. 10 presents the 4 primary stages in the operation of the optimizing system needed to establish a historical reference database.

Referring now to FIGS. 10–18, these figures depict the process, method, and important detailed data structural elements used in the process of the Steady State Decision Step 902 and, to some extent, in other virtual functional elements and features of optimizing system 73 (the more extended use being related to the optional use of standard deviations to weight Lagrangian Multipliers and definition of models in Optimizing Reference Models and Schema 801) to use the invention in a specific instance of application in a manufacturing system 70. In this regard, and with reference to FIG. 10, a certain amount of historical data must first be read and gathered from Process Control Computer 71 and written and stored in Historical Cache 824 prior to executing the method outlined with respect to FIG. 9. The steady state decision process and the definition of operating constants require a historical database. FIG. 10 presents the historical setup process 1005 showing the 4 primary stages of operation of optimizing system 73 to establish the necessary historical reference. FIG. 10 depicts a Variable Identification Step 1001, a Primary Historical Data Acquisition Step 1002, an Initial Value Determination Step 1003, and a Real-Time Operating Mode Step 1004.

In Variable Identification Step 1001, field variables (process variables within Process Control Computer 71) and other statuses needed from Process Control Computer 71 for the execution of the Steady State Decision Step 902 and the optimizing system 73 of the present invention are defined, written, and input by human operator 78 from computer monitor 74 via data and model definition 828 functional block within human interface engine 813 to historical definitions 806, Steady State Definition Data 807, and Data to Read from PCC 809 data structures within Optimizing Reference Models and Schema 801. To simplify the textual references to variables related to the overall steady state determination (which variables are, in part, first designated as field variables; and said field variables subsequently become, along with and other data within Process Control Computer 71, process variables within Process Control Computer 71; and said process variables subsequently become data values within Data Common 821; and said data values subsequently become historical data within Historical Cache 824) for the execution of the steady state characterization process, the Steady State Decision Step 902, and the Reconcile Reduced Model Operation Step 903 of the optimizing system 73, an instance of a process variable represented in (1) Data Common 821 as a data value and (2) historical data in Historical Cache 824 (or, alternatively, an engine within optimizing system 73) is virtually summarized by the logical identifier X in the drawings and accompanying text related to FIGS. 10–18 unless otherwise indicated.

In Primary Historical Data Acquisition Step 1002, a set of values comprising at least one X deemed useful in configuring and operating optimizing system 73 for a specific instance of application in a manufacturing system 70 is initiated within Historical Cache 824. PCC read engine 827 reads and references Data to Read from PCC 809 to identify each X. PCC read engine 827 periodically, in real-time, reads each X from Process Control Computer 71 via Communication Interface 72 using Read PCS Data Vector 76 messages from Communication Interface 72. PCC read engine 827 stores each X in Data Common 821. Historical engine 825 reads and references (in a periodic real-time manner) historical definitions 806 to identify each X to be stored from Data Common 821. Historical engine 825 periodically reads each X from Data Common 821 and stores it within Historical Cache 824. After a set of these operations, a printout (or, alternatively, viewing) of data within Historical Cache 824 is acquired (in a manner of access not shown, but which should be apparent) to provide a basis for decisions regarding operating constant definition, initial standard deviation calculations, and initial values for steady state determination.

In Initial Value Determination Step 1003, operating constants, data regarding the structure of the "wheels" discussed with respect to FIGS. 12–18, standard deviations, initial values, range limits, and constants are determined by human operator 78 pursuant to study of the printout (or, alternatively, viewing) of historical data from Historical Cache 824. Human operator 78 then writes and inputs definitions and settings related to X into Categorical Equations and Data Definitions 805, historical definitions 806, and Steady State Definition Data 807, as appropriate, within Optimizing Reference Models and Schema 801 via computer monitor 74 and data and model definition 828 functional block within human interface engine 813.

Following the execution of steps 1001, 1002, and 1003, the optimizing system 73 can be used in the Real-Time Operating Mode Step 1004 in which the method described in FIG. 9 is executed.

Figure 11:
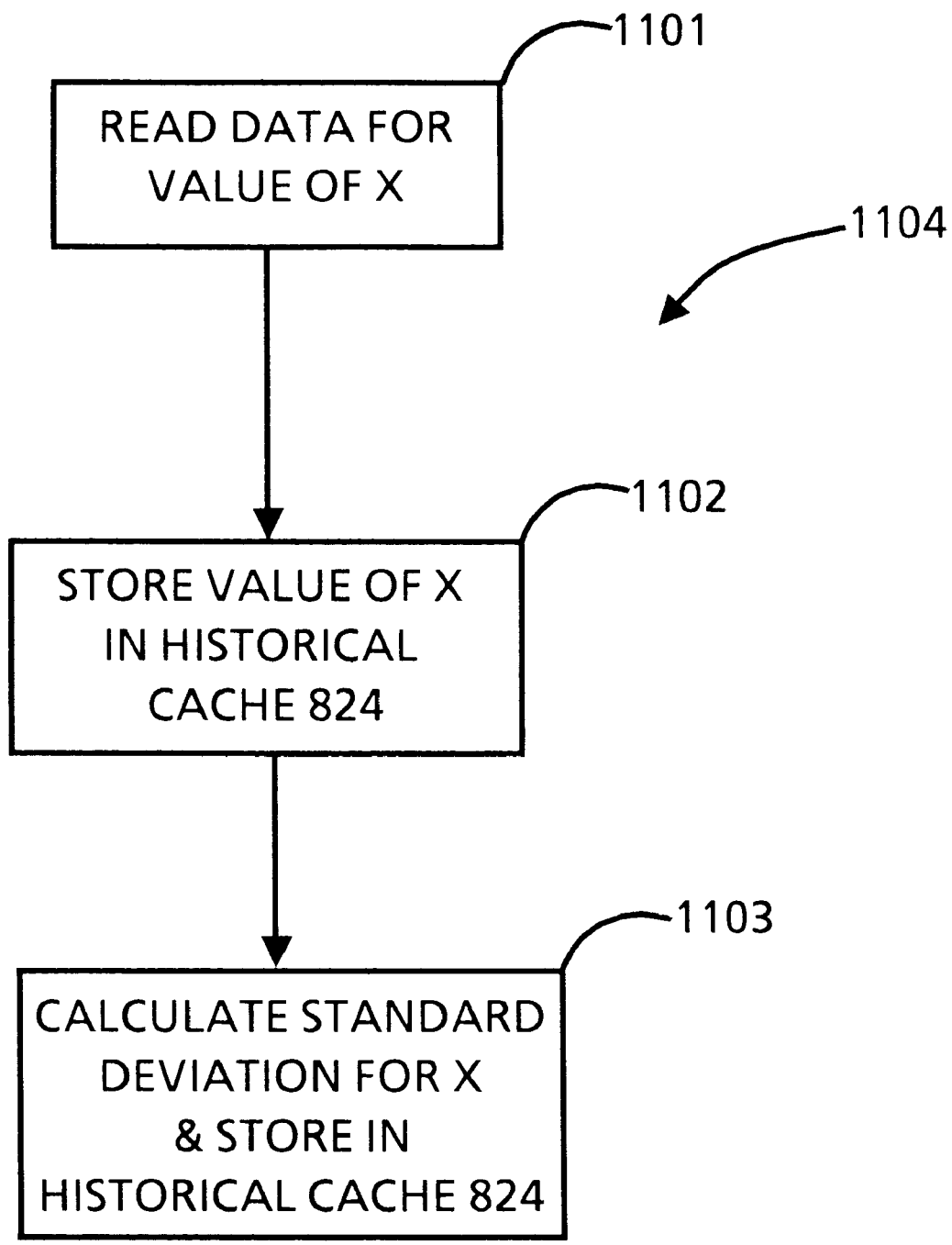
FIG. 11 indicates the ongoing virtual operations executed by the optimizing and profit display system on a real-time process variable and its associated historical values.

During the ongoing execution of Real-Time Operating Mode Step 1004, the various values of X continue to be historically recorded and stored. FIG. 11 indicates the ongoing virtual historical operations 1104 that are performed by optimizing system 73 on values of X. Read Data for Value of X Step 1101 is performed for each X by PCC read engine 827 to periodically update Data Common 821 with X and other data from Process Control Computer 71. Then, in Store Value of X in Historical Cache 824 Step 1102, each X is periodically read by historical engine 825 from Data Common 821 and stored in Historical Cache 824. Historical engine 825 also periodically (in real-time) optionally calculates a new standard deviation for X and Stores the new standard deviation related to X in Historical Cache 824 in a step 1103. This process continues in an ongoing and periodic manner as optimizing system 73 executes its other tasks related to SOLO Executive Engine 820 and optimizer engine 822. In this regard, the time periods (in real-time) related to each of the steps 1101, 1102, and 1103 do not necessarily need to be of the same duration.

In Store Value of X in Historical Cache 824 Step 1102, each X is periodically read by historical engine 825 from Data Common 821 and stored in Historical Cache 824. This procedure is further depicted with respect to FIG. 12.

Figure 12:
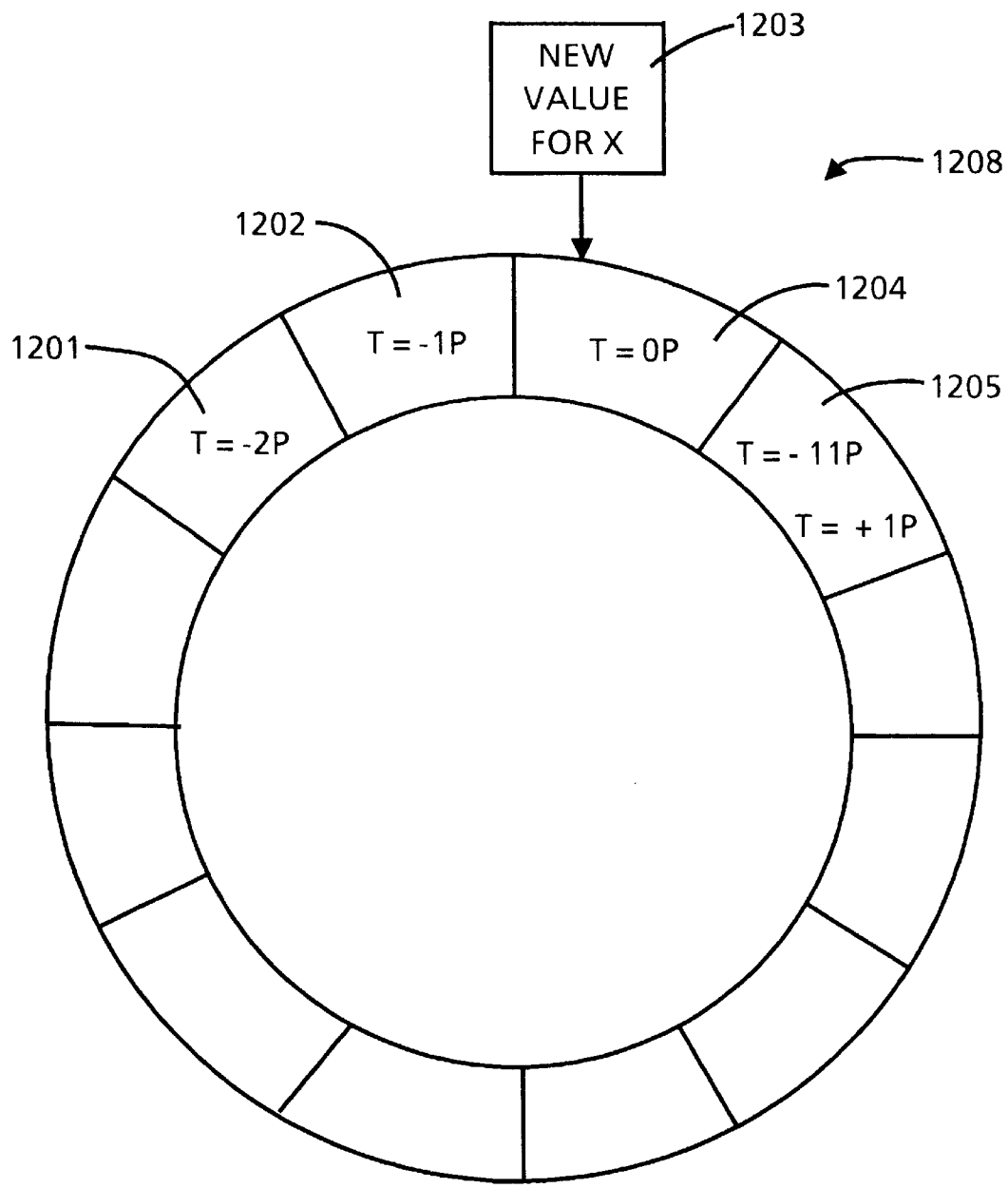
FIG. 12 depicts the general historical data storage approach utilized.

FIG. 12 depicts a conceptual wheel 1208 (circular track) which demonstrates, in a virtual and readily understood manner, the historical data storage approach utilized for each logically identified X within Historical Cache 824. The conceptual wheel 1208 of FIG. 12 is divided into twelve different period sectors such as Period Sector (T=−2P) 1201, Period Sector (T=−1P) 1202, Period Sector (T=0P) 1204, and Period Sector (T=−11P) 1205. Each period sector is associated with a period during which a specific instance of a value of X is read by historical engine 825 from Data Common 821 and stored in Historical Cache 824. In this regard, each logically identified instance of X has such an associated virtual "wheel" within Historical Cache 824, and each write operation to Historical Cache 824 (of a specific instance of a value of X written by historical engine 825 following a read by historical engine 825 of the specific instance of the value of X from Data Common 821) is placed into the period sector which is holding the oldest instance of a value of X in the conceptual wheel 1208 at the moment preceding the write operation. In this regard, the oldest period sector then becomes the newest period sector immediately after the write operation of historical engine 825 into the oldest period sector. In a physical context, the wheel of FIG. 12 virtually depicts a set of memory locations (RAM cells) within CPU 705 or, alternatively, memory storage cells on its associated storage disk within Optimizing System 73. In a logical context, the conceptual wheel 1208 of FIG. 12 virtually depicts a reserved set of logically identified addresses within Optimizing System 73. The set of memory locations is reserved to hold the relevant historical data values of X and associated attribute variables for each read by historical engine 825 of a specific instance of the value of X from Data Common 821. The number of the relevant historical data values (the size of each wheel) needed for any logically identified X is situational and is defined into historical definitions 806 by human operator 78 via computer monitor 74 and data and model definition 828 functional block within human interface engine 813. After this definition for a logically identified instance of X, historical engine 825 reserves the defined set of period sectors within Historical Cache 824 (physically resident in either CPU 705 or, alternatively, its associated extended disk storage) to hold the historical data values and associated attribute variables which are derived from each read by historical engine 825 of a specific instance of the value of X from Data Common 821. In this regard, FIG. 12 demonstrates that the New Value for X 1203 is written and stored into Sector (T=0P) 1204. Period Sector (T=0P) 1204 has the associated T=0P to depict annotation appropriate to the moment after the write of the New Value for X 1203 has been performed by historical engine 825 into Period Sector (T=0P) 1204. T=0P is considered to be current time ("zero period") in a real-time scenario. In this regard, Period Sector (T=−1P) 1202 holds the historical data value and associated attribute variables which are derived from the read by historical engine 825 of the specific instance of the value of X from Data Common 821 during the previous period. Period Sector (T=−1P) 1202 has the associated notation of T=−1P to represent "the prior period to the current time period" ("−1 period") in a real-time scenario. Extending the concept, Period Sector (T=−2P) 1201 holds the historical data value and associated attribute variables which are derived from the read by historical engine 825 of the specific instance of the value of X from Data Common 821 during the period which was previous to Period Sector (T=−1P) 1202. Period Sector (T=−2P) 1201 has the associated notation of T=−2P to represent "two periods prior to the current time period" ("−2 period") in a real-time scenario. Extending the concept "around the wheel" of the conceptual wheel 1208 of FIG. 12, Period Sector (T=−11P) 1205 is the oldest "prior period to the current time period" in the wheel (eleven periods prior to the current time period). Period Sector (T=−11P) 1205 is also the period sector into which the next write operation (to be performed in the future) by historical engine 825 of the next future period's data value and associated attribute variables derived from the read by historical engine 825 of the next future period's specific instance of the value of X from Data Common 821 are performed; Period Sector (T=−11P) 1205 is, therefore, also annotated with the identifier T=+1P to represent "the next (future) period to the current time period" ("+1 period") in a real-time scenario. In this regard, the conceptual wheel 1208 of FIG. 12 virtually rotates in a counter-clockwise direction by one period sector to position Period Sector (T=−11P) 1205 as the target for New Value for X 1203 after the write operation related to the current time period has been completed. In implementation, the virtual rotation of the conceptual wheel 1208 is managed by historical engine 825 through the logical operation of incrementing and recomputation of an index variable dedicated to the defined set of period sectors in either CPU 705 or, alternatively, its associated extended disk storage.

Once defined, each wheel within Historical Cache 824 is perpetually updated by historical engine 825 during the operation of optimizing system 73. Each specific instance of the value of X also has associated attributes such as a time tag (the moment of storage), status indicators, and other related data stored within the field of data comprising an individual period sector. Furthermore, steady state engine 823, historical engine 825, and SOLO Executive Engine 820 access any period sector to modify attribute variables associated with the period sector at any time; this is discussed with respect to the steady state engine 823 with regard to FIGS. 13 to 18.

Figure 13:
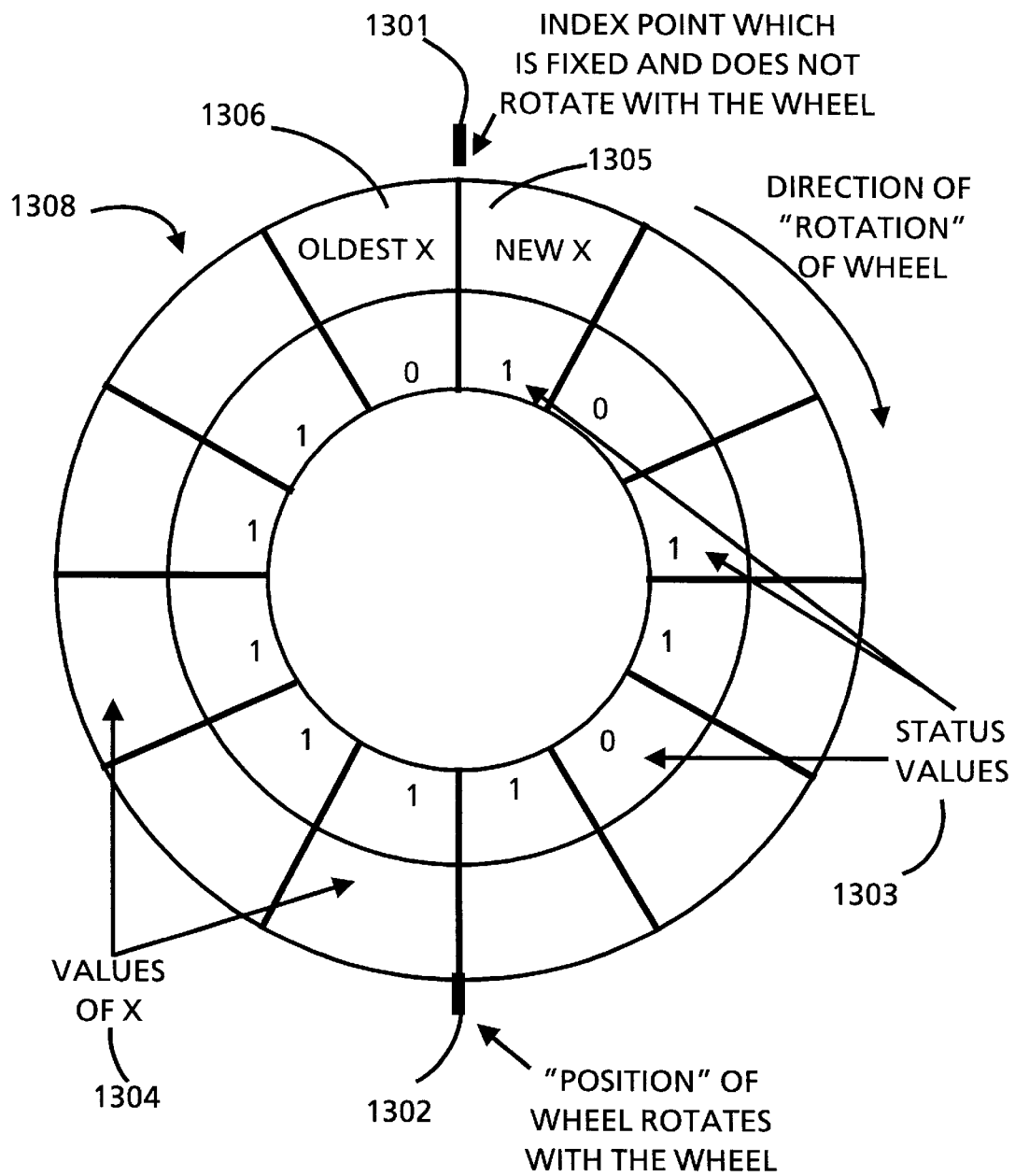
FIG. 13 depicts historical data storage related to noise in a process variable.
Figure 14:
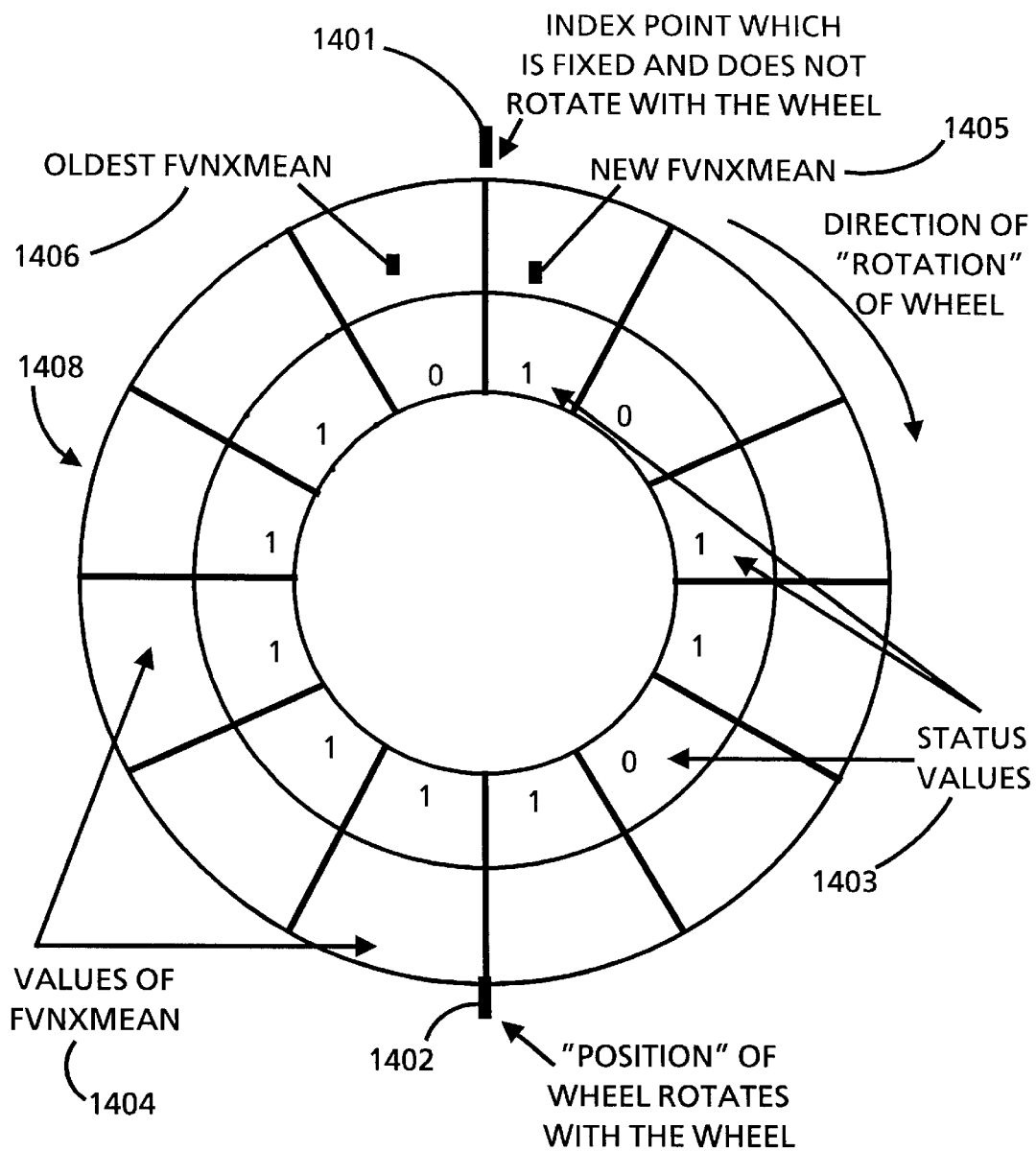
FIG. 14 depicts historical data storage related to transient response of a process variable.

FIGS. 13 and 14 depict more specific uses of the wheel described in the more general case of FIG. 12 within the present invention. The wheels depicted in FIGS. 13 and 14 rotate in a clockwise direction instead of the counterclockwise direction discussed with respect to FIG. 12; furthermore, each period sector in FIGS. 12 and 13 depicts an associated attribute variable known as a status value for each period sector. The need of the invention to relate to the time shift between the current time period and the other times associated with other period sectors in the wheel is depicted in FIGS. 13 and 14 by the use of an index point indicator and a wheel position indicator.

Turning now to a discussion the FVN wheel 1308 of FIG. 13 within the general context of the conceptual wheel 1208 of FIG. 12, the period sectors of the FVN wheel 1308 of FIG. 13 are subdivided into locations for storage of a specific instances of the value of X from Data Common 821 and an associated Status Values 1303. The associated Status Value 1303 related to each specific instance of the value of X is the proximate radially inward location to the location where the specific instance of the associated value of X is stored. In the case of period sector associated with New X 1305, the associated status value 1303 has a magnitude of 1. The Status Value 1303 for any particular specific instance of the value of X is calculated by steady state engine 823 after the specific instance of the value of X has been stored by historical engine 825; this calculation optionally occurs in a different time period than the time period during which the specific instance of the value of X is stored. Other attribute variables related to specific instances of the value of X also have additional storage locations in a similar manner to the Status Values 1303, but these are not shown in the FVN wheel 1308 of FIG. 13.

The FVN wheel 1308 of FIG. 13 depicts the elements of a Fixed Index Point 1301, a Relative Position Indicator 1302 for the wheel, a New X Period Sector 1305 period sector portion holding a specific instance of the value of X denoted as New X, an Oldest X Period Sector 1305 period sector portion holding a specific instance of the value of X denoted as Oldest X, a Values of X general period indicator 1304 period sector portion indicating that the radially outward portion of each period sector holds the specific instance of the value of X for that period sector, Status Values 1303 indicating that the radially inward portion of each period sector holds the specific instance of the status value associated with X for that period sector, and a general notation that the wheel "rotates" in a clockwise direction. The FVN wheel 1308 of FIG. 13 is designated as the "Field Variable Noise" (FVN) wheel to describe its function of recording a history of specific instances of the values of X related to the noise generated in the field instrument related to X.

In this regard, in the implementation of process control, noise signals are alternatively produced in the manufacturing system 70 (to which measurements are applied) as process noise or, alternatively, in the measurement method related to measurement of a particular attribute of the manufacturing system 70 (which is implemented using a sensor) as measurement noise. In this connection the term "noise" is used to signify all forms of interference. It is usually not possible to identify the source of noise in a signal from a field device through the use of conventional analytical techniques on the time discrete signals themselves. Usually, noise demonstrates an oscillatory or, alternatively, vibrational characteristic when a series of discrete signals is analyzed as a function of time; usually, the overall oscillatory pattern is resolved into a set of sine waves having characteristic frequencies.

Process noise is produced from transient variations in the manufacturing system 70 in the regions proximate to the location of the measuring sensor. There are a variety of factors that contribute to such variations in the manufacturing system 70 such as the presence of entrained gas bubbles in a liquid, local variations in a liquid density as in the case of agitated oil/water mixtures, local variations in liquid temperature, turbulence, or, alternatively, the like. Measurement noise is produced in each stage of the sensing process. The measurement noise is usually a function of the quality of the sensor.

Current methods used to measure process variables such as temperature, pressure, and flow inherently yield signals which incorporate both process noise and measurement noise in their magnitude. Hence, using a process signal corrupted by noise is a long-standing problem for process control engineers. Measurement noise is normally the less significant component in the total amount of noise present in a given signal when compared to the process noise component, and the measurement noise is reduced further by corresponding measures such as grounding of the electrical circuitry or, alternatively, the like. The following discussion, therefore, focuses on the process noise component and presumes that the influence of the measurement noise component is essentially negligible in the application of the present invention.

In a controlled apparatus and process (such as the manufacturing system 70 using Process Control Computer 71) where a control unit or, alternatively, set of control units assists in the operation of a complicated machine such as a nuclear power station, automobile, turbine, chemical manufacturing system, and the like, various parameters of the manufacturing system 70 are monitored to determine the status of the process at any point in time. To this end, sensors are used to generate sensor output signals which represent the values of various attributes (such as temperature, pressure, flow rate, RPM, or, alternatively, vessel level) characteristic of the manufacturing system 70.

A sensor is a device which is constructed to respond to a given event, occurrence, or, alternatively, state and to produce an accordingly predetermined sensor output signal representing the aforementioned state, occurrence, or, alternatively, event as a analog or, alternatively, digital signal (or, in a more virtual sense, as a numeric or, alternatively, Boolean quantity). Within the context of process control, the sensor output signal from the sensor then is transferred into a process variable which is the representation of the sensor output signal as a value which is used by a process control program in LOGIC 702 within Process Control Computer 71. A number of well known techniques are utilized in the course of the transfer of an sensor output signal (field signal) to a directly derived field variable (raw process variable), each being appropriate to the particular signal; some common examples of these techniques include analog to digital conversion, linearization, measurement via a Wheatstone bridge (as in the case of some weigh cells and resistance temperature devices), multiplexing, or, alternatively, receipt and interpretation of a serial data message from the sensor if the sensor outputs a serial data message as its sensor output signal. The implementation of these techniques is achieved through a combination of Process Control Computer 71 sensor output signal receiving hardware means and sensor signal conditioning software means executing, in a preferred embodiment, within Process Control Computer 71 which is further executing the process control decision program.

Natural phenomena, such as noise, are usually not uniformly distributed. Instead, they are more likely to follow a normal distribution also known as Gaussian Distribution which has well-known bell-shaped distribution properties. Random numbers generated by this distribution tend to cluster about the mean or, alternatively, average value of the entire group. As values depart from the mean, they occur less frequently.

In a statistical context, process variables derived and resulting from the sensing process and assembly show a random variation in their values. If these derived process variables consistently show a normal distribution within predetermined limits, the controlled apparatus and process is considered stable and "in control" by a controller. Various methods are be utilized to effectively filter the raw process variable into the process variable used in the decision logic of LOGIC 702 within Process Control Computer 71. A discussion of this type of control technique may be found in the Walter et al. International Patent Application No. 93/11303 file on Nov. 19, 1993, entitled "Method for adjusting an adaptive exponential filter and adaptive exponential filter" and in the Walter et al. International Patent Application No. 94/00284, filed on Jan. 4, 1994, entitled "Transmitter Freeze/Fault Detection". However, the operation of the manufacturing system 70 might be in such a state of dynamic agitation that a status of steady state is not accorded to it. The use of the conceptual wheel 1208 of FIG. 12 to examine the degree of variation of a particular process variable (after the filtering of its associated raw process variable) is further described with respect to FIGS. 14–18. Each FVN wheel 1308 related to a logically identified instance of X is of potentially unique size with respect to the number of reserved period sectors and may have a unique rate of rotation. The specifications for the number of period sectors and the rate of rotation for each FVN wheel 1308 are derived from the historical data acquired during Primary Historical Data Acquisition Step 1002. The derivation of the number of period sectors and the rate of rotation for each FVN 1308 wheel (each X) enable a frequency of measurement to sufficiently characterize the noise related performance of each process variable within the context of its associated respective response time constant; additional details regarding the method of derivation of the number of period sectors and the rate of rotation for each FVN wheel 1308 from historical data acquired in Primary Historical Data Acquisition Step 1002 should be apparent given the information in this specification. After definition by human operator 78 of the number of period sectors and the rate of rotation for each FVN wheel 1308, these data are input by human operator 78 from computer monitor 74 via data and model definition 828 functional block within human interface engine 813 to historical definitions 806, Steady State Definition Data 807, and Data to Read from PCC 809 data structures within Optimizing Reference Models and Schema 801. The further operations of the FVN wheel 1308 of FIG. 13 is discussed with respect to the general steady state decision method of FIGS. 15–18.

Turning now to a discussion of an FVMPC wheel 1408 in FIG. 14 within the general context of the conceptual wheel 1208 of FIG. 12, the period sectors of the FVMPC wheel 1408 of FIG. 14 are subdivided into locations for storage of specific instances of the value of an entity denoted as FVNxmean and associated Status Values 1405. FVNxmean is the mean (average) value of the set of specific instances of the value of X in the respectively associated FVN wheel 1308. An FVN wheel 1308 is usually, but optionally, associated with a second specific Field Variable Manufacturing Process Cycle (FVMPC) wheel 1408. The FVMPC wheel 1408 helps to address the steady state status decision by enabling a historical data set characterizing manufacturing system 70 dynamic transient response to forcing functions to be available for the steady state characterization process. In this regard, the time constant related to the dynamic transient response of X with respect to a forcing function within the manufacturing system 70 is different than the time constant related to noise in the sensing and measurement of X.

As an example to, without limitation, illustrate the difference between a stability consideration related to noise in the measurement of an attribute and a stability consideration regarding transient response to a forcing function, consider an automobile (with a weak suspension) under acceleration on a rough road. The speedometer in the automobile is of the mechanical variety and indicates the velocity attribute of the automobile. At a brisk constant velocity, the speedometer indicator vibrates as a result of the uneven road; the variations in the position (reading) of the indicator from second to second reflect the noise in the measurement of the velocity attribute. If the automobile is accelerated, variations in the position (reading) of the indicator from second to second continue to be present; however, even if the measurement noise in the indicator is filtered out of the stability decision, the fact that the automobile is increasing in its average indicated velocity from second to second (the automobile's transient response to the forcing function of the accelerator being depressed) precludes a steady state status in the automobile until such time as the acceleration ceases and the automobile is again at an essentially constant velocity with only measurement noise as a source of minor recurrent fluctuation in the indication of velocity.

As a formalized differentiation, the FVN wheel 1308 of FIG. 13 addresses the historical data necessary to characterize stability of a signal in the context of the time constant related to measurement noise; and the associated FVMPC wheel 1408 of FIG. 14 addresses the historical data necessary to characterize stability of a signal as it relates to transient response to forcing functions within the manufacturing system 70.

The specifications for the number of period sectors and the rate of rotation for each FVMPC wheel 1408 are derived from the historical data acquired during Primary Historical Data Acquisition Step 1002. The derivation of the number of period sectors and the rate of rotation for each FVMPC wheel enable a frequency of measurement to sufficiently characterize the general dynamic behavior of each process variable within the context of the transient response time constant related to the portion of the manufacturing system 70 being characterized by the logically identified X, and additional details regarding the method of derivation of the number of period sectors and the rate of rotation for each FVMPC wheel from historical data acquired in Primary Historical Data Acquisition Step 1002 should be apparent given the information in this specification. After definition by human operator 78 of the number of period sectors and the rate of rotation for each FVMPC wheel 1408, the number of period sectors and the rate of rotation are input by human operator 78 from computer monitor 74 via data and model definition 828 functional block within human interface engine 813 to historical definitions 806 and Steady State Definition Data 807 data structures within Optimizing Reference Models and Schema 801.

The associated Status Value 1403 related to each specific instance of the value of FVNxmean is the proximate radially inward location to the location where the specific instance of the associated value of FVNxmean is stored. In the case of the period sector related to New FVNxmean 1405, the associated status value 1403 has a magnitude of 1. The Status Value 1403 for any particular specific instance of the value of FVNxmean is calculated by steady state engine 823 and historical engine 825 as described with respect to the general steady state decision method of FIGS. 15–18; this calculation optionally occurs in a different time period than the time period during which the specific instance of the value of X is stored in the FVN wheel 1308. Other attribute variables related to specific instances of the value of X also have additional storage locations in a similar manner to the Status Values 1303, but these are not shown in FIG. 14.

FIG. 14 depicts the elements of a Fixed Index Point 1401, a relative Position Indicator 1402 for the wheel, a New FVNxmean Period Sector 1405 period sector portion holding a specific instance of the value of FVNxmean denoted as New FVNxmean, an Oldest FVNxmean Period Sector 1405 period sector portion holding a specific instance of the value of FVNxmean denoted as Oldest FVNxmean, a Values of FVNxmean general period indicator 1404 period sector portion indicating that the radially outward portion of each period sector holds the specific instance of the value of FVNxmean for that period sector, Status Values 1403 indicating that the radially inward portion of each period sector holds the specific instance of the status value associated with FVNxmean for that period sector, and a general notation that the wheel "rotates" in a clockwise direction. The FVMPC wheel 1408 of FIG. 14 is identified as the "Field Variable Manufacturing Process Cycle" (FVMPC) wheel to describe its function in recording a history of specific instances of the values of X related to transient response to a forcing function within the manufacturing system cycle in the manufacturing system 70 as monitored through the field instrument related to X. The further operations of the FVMPC wheel 1408 of FIG. 14 are discussed with respect to the general steady state characterization process related to FIGS. 15–18.

FIG. 15, FIG. 16, FIG. 17, and FIG. 18 are flowcharts depicting the steady state characterization process 1518 executed in a joint and coordinated manner by both steady state engine 823 (as primary facilitator) and historical engine 825 (as an interactively associated engine) to determine the steady state status of one logically identified X related to the manufacturing system 70. In this regard, in an alternative embodiment, steady state engine 823 and historical engine 825 are merged into one virtually functional engine. In an alternative embodiment, two historical engines are created wherein the first would reside within steady state engine 823 and be dedicated to the historical needs of the steady state characterization process and a second historical engine would perform historical tasks unrelated to the steady state characterization process. The steady state characterization process 1518 of FIG. 15, FIG. 16, FIG. 17, and FIG. 18 generates data values which are written into Data Common 821 for further reference during the Steady State Decision Step 902 executed by SOLO Executive Engine 820. The illustrated steady state characterization process 1518 of FIG. 15, FIG. 16, FIG. 17, and FIG. 18 indicates an general synchronization between steady state engine 823 and historical engine 825 in the acquisition of new values of X and the execution of the steady state characterization process 1518 for X. In an alternative embodiment, acquisition of new values of X, the storage of new values of X, the execution of the steady state characterization process 1518 of FIG. 15, FIG. 16, FIG. 17, and FIG. 18, and the further execution of the Steady State Decision Step 902 are essentially asynchronous. Furthermore, it should be noted that, while the steady state characterization process 1518 of FIG. 15, FIG. 16, FIG. 17, and FIG. 18 is outlined for a single logically identified instance of X, data values which are written into Data Common 821 for number of different logically identified Instances of X are usually evaluated in practice in the Steady State Decision Step 902. Therefore, the steady state characterization process 1518 depicted in FIG. 15, FIG. 16, FIG. 17, and FIG. 18 (and executed by steady state engine 823 and historical engine 825) is executed with respect to least one data value (X) in Data Common 821 wherein the data value in Data Common 821 is input by FCC read engine 827 after a read operation by PCC read engine 827 of a process variable within LOGIC 702 (of Process Control Computer 71) via Read PCS Data Vector 76 from Communication Interface 72. In practice, usually more than one X is evaluated within the context of the steady state characterization process of FIG. 15, FIG. 16, FIG. 17, and FIG. 18. With regard to multiple Instances of X, the steady state characterization process 1518 can be executed in a sequential manner to process each different X separately in the preferred embodiment; alternatively, the entire set of different Instances of X can be processed in some steps in the steady state characterization process prior to execution of a subsequent step. With regard to the execution of the steady state characterization process 1518 as described in FIG. 15, FIG. 16, FIG. 17, and FIG. 18, the steady state engine 823 and historical engine 825 periodically need to obtain data from Historical Cache 824. Statements regarding use of data from the FVN Wheel and the FVMPC Wheel implicitly incorporate the operation of steady state engine 823 and historical engine 825 performing a read operation to Historical Cache 824 in order to acquire the necessary data. In a similar regard, use of data values within Data Common 821 implicitly incorporates the operation of steady state engine 823 and historical engine 825 performing a read operation to Historical Cache 824 in order to acquire the necessary data.

When more than one logically identified X is evaluated, the steady state engine 823 performs a final steady state characterization which collectively evaluates the set of status values in Data Common 821 for all logically identified instances of X (each status value being a result of the steady state characterization process 1518 depicted in FIG. 15, FIG. 16, FIG. 17, and FIG. 18 for each logically identified instance of X); this is a boolean AND operation on the status values. Alternatively, the SOLO Executive Engine 820 performs the boolean AND operation on the status values during the execution of the Steady State Decision Step 902. In principle, however, the Steady State Decision Step 902 is essentially a straightforward query of the overall status value resulting from the steady state characterization process 1518 to determine if the overall status value is TRUE (indicating instability in the manufacturing system 70) or, alternatively, FALSE (indicating stability the manufacturing system 70).

Figure 15A:
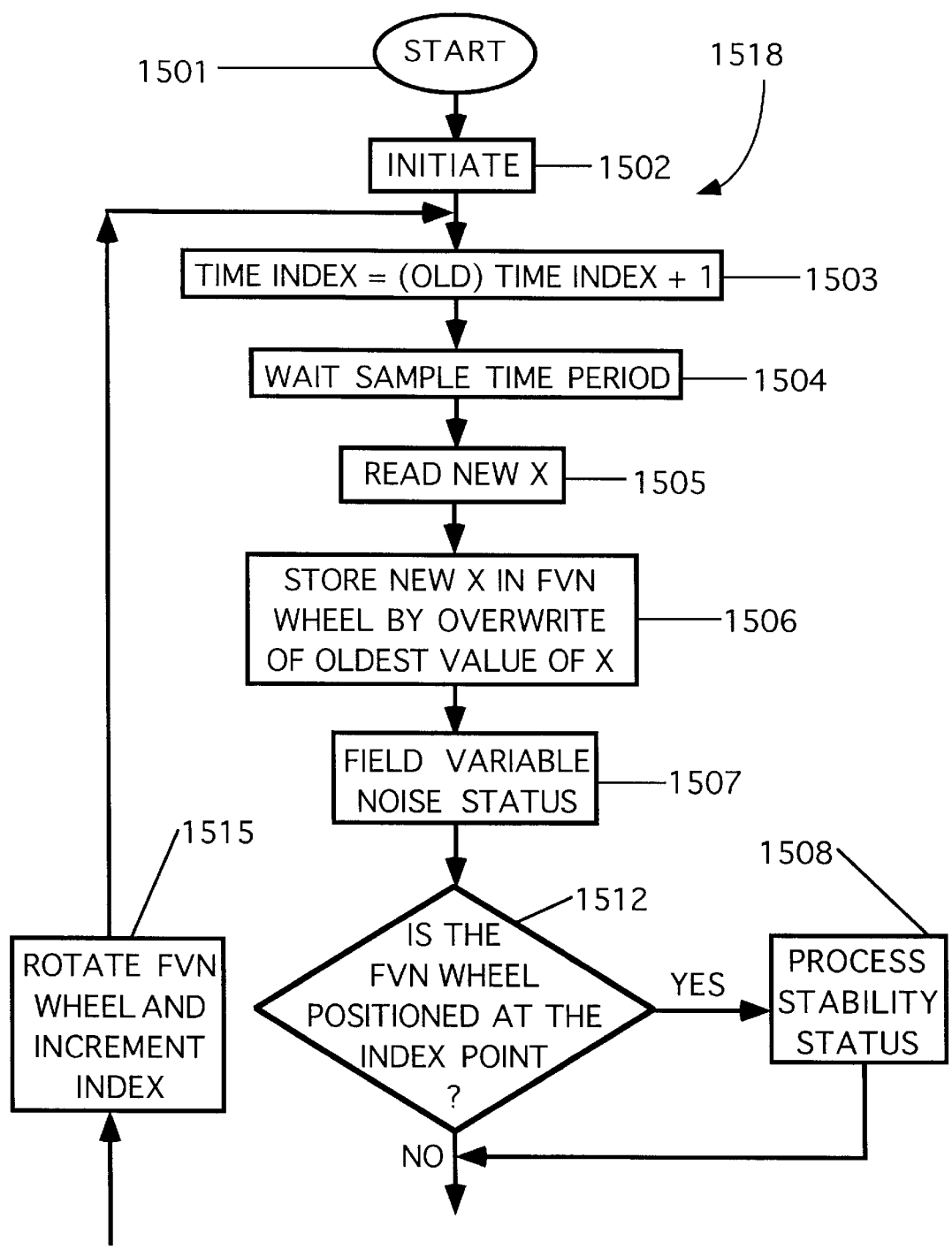
FIGS. 15A and 15B are flowcharts depicting the overall steady state characterization process related to the manufacturing system.
Figure 15B:
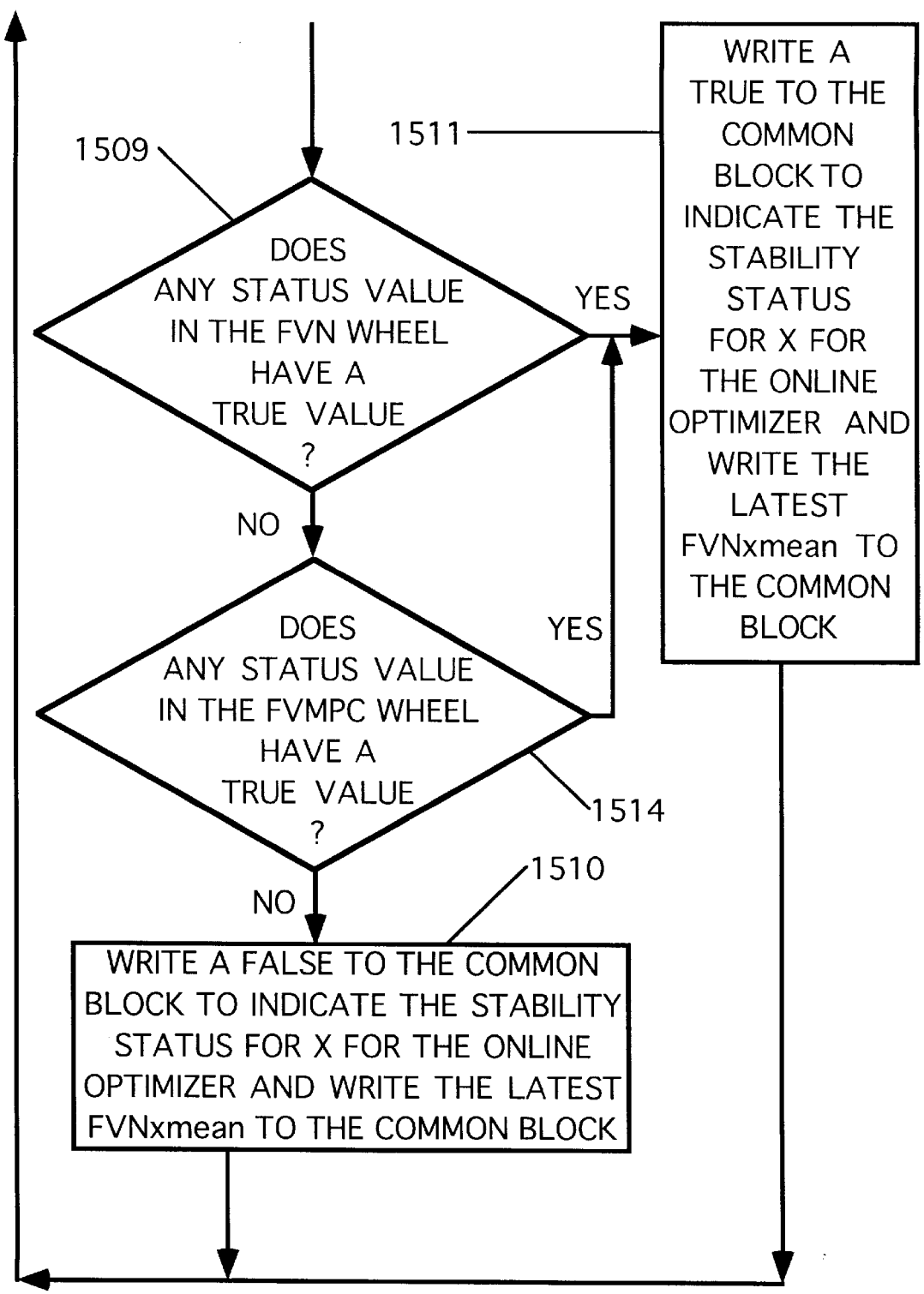
Figure 16:
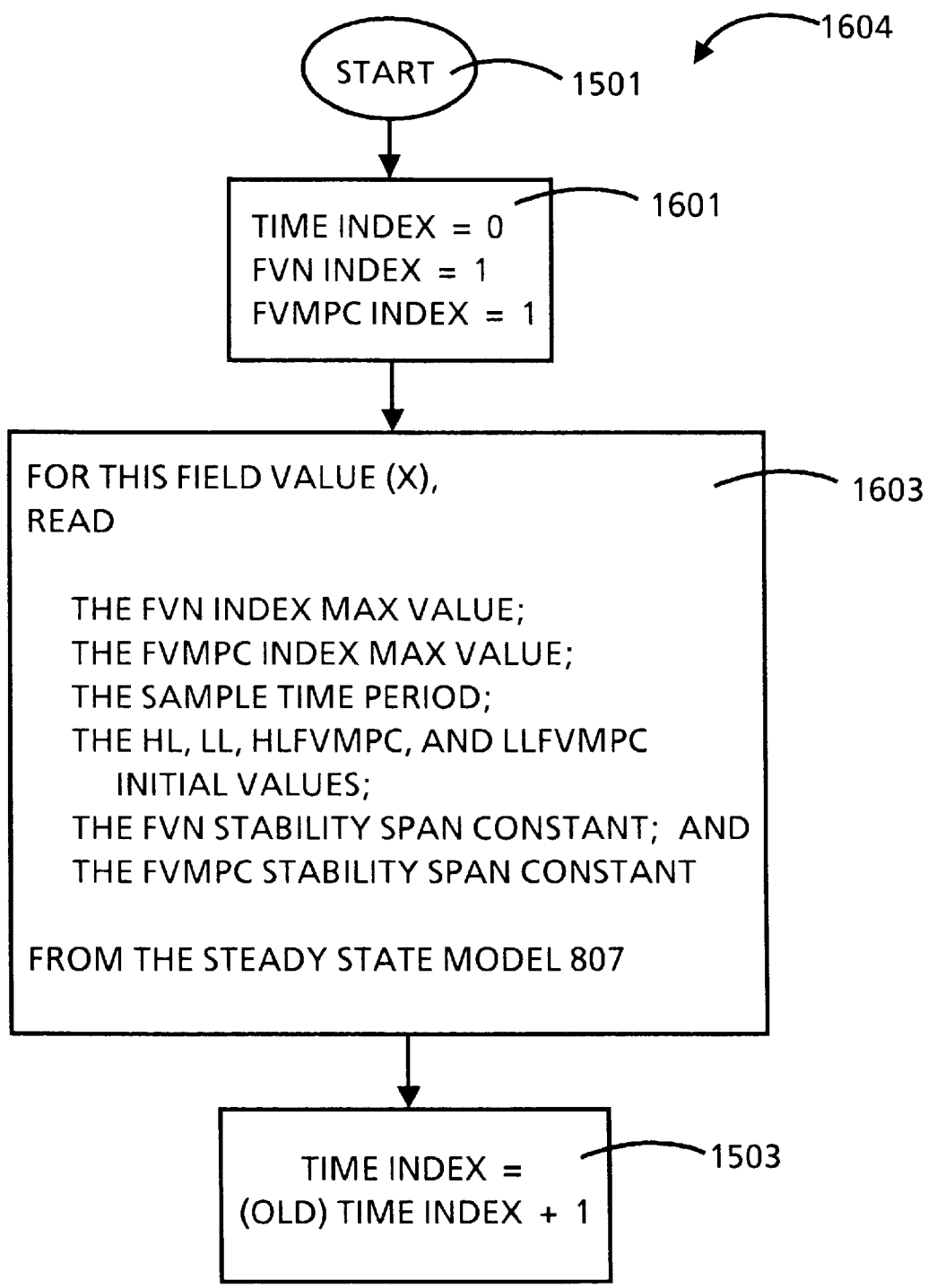
FIG. 16 is a flowchart depicting the initialization portion of the overall steady state characterization process.

With regard to the steady state characterization process 1518 for X, which is executed in a joint and coordinated manner by both steady state engine 823 (as primary facilitator) and historical engine 825 (as an interactively associated engine), FIG. 15 begins with the element Start Step 1501 which is invoked upon startup of optimizing system 73. Start Step 1501 terminates, after a read to Data Common 821 indicates that optimizing system 73 is fully operational, to the Initiation Macrostep 1502 which is further defined in FIG. 16. FIG. 16 presents an initiation expansion flowchart 1604 which expands upon Initiation Step 1502 by first indicating an orienting reference to Start Step 1501. Start Step 1501 terminates to a Step 1601 within Macrostep 1502 in which the Time Index is set to zero, the FVN Index is set equal to 1, and the FVMPC Index is set equal to 1. In this regard, the FVN Index is the datalogical indicator characterizing the relative virtual offset between the Relative Position Indicator 1302 and the Fixed Index Point 1301 of the FVN wheel 1308 and is stored as an attribute of New X Period Sector 1305. In a similar manner, the FVMPC Index is the datalogical indicator characterizing the relative offset between the Relative Position Indicator 1402 and the Fixed Index Point 1401 of the FVMPC wheel 1408. The FVMPC Index is stored as an attribute of New FVNxmean Period Sector 1405. The Time Index is used for a time tag reference in uniquely identifying the results of a specific steady state characterization process decision cycle. The Time Index is an abbreviation which is further related to a time tag; an alternative embodiment stores a complete time tag (although more storage space is used). In regard to Step 1601 within Macrostep 1502, the Time Index, the FVN Index, and the FVMPC Index are read from Data Common 821 and written to Data Common 821 by steady state engine 823. In an alternative embodiment, the Time Index, the FVN Index, and the FVMPC Index are stored within steady state engine 823. In yet another embodiment, the Time Index, the FVN Index, and the FVMPC Index are read from Historical Cache 824 and written to Historical Cache 824 by historical engine 825 following a write operation from steady state engine 823 to historical engine 825. In yet another embodiment, the Time Index, the FVN Index, and the FVMPC Index are read from Historical Cache 824 and written to Historical Cache 824 by steady state engine 823.

In an Initial Query Step 1603, Steady State Definition Data 807 within Optimizing Reference Models and Schema 801 is read by steady state engine 823 to identify The FVN Index Max Value; the FVMPC Index Max Value; The Sample Time Period; Initial values for variables identified as HL, LL, HLFVMPC, and LLFVMPC; the FVN Stability Span Constant; and the FVMPC Stability Span Constant. These data values are stored in Data Common 821 by steady state engine 823. As described with respect to Step 1601, data storage specifics related to read and write operations can be characterized by a number of alternative embodiments, which alternatives should hereinafter be generally apparent given the information presented with regard to Step 1601.

The FVN Index Max Value defines the number of period sectors in the FVN wheel 1308. As previously described, the size of the FVN wheel 1308 (related to the noise generated in the field instrument related to X) is specifically determined for each X. In a similar manner, the FVMPC Index Max Value defines the number of period sectors in the FVMPC wheel 1408. As previously described, the size of the FVMPC wheel 1408 (related to the time constant for dynamic transient response of X with respect to a forcing function within the manufacturing system 70) is specifically determined for each X. The Sample Time Period is the amount of real time during which the process of steady state characterization (related to an instance of X, and therefore potentially unique to each X as previously discussed) will effectively pause in Wait Sample Time Period Step 1504. HL is the High Level value for use in the FVN decision relating to maximum acceptable value of X above which the stability status indicates "not stable" in the steady state characterization process; HL is given an initial value based upon historical data acquired in Primary Historical Data Acquisition Step 1002 and is periodically recomputed by steady state engine 823. LL is the Low Level value for use in the FVN decision relating to minimum acceptable value of X above which the stability status indicates "not stable" in the steady state characterization process; LL is given an initial value based upon historical data acquired in Primary Historical Data Acquisition Step 1002 and is periodically recomputed by steady state engine 823. HLFVMPC is the High Level value for use in the FVMPC decision relating to maximum acceptable value of X above which the stability status indicates "not stable" in the steady state characterization process; HLFVMPC is given an initial value based upon historical data acquired in Primary Historical Data Acquisition Step 1002 and is periodically recomputed by steady state engine 823. LLFVMPC is the High Level value for use in the FVMPC decision relating to maximum acceptable value of X above which the stability status indicates "not stable" in the steady state characterization process; HLFVMPC is given an initial value based upon historical data acquired in Primary Historical Data Acquisition Step 1002 and is periodically recomputed by steady state engine 823. The FVN Stability Span Constant is used in continuing computations related to HL and LL; The FVN Stability Span Constant is given an initial value based upon historical data acquired in Primary Historical Data Acquisition Step 1002 and may be changed periodically by human operator, alternatively, 78. The FVMPC Stability Span Constant is used in continuing computations related to HLFVMPC and LLFVMPC; The FVMPC Stability Span Constant is given an initial value based upon historical data acquired in Primary Historical Data Acquisition Step 1002 and may be changed periodically by human operator 78.

Steady state engine 823 communicates The FVN Index Max Value and the FVMPC Index Max Value to historical engine 825 for use in reserving period sectors for the FVN and FVMPC wheels 1308 and 1408 related to X. The historical engine 825 may optionally use the FVN Index Max Value and the FVMPC Index Max Value if an existing FVN wheel or, alternatively, an existing FVMPC wheel does not exist with that number of period sectors.

Following Initial Query Step 1603, steady state engine 823 proceeds to increment the Time Index by one period in Time Index Increment Step 1503.

Returning to the steady state characterization process 1518 of FIG. 15 at Time Index Increment Step 1503, steady state engine 823 proceeds to Wait Sample Time Period Step 1504 after completing Time Index Increment Step 1503. In Wait Sample Time Period Step 1504, the steady state engine 823 pauses until historical engine 825 can perform Read New X Step 1505 and Store New X in FVN Wheel Step 1506 to retrieve the next set of relevant X from Data Common 821 for storage into the FVN and FVMPC wheels 1308 and 1408 located within Historical Cache 824. In this regard, steady state engine 823 monitors both Data Common 821 and Historical Cache 824 to determine when the Read New X Step 1505 and Store New X in FVN Wheel Step 1506 operations have been completed.

Historical engine 825 also virtually waits in Wait Sample Time Period Step 1504 until the time period for the step has been achieved to indicate that Read New X Step 1505 and Store New X in FVN Wheel Step 1506 should be executed. In this regard, historical engine 825 can be active in performing other historical tasks during its virtual wait (virtual in the context of the steady state characterization process for a specific instance of X) in Wait Sample Time Period Step 1504.

Within the steady state characterization process, both steady state engine 823 and historical engine 825 terminate Wait Sample Time Period Step 1504 when the sample time period has expired. In an alternative embodiment, reading and monitoring of data values within Data Common 821 by steady state engine 823 can be used as inputs to a decision to terminate Wait Sample Time Period Step 1504.

Read New X Step 1505 is performed after Wait Sample Time Period Step 1504 terminates. During Read New X Step 1505, steady state engine 823 reads Historical Cache 824 to monitor the operation of historical engine 825 and uses status indicators to maintain synchronization of the activity of historical engine 825 with respect to the steady state characterization process. Historical engine 825 reads a new value X from Data Common 821 in Read New X Step 1505. As previously indicated, Historical engine 825 may, in an alternative embodiment, read the entire set of new values for all Xs related to the steady state characterization process from Data Common 821 in Read New X Step 1505.

Within the steady state characterization process, both steady state engine 823 and historical engine 825 terminate Read New X Step 1505 when X has been acquired from Data Common 821 by historical engine 825. In an alternative embodiment, both steady state engine 823 and historical engine 825 terminate Read New X Step 1505 when the entire set of new values for all Xs related to the steady state characterization process from Data Common 821 have been acquired from Data Common 821 by historical engine 825.

Store New X in FVN Wheel Step 1506 is performed after Read New X Step 1505 terminates. During Store New X in FVN Wheel Step 1506, steady state engine 823 reads Historical Cache 824 to monitor the operation of historical engine 825 and uses status indicators to maintain synchronization of the activity of historical engine 825 with respect to the steady state characterization process. Historical engine 825 stores the new value for X into the FVN wheel 1308 within Historical Cache 824 by overwriting the values related to X in the oldest FVN period Sector during Store New X in FVN Wheel Step 1506. As previously indicated, Historical engine 825 may, in an alternative embodiment, store the set of the new values for X into a corresponding set of more than one FVN wheel 1308 within Historical Cache 824 by overwriting the values related to the individual instances of each X in the oldest period sectors within each FVN wheel 1308 during Store New X in FVN Wheel Step 1506.

After the conclusion of Store New X in FVN Wheel Step 1506, the historical engine 825 is freed for other tasks related to optimizing system 73, and monitors both the steady state engine 823 and Data Common 821 to identify the next historical operation needed by the steady state characterization process. In an alternative embodiment, the historical engine 825 responds to an interrupt from steady state engine 823 to perform needed tasks related to historical operations.

Field Variable Noise Macrostep 1507 is performed by steady state engine 823 and historical engine 825 after the conclusion of Store New X in FVN Wheel Step 1506. Most of the steps within Field Variable Noise Macrostep 1507 (except as indicated) are performed by steady state engine 823. Field Variable Noise Macrostep 1507 is further discussed with respect to FIG. 17.

Figure 17A:
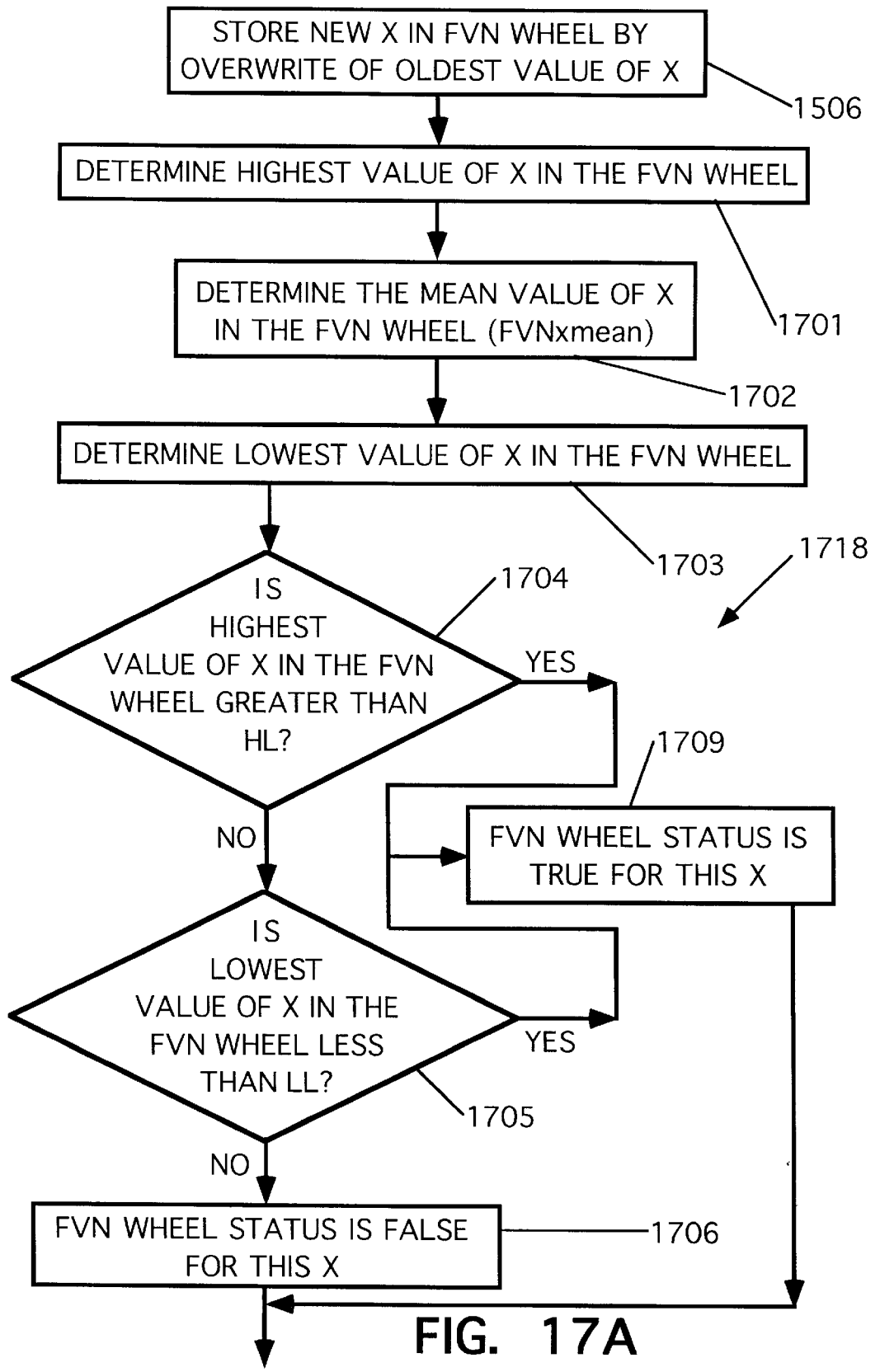
FIGS. 17A and 17B a flowcharts depicting details of the measurement noise related portion of the overall steady state characterization process for a process variable.
Figure 17B:
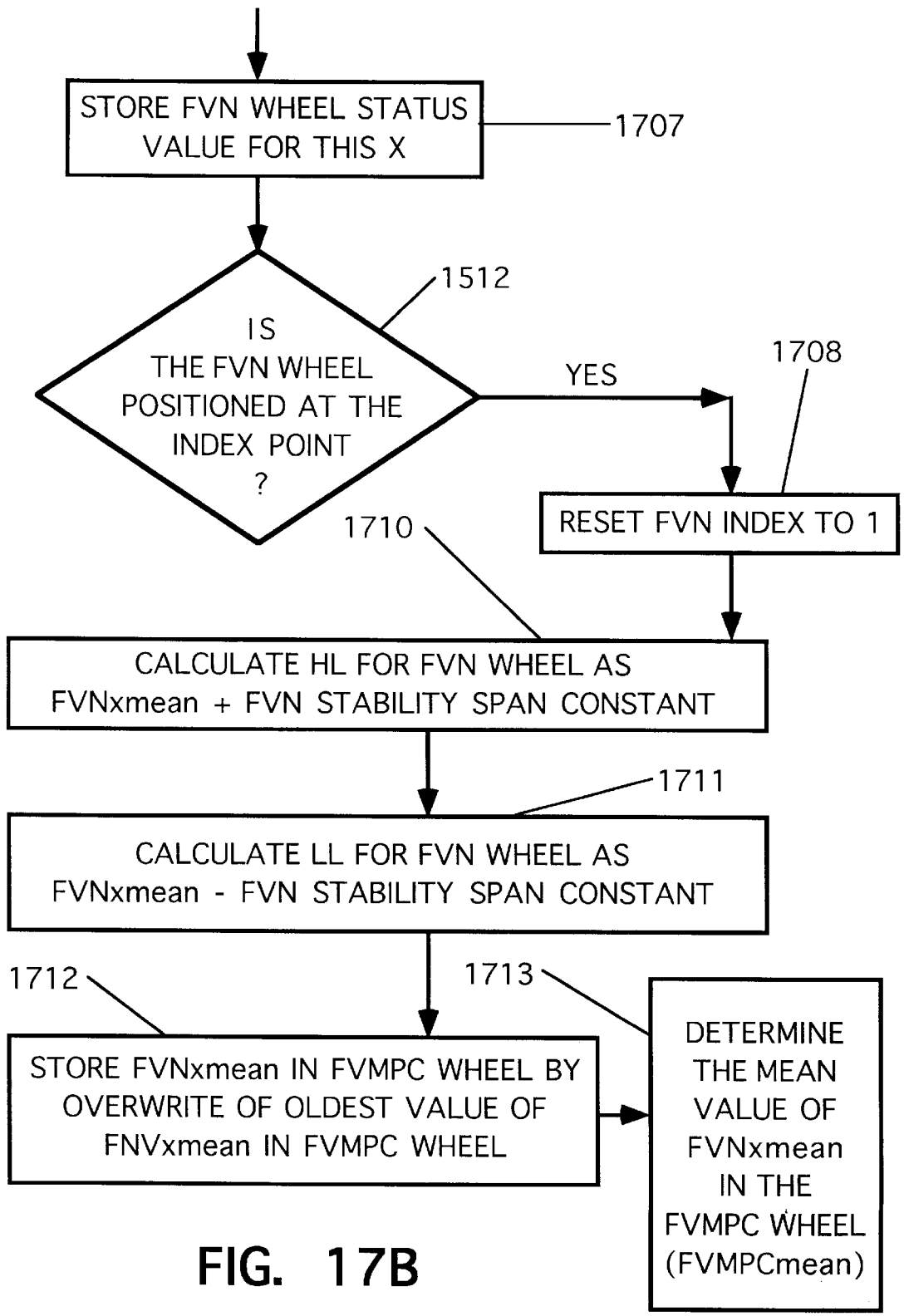

FIG. 17 presents an FVN expansion flowchart 1718 which expands upon Field Variable Noise Macrostep 1507 by first indicating an orienting reference to Store New X in FVN Wheel Step 1506. Following Store New X in FVN Wheel Step 1506, steady state engine 823 Determines the highest value of X in the FVN wheel 1308 in a Step by reading all values of X within the FVN wheel 1308 in Historical Cache 824 and comparing the different values to identify the X of greatest magnitude. Steady state engine 823 stores this value locally. In an alternative embodiment, Steady state engine 823 writes and stores this value in Data Common 821.

Following Step 1701, steady state engine 823 determines the a mean value of X in the FVN wheel 1308 in a Step 1702 by reading all values of X within the FVN wheel 1308 in Historical Cache 824 and averaging the different values to identify an average value for X. This average value for X is be identified as FVNxmean. Steady state engine 823 stores FVNxmean locally. In an alternative embodiment, Steady state engine 823 writes and stores FVNxmean in Data Common 821.

Following Step 1702, steady state engine 823 determines the lowest value of X in the FVN wheel 1308 in a Step 1703 by reading all values of X within the FVN wheel 1308 in Historical Cache 824 and comparing the different values to identify the X of lowest magnitude. Steady state engine 823 stores this value locally. In an alternative embodiment, Steady state engine 823 writes and stores this value in Data Common 821.

Following Step 1703, steady state engine 823 executes Decision Step 1704 to determine if the highest value of X in the FVN wheel 1308 (determined in Step 1701) is greater than HL. If the answer is NO, steady state engine 823 proceeds to Decision Step 1705. If the answer is YES, steady state engine 823 proceeds to Step 1709.

If the answer to Decision Step 1704 is YES, steady state engine 823 proceeds to Step 1709. In Step 1709, the FVN wheel 1308 stability status for the X being evaluated is set TRUE to indicate that instability exists with respect to noise in this situation the for the period Sector identified with the current FVN Index. Upon completion of Step 1709, steady state engine 823 proceeds to Step 1707 in the steady state characterization process.

If the answer to Decision Step 1704 is NO, steady state engine 823 proceeds to Decision Step 1705. In Step 1705 steady state engine 823 determines if the lowest value of X in the FVN wheel 1308 (determined in Step 1702) is lower than LL. If the answer is NO, steady state engine 823 proceeds to Step 1706. If the answer is YES, steady state engine 823 proceeds to Step 1709 (Step 1709 operation has been previously described).

If the answer to Decision Step 1705 is NO, steady state engine 823 proceeds to Step 1706. In Step 1706, The FVN wheel 1308 stability status for the X being evaluated is set FALSE to indicate that stability exists with respect to noise in this situation the for the period Sector identified with the current FVN Index. Upon completion of Step 1706, steady state engine 823 proceeds to Step 1707 in the steady state characterization process.

In Step 1707, the appropriate period Sector associated with the current FVN Index within the FVN Wheel is updated. In performing this task, steady state engine 823 writes to an prompts historical engine 825 to perform the modification to the period Sector within the FVN Wheel. Historical engine 825 reads the associated Status Value 1303 in the appropriate period Sector of the FVN Wheel, modifies the associated Status Value 1303, and writes an adjusted value for the associated Status Value 1303 to the appropriate period Sector of the FVN Wheel 1308 within Historical Cache 824 to be TRUE (a value of 1) if the value of the FVN Wheel Status within steady state engine 823 is TRUE. In a similar manner, historical engine 825 modifies associated Status Value 1303 in the appropriate period Sector of the FVN Wheel 1308 within Historical Cache 824 to be FALSE (a value of 0) if the value of the FVN Wheel Status within steady state engine 823 is FALSE. Following the update of the Status Value 1303 within the appropriate FVN Wheel 1308 of Historical Cache 824, steady state engine 823 proceeds to Decision Step 1512.

Returning to FIG. 15, steady state engine 823 proceeds from Step 1707 to Decision Step 1512. In Step 1512, steady state engine 823 reads the FVN Index from Historical Cache 824 and determines if the position of the Relative Position Indicator 1302 of FVN Wheel 1308 is at the same position as the FVN Fixed Index Point (Fixed Index Point 1301). If the FVN Index value is equal to the value of FVN Index Maximum Value, indicating that the position of the FVN Wheel 1308 (Relative Position Indicator 1302) is at the same position as the FVN Fixed Index Point (Fixed Index Point 1301), steady state engine 823 proceeds from Decision Step 1512 to Process Stability Macrostep 1508. If the FVN Index value is not equal to the value of FVN Index Maximum Value, indicating that the position of the FVN Wheel (Relative Position Indicator 1302) is not yet at the same position as the FVN Fixed Index Point (Fixed Index Point 1301), steady state engine 823 proceeds from Decision Step 1512 to Step 1509.

If the FVN Index value is equal to the value of FVN Index Maximum Value, indicating that the position of the FVN Wheel 1308 (Relative Position Indicator 1302) is at the same position as the FVN Fixed Index Point (Fixed Index Point 1301), steady state engine 823 proceeds from Decision Step 1512 to Process Stability Macrostep 1508. FIG. 17 initiates expansion of Process Stability Macrostep 1508 by indicating an orienting reference to Decision Step 1512. Following Decision Step 1512, steady state engine 823 proceeds to Step 1708 where the FVN Index is set to 1. The new FVN Index value is stored in Data Common 821 by steady state engine 823.

Following Step 1708, steady state engine 823 proceeds to Step 1710.

In Step 1710, steady state engine 823 reads FVNxmean and the FVN Stability Span Constant from Data Common 821. Steady state engine 823 proceeds to calculate a new HL for the associated FVN Wheel 1308 by adding the FVNxmean and the FVN Stability Span Constant together. Steady state engine 823 proceeds to write the new HL for the associated FVN Wheel 1308 into Data Common 821. At the conclusion of Step 1710, Steady state engine 823 proceeds to Step 1711.

In Step 1711, steady state engine 823 reads FVNxmean and the FVN Stability Span Constant from Data Common 821. Steady state engine 823 proceeds to calculate a new LL for the associated FVN Wheel 1308 by subtracting the FVN Stability Span Constant from the FVNxmean. Steady state engine 823 proceeds to write the new LL for the associated FVN Wheel 1308 into Data Common 821. At the conclusion of Step 1711, Steady state engine 823 proceeds to Step 1712.

In Step 1712, the appropriate period Sector associated with the current FVMPC Index within the FVMPC Wheel is updated with the value of FVNxmean calculated in Step 1702. In performing this task, steady state engine 823 prompts historical engine 825 to perform the modification to the period Sector within the FVMPC Wheel 1408. During Step 1712, steady state engine 823 prompts historical engine 825 to perform the storage operation and uses status indicators to maintain synchronization of the activity of historical engine 825 with respect to the steady state characterization process. Historical engine 825 responds to the prompting message by reading and acquiring the value of FVNxmean from Data Common 821 and storing the value for FVNxmean into the FVMPC wheel 1408 within Historical Cache 824 by overwriting the FVNxmean values related to X in the oldest FVMPC period sector. Following the update with the value of FVNxmean calculated in Step 1702 of the appropriate FVMPC Wheel period Sector for the FVMPC wheel 1408 in Historical Cache 824, steady state engine 823 proceeds to Step 1713.

After the conclusion of Step 1712, the historical engine 825 is freed for other tasks related to optimizing system 73, and it reads and monitors both the steady state engine 823 and Data Common 821 to identify the next historical operation needed by the steady state characterization process. In an alternative embodiment, the historical engine 825 responds to an interrupt written from steady state engine 823 to perform needed tasks related to historical operations.

In Step 1713, steady state engine 823 determines the mean value of the values of FVNxmean in the FVMPC wheel 1408 by reading all values of FVNxmean within the FVMPC wheel 1408 in Historical Cache 824 and averaging the different values to identify an average value for FVNxmean. This average value for FVNxmean is identified as FVMPCmean. Steady state engine 823 stores FVMPCmean locally. In an alternative embodiment, steady state engine 823 writes and stores FVMPCmean in Data Common 821.

Figure 18A:
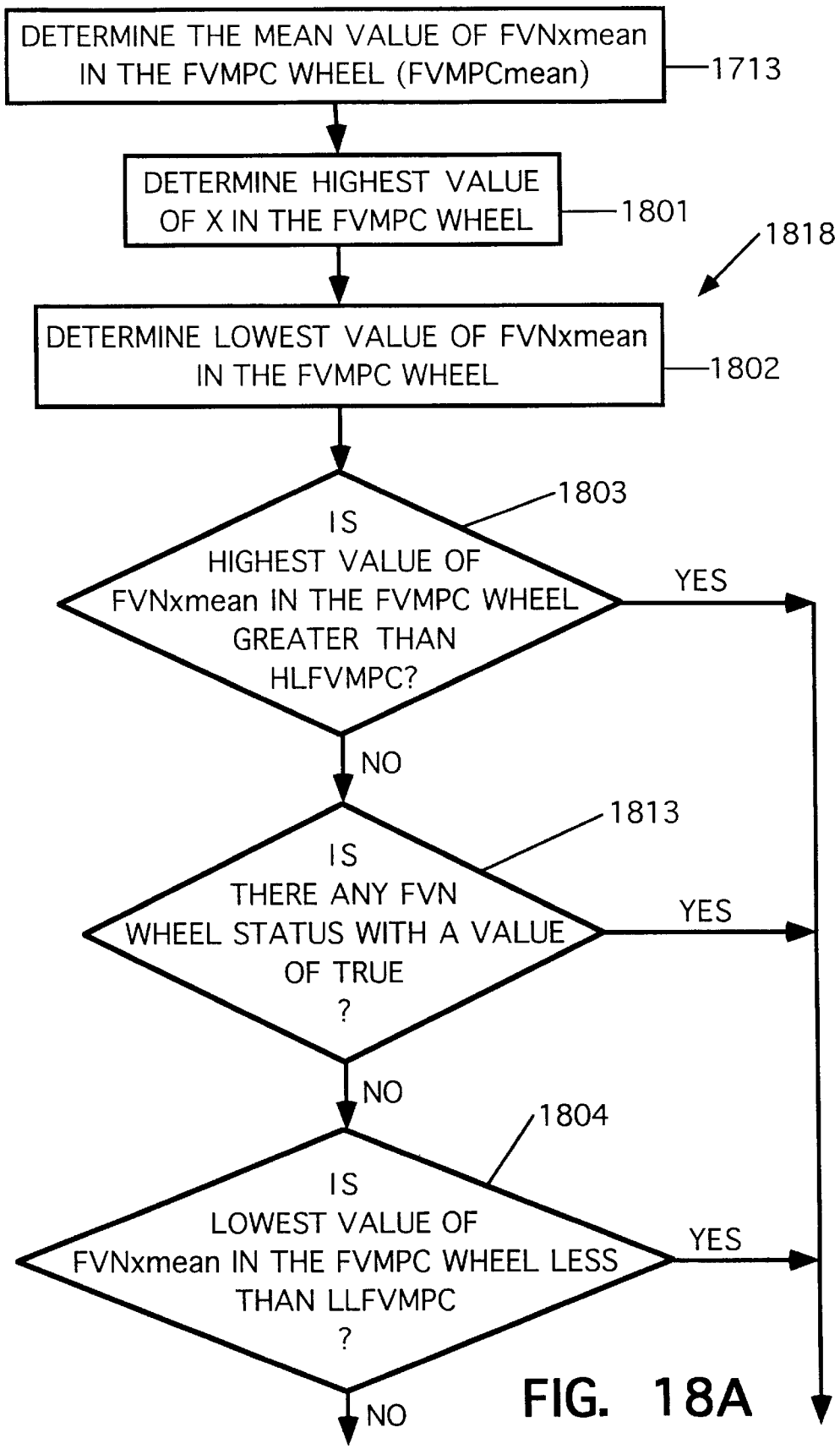
FIGS. 18A and 18B flowcharts depicting the details of the transient response related portion of the overall steady state characterization process for a process variable.
Figure 18B:
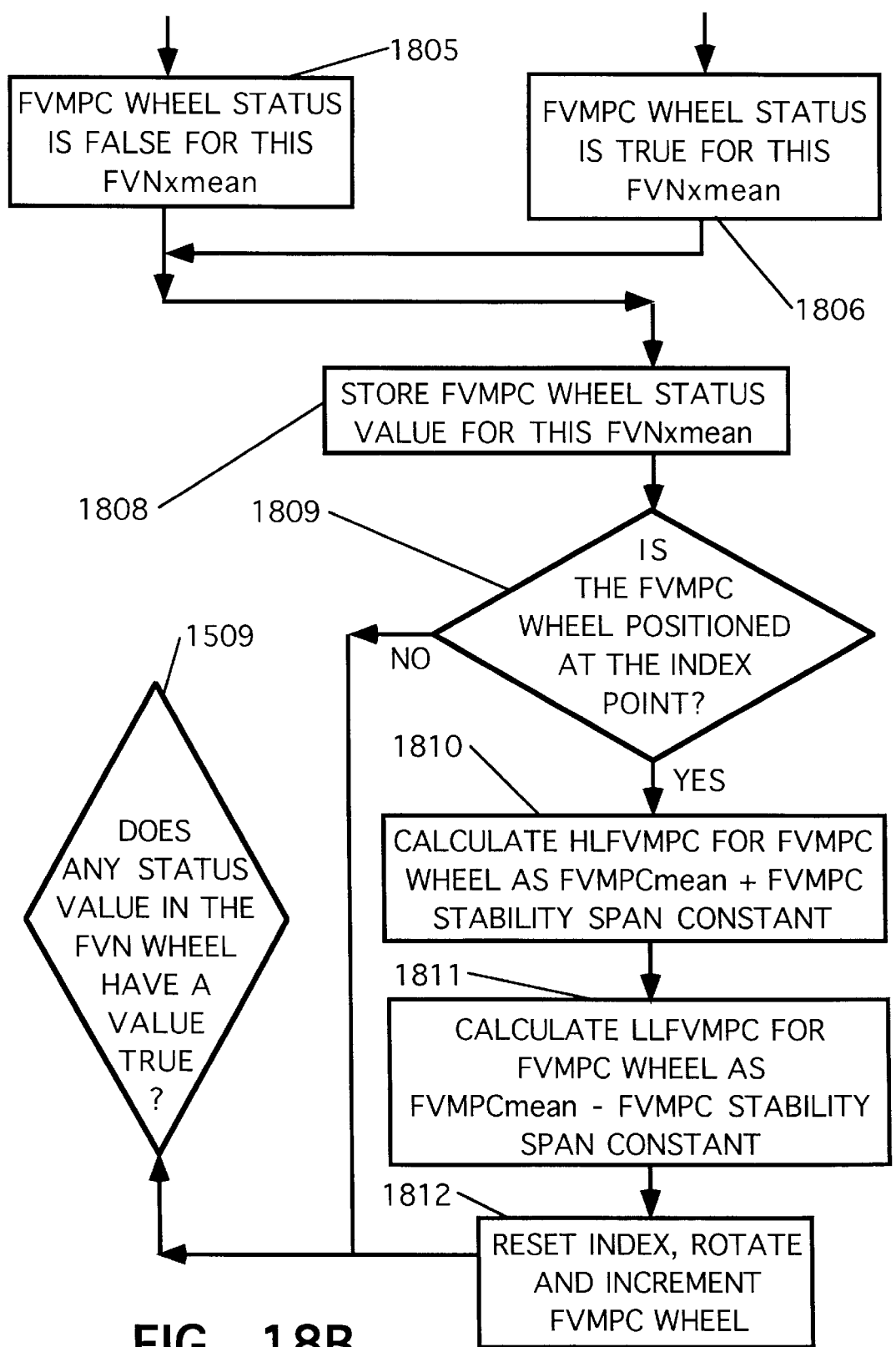

Referring now to FIG. 18, FIG. 18 presents the FVMPC expansion flowchart 1818 which continues the description of the steady state characterization process 1518 by first indicating an orienting reference to Step 1713. Following Step 1713, steady state engine 823 proceeds to Step 1801. In Step 1801, steady state engine 823 reads the values of FVNxmean from the FVMPC Wheel in Historical Cache 824. Steady state engine 823 then determines the highest value of FVNxmean by comparing the different values to identify the FVNxmean of greatest magnitude. Steady state engine 823 stores this highest value locally. In an alternative embodiment, Steady state engine 823 writes and stores this value in Data Common 821.

After the conclusion of Step 1902, In Step 1802, steady state engine 823 reads the values of FVNxmean from the FVMPC Wheel 1408 in Historical Cache 824. Steady state engine 823 then determines the highest value of FVNxmean and by comparing the different values to identify the FVNxmean of greatest magnitude. Steady state engine 823 stores this value locally. In an alternative embodiment, Steady state engine 823 writes and stores this value in Data Common 821.

Following Step 1801, steady state engine 823 determines the lowest value of FVNxmean in the FVMPC wheel in a Step 1802 by reading all values of FVNxmean within the FVMPC wheel 1408 in Historical Cache 824 and comparing the different values to identify the FVNxmean of lowest magnitude. Steady state engine 823 stores this value locally. In an alternative embodiment, Steady state engine 823 writes and stores this value in Data Common 821.

Following Step 1802, steady state engine 823 executes Decision Step 1803 to determine if the highest value of FVNxmean in the FVMPC wheel 1408 (determined in Step 1701) is greater than HLFVMPC. Steady state engine 823 reads all values of FVNxmean within the FVMPC wheel 1408 in Historical Cache 824 and compares the different values to HLFVMPC to determine if any FVNxmean is greater in magnitude than HLFVMPC. If the answer is NO in all cases, steady state engine 823 proceeds to Decision Step 1813. If the answer is YES for any case, steady state engine 823 proceeds to Step 1806.

If the answer to Decision Step 1803 is NO, steady state engine 823 proceeds to Decision Step 1813. In Step 1813 steady state engine 823 reads Status Values 1303 in the associated FVN wheel 1308 within Historical Cache 824 and examines each status value to determine if any have a value of TRUE (1). If any Status Values 1303 is TRUE the steady state engine 823 defines the answer to Decision Step 1803 as YES; steady state engine 823 then proceeds to Step 1806. If no values are TRUE the steady state engine 823 defines the answer to Decision Step 1803 as NO; steady state engine 823 then proceeds to Step 1804.

If the answer to Decision Step 1813 is NO, steady state engine 823 executes Decision Step 1804 to determine if the lowest value of FVNxmean in the FVMPC wheel is greater than LLFVMPC. Steady state engine 823 reads all values of FVNxmean within the FVMPC wheel in Historical Cache 824 and compares the different values to LLFVMPC to determine if any FVNxmean is lower in magnitude than LLFVMPC. If the answer is NO in all cases, steady state engine 823 proceeds to Step 1805. If the answer is YES for any case, steady state engine 823 proceeds to Step 1806.

If the answer to Decision Step 1803 is YES, steady state engine 823 proceeds to Step 1806; If the answer to Decision Step 1813 is YES, steady state engine 823 proceeds to Step 1806; If the answer to Decision Step 1804 is YES, steady state engine 823 proceeds to Step 1806. In Step 1806, the FVMPC wheel 1408 stability status for the X being evaluated is set TRUE to indicate that instability exists for dynamic transient response of X with respect to a forcing function in this situation the for the period Sector identified with the current FVMPC Index. Upon completion of Step 1806, steady state engine 823 proceeds to Step 1808 in the steady state characterization process.

If the answer to Decision Step 1804 is NO, steady state engine 823 proceeds to Step 1805. In Step 1805, the FVMPC wheel 1408 stability status for the X being evaluated is set FALSE to indicate that stability exists for dynamic transient response of X with respect to a forcing function in this situation the for the period Sector identified with the current FVMPC Index. Upon completion of Step 1805, steady state engine 823 proceeds to Step 1808 in the steady state characterization process 1518.

In Step 1808, the appropriate period sector associated with the current FVMPC Index within the FVMPC heel 1408 is updated. In performing this task, steady state engine 823 prompts historical engine 825 to perform the modification to the period Sector within the FVMPC Wheel. Historical engine 825 modifies associated Status Value 1403 in the appropriate period Sector of the FVMPC Wheel within Historical Cache 824 to be TRUE (a value of 1) if the value of the FVMPC Wheel Status within steady state engine 823 is TRUE. Historical engine 825 modifies associated Status Value 1403 in the appropriate period Sector of the FVMPC Wheel within Historical Cache 824 to be FALSE (a value of 0) if the value of the FVMPC Wheel Status within steady state engine 823 is FALSE. Following the update of the Status Value 1403 within the appropriate period sector in FVMPC Wheel of Historical Cache 824, steady state engine 823 proceeds to Decision Step 1809.

In Step 1809, steady state engine 823 reads the FVMPC Index from Historical Cache 824 and determines if the position of the FVMPC Wheel 1408 (Relative Position Indicator 1402) is at the same position as the FVMPC Fixed Index Point (Fixed Index Point 1401). If the FVMPC Index value is equal to the value of FVMPC Index Maximum Value, indicating that the position of the FVMPC Wheel 1408 (Relative Position Indicator 1402) is at the same position as the FVMPC Fixed Index Point (Fixed Index Point 1401), steady state engine 823 proceeds from Decision Step 1809 Step 1810. If the FVMPC Index value is not equal to the value of FVMPC Index Maximum Value, indicating that the position of the FVMPC Wheel 1408 (Relative Position Indicator 1402) is not yet at the same position as the FVMPC Fixed Index Point (Fixed Index Point 1401), steady state engine 823 proceeds from Decision Step 1809 to Step Decision Step 1509.

If the FVMPC Index value is equal to the value of FVMPC Index Maximum Value, indicating that the position of the FVMPC Wheel 1408 (Relative Position Indicator 1302) is at the same position as the FVMPC Fixed Index Point (Fixed Index Point 1401), steady state engine 823 proceeds from Decision Step 1809 Step 1810.

In Step 1810, steady state engine 823 reads FVMPCmean and the FVMPC Stability Span Constant from Data Common 821. Steady state engine 823 proceeds to calculate a new HLFVMPC for the associated FVMPC Wheel 1408 by adding the FVMPCmean and the FVMPC Stability Span Constant together. Steady state engine 823 proceeds to write the new HLFVMPC for the associated FVMPC Wheel 1408 into Data Common 821. At the conclusion of Step 1810, Steady state engine 823 proceeds to Step 1811.

In Step 1811, steady state engine 823 reads FVMPCmean and the FVMPC Stability Span Constant from Data Common 821. Steady state engine 823 proceeds to calculate a new LLFVMPC for the associated FVMPC Wheel 1408 by subtracting the FVMPC Stability Span Constant from the FVMPCmean. Steady state engine 823 proceeds to write the new LLFVMPC for the associated FVMPC Wheel 1408 into Data Common 821. At the conclusion of Step 1811, Steady state engine 823 proceeds to Step 1812.

In Step 1812, steady state engine 823 proceeds to set the FVMPC Index is set to 1. The new FVMPC Index value is written and stored in Data Common 821 by steady state engine 823. The steady state engine 823 then writes to and directs the historical engine 825 to effectively rotate the FVMPC wheel 1408 located in Historical Cache 824 by one period Sector as discussed with respect to FIGS. 12 and 14 so that the next instance of New FVNxmean 1405 overwrites the oldest period Sector 1406. Steady state engine 823 proceeds to Step 1509 upon completion of the task related to Step 1812.

After the conclusion of Step 1812, the historical engine 825 is freed for other tasks related to optimizing system 73, historical engine 825 reads and monitors both the steady state engine 823 and Data Common 821 to identify the next historical operation needed by the steady state characterization process. In an alternative embodiment, the historical engine 825 responds to a write interrupt from steady state engine 823 to perform needed tasks related to historical operations.

Returning to the steady state characterization process 1518 in FIG. 15 at step 1509, steady state engine 823 enters Decision Step 1509 from Decision Step 1512 if the FVN Index value is not equal to the value of FVN Index Maximum Value, indicating that the position of the FVN Wheel 1308 (Relative Position Indicator 1302) is not yet at the same position as the FVN Fixed Index Point (Fixed Index Point 1301). Alternatively, steady state engine 823 enters Decision Step 1509 upon completion of the task related to Step 1812. In Step 1509 steady state engine 823 reads Status Values 1303 in the associated FVN wheel 1308 within Historical Cache 824 and examines each status value to determine if any have a value of TRUE (1). If any Status Values 1303 is TRUE (1) the steady state engine 823 defines the answer to Decision Step 1509 as YES, and steady state engine 823 then proceeds to Step 1511. If no status values 1303 are TRUE (1), the steady state engine 823 defines the answer to Decision Step 1509 as NO, and steady state engine 823 then proceeds to Decision Step 1514.

Steady state engine 823 then proceeds to Decision Step 1514 if the answer to Decision Step 1509 is NO. In Step 1514 steady state engine 823 reads Status Values 1403 in the associated FVMPC wheel 1408 within Historical Cache 824 and examines each status value 1403 to determine if any have a value of TRUE (1). If any Status Values 1403 is TRUE the steady state engine 823 defines the answer to Decision Step 1514 as YES, and steady state engine 823 then proceeds to Step 1511. If no status values 1303 are TRUE, the steady state engine 823 defines the answer to Decision Step 1509 as NO, and steady state engine 823 then proceeds to Step 1510.

Steady state engine 823 enters Decision Step 1511 from Decision Step 1509 if any Status Values 1303 in the associated FVN wheel 1308 within Historical Cache 824 are TRUE. Alternatively, steady state engine 823 enters Decision Step 1509 from Decision Step 1514 if any Status Values 1403 in the associated FVMPC wheel 1408 within Historical Cache 824 are TRUE. In Step 1511, a TRUE (1) is written to the Data Common 821 by steady state engine 823 to indicate that the stability status resulting from the steady state characterization process is TRUE, indicating that stability does not exist with respect to the manufacturing system 70; the stability status is further referenced by SOLO Executive Engine 820 as it executes the Steady State Decision Step 902. Steady state engine 823 proceeds to Step 1515 upon completion of the tasks of Step 1511.

Steady state engine 823 enters Decision Step 1510 from Decision Step 1509 if all Status Values 1403 in the associated FVMPC wheel 1408 within Historical Cache 824 are FALSE (0). In Step 1510, a FALSE (0) is written to the Data Common 821 by steady state engine 823 to indicate that the stability status resulting from the steady state characterization process is FALSE, indicating that stability does exist with respect to the manufacturing system 70; the stability status is further referenced by SOLO Executive Engine 820 as it executes the Steady State Decision Step 902. Steady state engine 823 proceeds to Step 1515 upon completion of the tasks of Step 1510.

In Step 1515, steady state engine 823 directs the historical engine 825 to effectively rotate the FVN wheel 1308 located in Historical Cache 824 by one period Sector as discussed with respect to FIGS. 12 and 14 so that the next instance of New X 1305 overwrites the oldest period Sector 1306. Steady state engine 823 proceeds to Time Index Increment Step 1503 upon completion of the task related to Step 1515.

Figure 19:
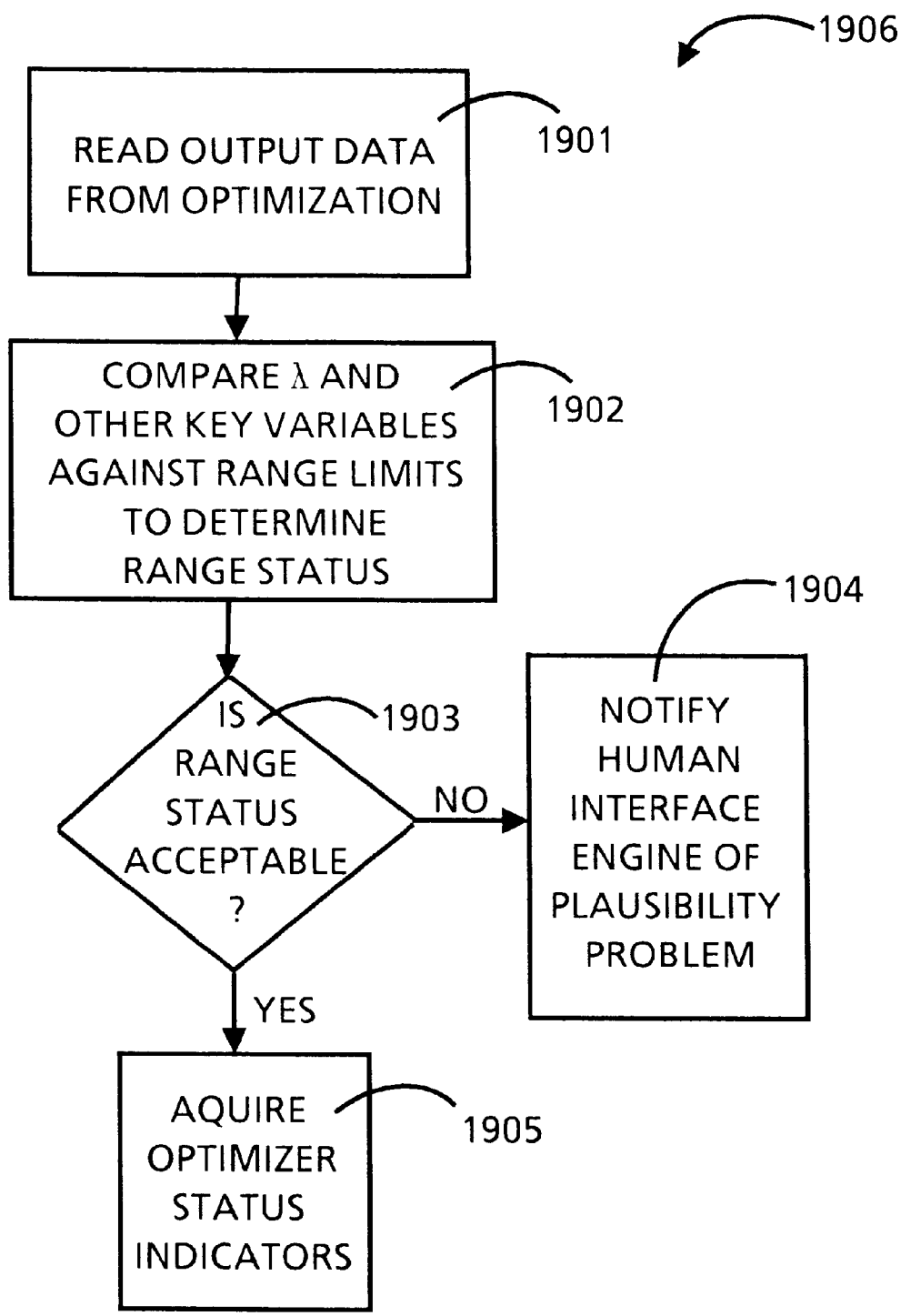
FIGS. 19 and 20 present flowcharts collectively demonstrating the method used to determine plausibility of outputs from the optimizer.
Figure 20:
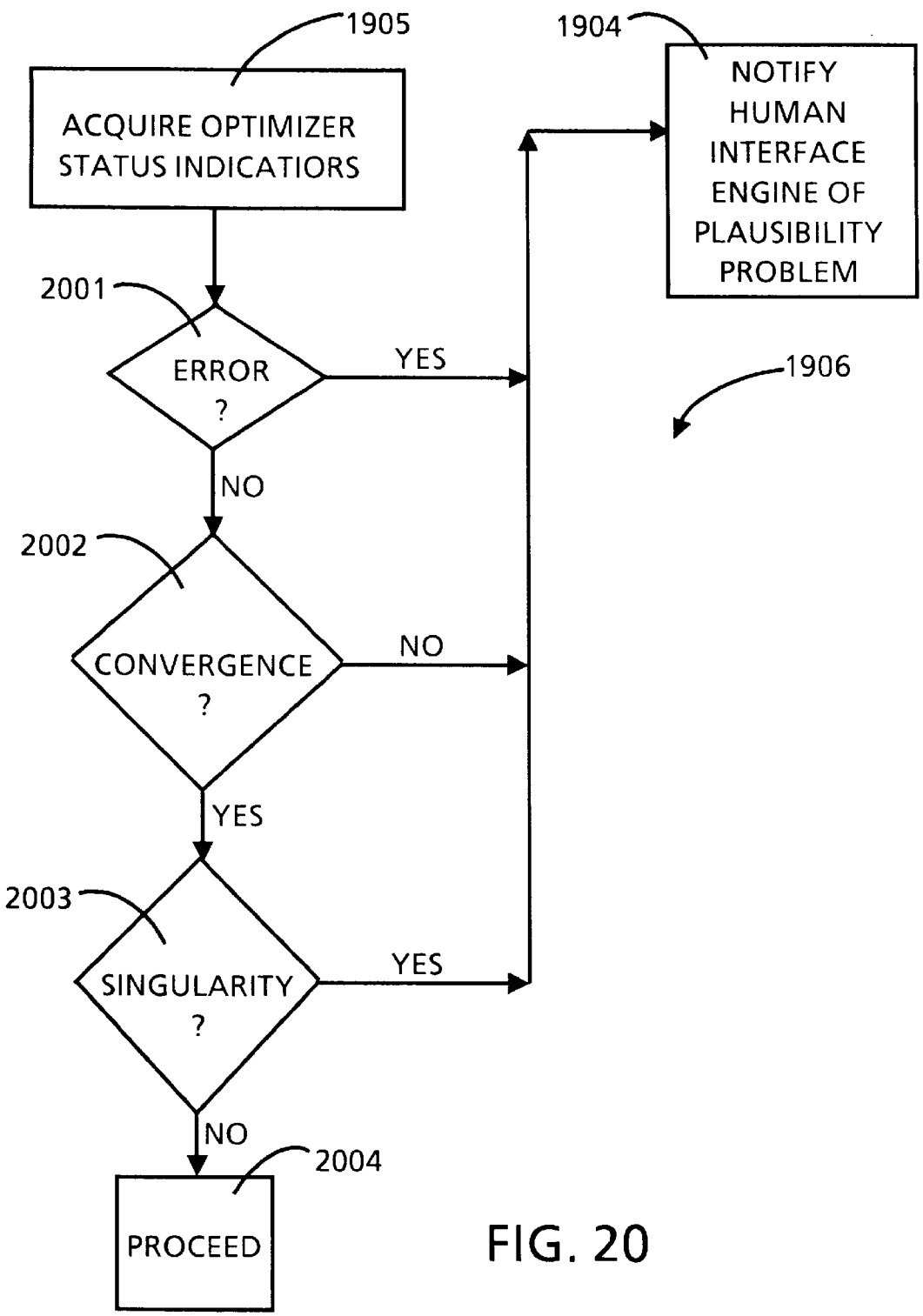

FIGS. 19 and 20 present flowcharts collectively demonstrating the confidence method 1906 used as part of the decision regarding plausibility of outputs from a solution by optimizer engine 822 of an instance of a formulated optimization problem. The determinations regarding plausibility data for use in Reconciliation Data Plausibility Decision Step 904, Parameter Data Plausibility Decision Step 906, and Setpoint Acceptability Decision Step 909 is executed after the principal respective optimization solution ask in each of the following steps: Reconcile Reduced Model Operation Step 903, Detailed Parameter Model solution Step 905, and Economic Setpoints Model Solution step 907, respectively. The confidence method 1906 is the general method used to establish a set of confidence concerning the validity of the solution data in Data Common 821 from a solution by optimizer engine 822 of an instance of a formulated optimization problem. The confidence method 1906 begins with Step 1901 in which the solution data and optimizer status bits in Data Common 821 which were written into Data Common 821 by optimizer engine 822 are read by SOLO Executive Engine 820. SOLO Executive Engine 820 then proceeds from Step 1901 to Step 1902.

In Step 1902, SOLO Executive Engine 820 reads Optimizing Reference Models and Schema 801 to acquire various limits and ranges for the Lagrangian Multipliers (LAMBDA) and other key variables which were output by the solution to the formulated optimization problem. SOLO Executive Engine 820 compares the solution data to the various limits and ranges and generates a virtual acceptability range status value for each comparison. The individual comparisons are effectively AND to generated a general range status value. Following this task, SOLO Executive Engine 820 proceeds from Step 1902 to Decision Step 1903.

In Decision Step 1903, SOLO Executive Engine 820 evaluates the general range status value to determine if it indicates a status problem from the task of Step 1902 or if no status problem is indicated. If the general range status value is not acceptable, SOLO Executive Engine 820 proceeds from Step 1903 to Step 1904. If the general range status value is not acceptable, SOLO Executive Engine 820 proceeds from Step 1903 to Step 1905. Optionally, a query to Data Common 821 is additionally made to check interim conditions relating to manufacturing system 70 in determining the general range status value.

Step 1904 is a general step representing either Setpoints Problem Notification Step 911, Parameter Plausibility Problem Notification Step 912, or Reconciliation Problem Notification Step 913 as discussed with respect to FIG. 9. As an option, Step 1904 can include some error detection logic to help identify the nature or location of a particular problem in the system.

In Step 1905, SOLO Executive Engine 820 reads Optimizing Reference Models and Schema 801 to acquire various diagnostic statuses which were output by optimizer engine 822 during the solution to the formulated optimization problem. Following this task, SOLO Executive Engine 820 proceeds from Step 1905 to Decision Step 2001.

Referring now to FIG. 20, FIG. 20 provides an orienting reference to Step 1905 (previously discussed). SOLO Executive Engine 820 proceeds from Step 1905 to Decision Step 2001 in which a general error status is queried for. If a general error was identified with respect to optimizer engine 822, the SOLO Executive Engine 820 proceeds to Step 1904 (previously discussed). If no general errors are present, the SOLO Executive Engine 820 proceeds to Decision Step 2002.

If no general errors are present in Decision Step 2001, the SOLO Executive Engine 820 proceeds to Decision Step 2002 in which a convergence status in the execution of the solution performed by optimizer engine 822 is queried for. If convergence is identified, the SOLO Executive Engine 820 proceeds to Step 2003. If convergence is identified, the SOLO Executive Engine 820 proceeds to Step 1904 (previously discussed).

If no convergence problems are present in Decision Step 2002, the SOLO Executive Engine 820 proceeds to Decision Step 2003 in which a singularity status in the execution of the solution performed by optimizer engine 822 is queried for. If singularity in the solution is not identified, the SOLO Executive Engine 820 proceeds to Step 2004. If singularity in the solution is identified, the SOLO Executive Engine 820 will proceed to Step 1904 (previously discussed).

Step 2004 is a general proceed step which references continuation by the SOLO Executive Engine 820 from a plausibility step to the following step with respect in FIG. 9. In this regard, Step 2004 can reference one of the following three general continuations and transitions: Reconciliation Data Plausibility Decision Step 904 to Detailed Parameter Model Solution Step 905; Parameter Data Plausibility Decision Step 906 to Economic Setpoints Model Solution Step 907; and Setpoint Acceptability Decision Step 909 to Setpoint Output Operation Step 910.

Turning now to a further discussion of the method used to optimize the operation of manufacturing system 70 through the use of Process Control Computer 71, Communication Interface 72, and optimizing system 73, the computation of profit in SOLO Executive Engine 820 to output a value to actual profit subfunction 818 executes to establish three scenarios regarding the real-time profitability (economic efficiency) in the operation of manufacturing system 70. Each scenario will be referenced by a profit meter type, one as the "rigorous profit meter", a second as the "modulated profit meter", and a third as the "instantaneous profit meter". As the discussion of the different profit meters will indicate, each represents a tradeoff respecting verity, wherein one aspect of verity is established by recency and the other aspect of verity by the degree to which various measurements are validated as having a fundamental harmony with respect to mass, energy, and momentum balances.

The concept of profitability is interpreted within a cultural and regulatory context; profitability may be computed in a first way for purposes of tax reporting, in a second way for purposes of accountability to investors, and in yet a third way for purposes of evaluating local efficiency of operation. Examples of factors promoting a difference in the definition of profit are that (1) issues of pricing with respect to either products of manufacturing system 70 or raw materials consumed by manufacturing system 70 is manifested within the context of "first in first out (FIFO)" vs. "last in first out (LIFO)" inventory valuation, and (2) issues respecting an appropriate charge for capital need to resolve an appropriate scenario to characterize depreciation as either "straight line", "double declining balance", or the like. Another example of a modifier with respect to profit definition is the ongoing change in an exchange rate with respect to a any two different currencies. The concept of using a model and a system to compute real-time profitability (economic efficiency) must first address issues with respect to such contextual considerations so that the bases for the output of the system are well understood by those benefiting from the use of the system.

Although the methods which are executed to depict the profitability related to manufacturing system 70 in real-time can incorporate estimates of fixed costs, taxes, and a charge for capital, it will be appreciated that a broadly useful real-time component of profitability (economic efficiency) will be designated herein as the variable manufacturing margin. The variable manufacturing margin is an incremental value within a time context insofar as it is characterizes profitability over a defined real-time execution period set (which can be either one real-time period used in the process control system or, alternatively, a defined plurality of the real-time period used in the process control system). In this regard, in an idealized context, an ongoing summation of the incremental variable manufacturing margin values can be accumulated (essentially integrated if the real-time time period is sufficiently granular) to generate a value which ideally will be equivalent to a traditionally computed variable manufacturing cost generated by adding costs at standard to manufacturing variance. It should also be apparent that the variable manufacturing margin as described herein is a real-time variable. This variable manufacturing margin is determined by, first, multiplying (or, alternatively, the term "convoluting" is also appropriate) the flow rate of each product stream in the system by the value of that stream to estimate the real-time revenue (or potential revenue) generated by the system; second, using a similar determination of the real-time resource costs for raw materials, energy, and (perhaps) labor being used by the system; and, third, subtracting the real-time resource costs from the real-time revenue. However, the determination of flow rates respecting said products and resources within manufacturing system 70 can induce uncertainty with respect to the verity of the determination of the variable manufacturing margin. The present invention therefore presents three perspectives (profit meter subtypes) respecting the verity of the variable manufacturing margin as it is determined by the computer implemented interactive profit estimation logic in the present invention in conjunction with recent data regarding the real-time monetary value of at least one fluctuating economic variable.

The "instantaneous profit meter" emphasizes the use of most recent data and uses the most recent data acquired by PCC Write Engine 826 in Data Common 821 for flows of products and resources in determining the variable manufacturing margin via a straightforward computation without any attempt to validate the data via a reconciliation process or to remove noise effects. The aspect of verity related to the degree to which various measurements are validated as having a fundamental harmony with respect to mass, energy, and momentum balances is essentially ignored in this profit meter.

The logic related to the "modulated profit meter" is derived from a presumption that an average of real-time data is useful in conveniently smoothing sets of said real-time data into relatively reliable inputs to the computation of variable manufacturing margin. In this regard, averaged real-time data values generated by a data smoothing process on real-time input data, such as the averaging techniques hereinafter described, usually will not demonstrate short term effects of noise in the input signals, and will, therefore, enable a more stable indicator of variable manufacturing margin than that of the more noise sensitive "instantaneous profit meter".

One example of a such a smoothing process averaging technique is now described for the case of one measurement used as part of the computation of the variable manufacturing margin. Input data values from the measurement are essentially integrated over an overall period of time and the averaged value for that input data is computed by dividing the resultant of the integration by the overall period of time. Integration is essentially facilitated in real-time by reading the data value at a periodic time interval and using the assumption that the data value was constant during the time period of the periodic time interval prior to the reading; this permits a close approximation to integration by the use of a summation of relatively high incremental granularity. The overall time period used in the essential integration of the present invention is computed in one of two ways. A first method of overall time period determination uses a constant overall time period for determination of the smoothed values. In executing this first method, the influence of the oldest data value is essentially discarded from the integration each time a new data value is acquired. An alternative second method of overall time period determination uses a variable overall time period for determination of the smoothed values. In this second method, the denominator and integral period are periodically rebased to one increment of overall time and the integrator essentially discards all effects of previously acquired input data. In the implementation of the alternative second method, the rebasing operation can occur at fixed overall time intervals or, alternatively, in response to a status value computed within optimizing system 73. In either the constant overall time period alternative or the variable overall time period alternative, a representative overall time period or, respectively, overall time period maximum must be selected for appropriateness to the manufacturing system 70 being monitored. The integration is based on data acquired by PCC Write Engine 826 in Data Common 821 for flows of products and resources in determining the variable manufacturing margin. Alternatively, relatively recent data is acquired from Historical Cache 824 via historical engine 825. Note that the execution of averaging procedures in the smoothing process (in the logic related to the "modulated profit meter" ) is not usually subject to a requirement for a Yes conclusion respecting steady state in a step similar to the Steady State Decision Step 902 in this case. Because of the smoothed nature of the averaged data, the verity ascribed to the "modulated profit meter" usually will represent a more essential harmony with respect to mass, energy, and momentum balances than that ascribed to the "instantaneous profit meter" ; even though the verity with respect to recency of data usually will be somewhat less in the "modulated profit meter" than in the "instantaneous profit meter".

The "rigorous profit meter" emphasizes the fundamental harmony with respect to mass, energy, and momentum balances in the data and uses the most recent data from Reconcile Reduced Model Operation Step 903 in Data Common 821 for flows of products and resources in determining the variable manufacturing margin. Alternatively, relatively recent data is acquired from Historical Cache 824 via historical engine 825. However, in either alternative, the flows of products and resources are first subject to a requirement for a Yes conclusion to the Steady State Decision Step 902 before being reconciled according to the Reconcile Reduced Model Operation Step 903 prior to use in the computation of the variable manufacturing margin. Therefore, the verity ascribed to the "rigorous profit meter" represents a more rigorous fundamental harmony with respect to mass, energy, and momentum balances than that ascribed to either the "instantaneous profit meter" or the "modulated profit meter" ; even though the verity with respect to recency of data will usually be somewhat less than both the "modulated profit meter" or the "instantaneous profit meter". There are two reasons for this compromise in recency of data. The first reason is that a set of data will not be available at those times when a Yes conclusion to the Steady State Decision Step 902 has not been generated. The second reason is that there is a time needed by optimizing system 73 to execute the associated logic with respect to Reconcile Reduced Model Operation Step 903 (when a Yes conclusion to the Steady State Decision Step 902 has been generated) in determining the reconciled data set for use by the "rigorous profit meter"; this time will usually be greater than the time needed to execute the logic used by either the "modulated profit meter" or the "instantaneous profit meter". Additionally and alternatively, in certain "batch plant" situations (within the context of the classic alternatives of plug flow, batch, and continuous backmix systems) a moving average of some input signals can be reconciled if accumulations of momentum,mass, and energy are not otherwise factored into the steady state operation status decision.

The three profit meters, therefore, establish three perspectives on verity respecting the real-time essence of the variable manufacturing margin. The "instantaneous profit meter" places strong emphasis on that aspect of verity respecting data recency while essentially ignoring the verity aspect respecting fundamental harmony with respect to mass, energy, and momentum balances. The "rigorous profit meter" places strong emphasis on that aspect of verity respecting fundamental harmony with respect to mass, energy, and momentum balances while minimizing focus on the data recency verity aspect. And the "modulated profit meter" represents an interim position with respect to both aspects of verity. All three methods of determining actual profit execute in the SOLO Executive Engine 820 and the resultant values are used in the Economic Setpoints Solution Model Step 907. The resultant values can also be acquired by the actual profit subfunction 818 for output to computer monitor 74 as previously discussed. Output to human operator 78 on the computer monitor 74 is facilitated by a display means and is infologically facilitated via an alphanumeric indicator or a symbol such as a bar chart, a dial with a rotating pointer, or the like. Alternatively, the actual profit subfunction 818 can do further comparisons respecting the determination of the variable manufacturing margin by the three different methods to generate and output indicators and symbols respecting harmony or disharmony between the separate determinations of the real-time variable manufacturing margin.

The output respecting the variable manufacturing margin from the theoretical profit subfunction 819 (previously discussed) is depicted on computer monitor 74 with the "instantaneous profit meter", "modulated profit meter", and "rigorous profit meter" outputs respecting the variable manufacturing margin from actual profit subfunction 818 to generate a comprehensive perspective regarding the status of the operation of manufacturing system 70. Furthermore, a graphical depiction of historical values generated by the "instantaneous profit meter", "modulated profit meter", and "rigorous profit meter" can also be depicted; in this regard, actual profit subfunction 818 reads historical data from Historical Cache 824 via historical engine 825 as shown in FIG. 8A.

Figure 25:
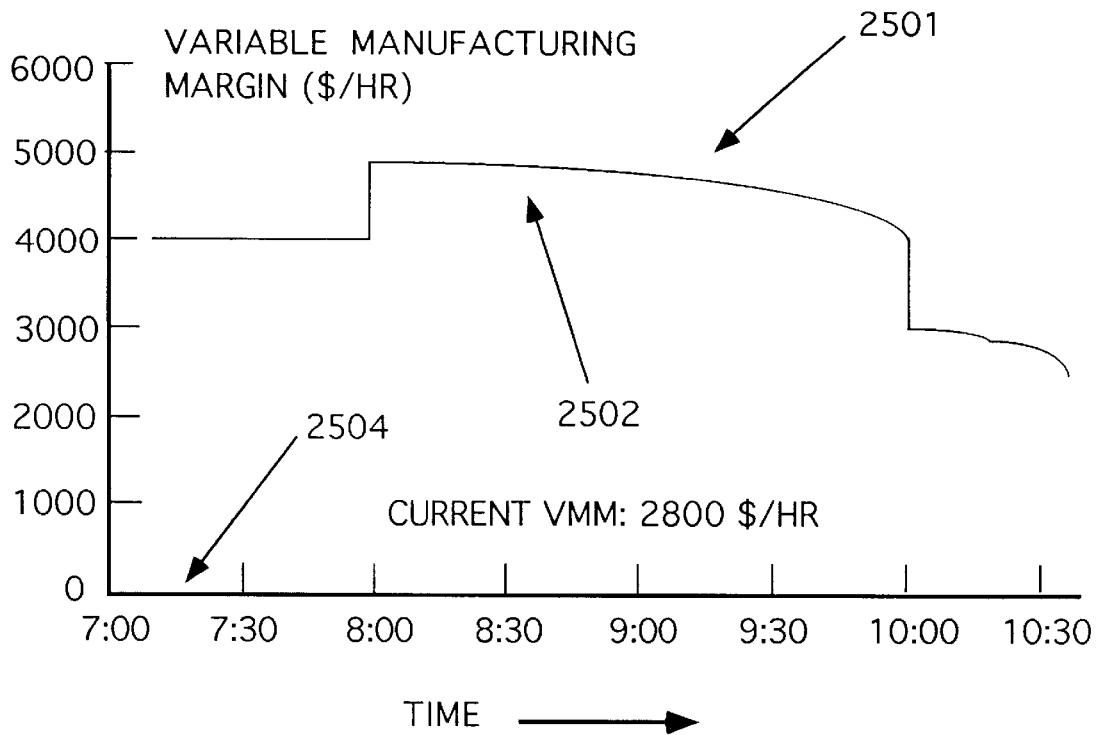
FIG. 25 shows an example of a diagnostic display related to the profit meter functionality.

The logic of the computation of profit in SOLO Executive Engine 820 (which outputs a value to actual profit subfunction 818) alternatively further executes to identify significant real-time changes in at least one of the variable manufacturing margin values related to the profit meters. Furthermore, the logic of the computation of profit in SOLO Executive Engine 820 also identifies associated real-time changes, in response to a status of an identified significant real-time change respecting at least one of the variable manufacturing margin values related to the profit meters, in at least one of the input values related to the variable manufacturing margin values. Furthermore, in the case of two or more input values related to the variable manufacturing margin values, the logic of the computation of profit in SOLO Executive Engine 820 also executes to rank order the input values by the amount or degree of their respective changes. In this regard, the logic respectively utilizes a criteria factor based upon a band of acceptable deviation in either (1) the variable manufacturing margin values related to the profit meters or (2) the input values related to the variable manufacturing margin values to define a basis for a significance status value indicating significant change. A set of at least one such significance status value is then output by the system of the present invention as information related to the significance of change in the variable manufacturing margin. In one alternative, such information is output as a set of associated quantitative detail which is rank-ordered by the quantitiative magnitude of significance status values, according to pre-defined criteria respecting the impact on profit. This rank ordered set of associated data is depicted on computer monitor 74 (in one embodiment, with the "instantaneous profit meter", "modulated profit meter", and "rigorous profit meter" outputs) via actual profit subfunction 818 to generate a comprehensive perspective regarding the status of the operation of manufacturing system 70. In one embodiment, each set of information related to a particular significance status value is further associated with a message label 2503, to facilitate rapid understanding by the human operator 78 of the relevance of the set of information. In this manner, the present invention enables a diagnostic functionality directed toward identification of issues related to operational variable manufacturing margin of a manufacturing process 70. One example of a diagnostics display 2501 from computer monitor 74 is shown in FIG. 25. The upper part of FIG. 25 depicts a historical variable manufacturing margin plot 2502 plotted within the context of a Cartesian co-ordinate axis 2504 related to time and the quantitative magnitude of the variable manufacturing margin. The lower part of FIG. 25 shows examples of individual instances of message label 2503 related to the most significant status value calculated at particular historical reference times. In the first three individual instances of message label 2503 shown in FIG. 25, actual data related to input values is also incorporated into appropriate fields of message label 2503.

An overview of some of the relationships discussed in the foregoing paragraphs is presented in FIG. 21 which shows physical and logical elements (first introduced in FIGS. 7 and 8A) of the present invention in a relatively virtual context to help show the method and general interaction of entities 2108 related to the "profit meter" functionality. It should also be noted that a number of the auxiliary functions are not shown (and are presumed to be apparent given other material presented in this disclosure) so that essential virtual relationships between the various entities is demonstrated in a straightforward manner. An example in this regard is the vector 2108 which is a transparent indicator for essentially all logical and physical components in Human Interface Engine 813 and Computer Monitor 74. The LOGIC 2101 to execute the method related to the "instantaneous profit meter" outputs information which is depicted on profit meter screen display 2105 (which would appear on computer monitor 74) as real time "instantaneous profit meter" output symbol 2106a and as a point on the historical value functional curve of the "instantaneous profit meter" historical graphical symbol 2107a, both of which are positioned over the INST indicator on profit meter screen display 2105. The LOGIC 2102 to execute the method related to the "modulated profit meter" outputs information which is depicted on profit meter screen display 2105 (which would appear on computer monitor 74) as real time "modulated profit meter" output symbol 2106b and as a point on the historical value functional curve of the "modulated profit meter" historical graphical symbol 2107b, both of which are positioned over the MODUL indicator on profit meter screen display 2105. The LOGIC 2103 to execute the method related to the "rigorous profit meter" outputs information which is depicted on profit meter screen display 2105 (which would appear on computer monitor 74) as real time "rigorous profit meter" output symbol 2106c and as a point on the historical value functional curve of the "rigorous profit meter" historical graphical symbol 2107c, both of which are positioned over the RIGOR indicator on profit meter screen display 2105. The LOGIC 2104 to execute the method related to the theoretical profit outputs information which will be depicted on profit meter screen display 2105 (which would appear on computer monitor 74) as real time "theoretical profit meter" output symbol 2106d and as a point on the historical value functional curve of the "rigorous profit meter" historical graphical symbol 2107d, both of which are positioned over the THEOR indicator on profit meter screen display 2105. The historical value functional curves on historical graphical symbols 2107a–2107d are plotted on Cartesian coordinates within the context of an x-axis having a value of historical time and a y-axis having a value related to the particular economic measure relevant to the operation (examples, without limitation, of which are Dollars or Guilders or Deutschmarks). It should also be noted that the SOLO Executive Engine 820 could pass data as indicated in FIG. 21 or, alternatively, via the Historical Engine 825 as indicated in FIG. 8A. The LOGIC 2102–2105 to establish output data for the "instantaneous profit meter", "modulated profit meter", and "rigorous profit meter" could also alternatively be executed within SOLO Executive Engine 820 or actual profit subfunction 818 without departing from the spirit or methodology of the present invention; it should be apparent that linkages to Data Common 821 and other necessary functions could be readily facilitated in this regard. In a similar manner, the LOGIC 2104 to establish output data for the "theoretical profit meter" could also, alternatively, be executed within SOLO Executive Engine 820 or theoretical profit subfunction 819 without departing from the spirit or methodology of the present invention; it should be apparent that linkages to Data Common 821 and other necessary functions could be readily facilitated in this regard. Prices (Monetary Values 77) for the various resources and products are obtained via Monetary Value Interface Engine 812 as discussed with respect to FIGS. 8A and 8B.

FIG. 22 presents a further contemplated use of the profit meter related functionality in the present invention. An example of the use of the present invention to characterize the real-time profitability status of an entire manufacturing division is presented to show a cascaded set of profit meters which depict the profitability of a division at different key levels of supervisory granularity to help enable efficient operation of the division.

In FIG. 22, different instances of a simplified profit meter screen display 2105 (presented with respect to FIG. 21) are presented in a miniaturized symbolic context as process profit meter screen displays 2201a–e, plant profit meter screen displays 2202a–b, and division level profit meter screen display 2203 to show an overview 2209 of the use of the "profit meter" in a large manufacturing facility (or "manufacturing division"). Each of the individual instances of process profit meter screen displays 2201a–e, plant profit meter screen displays 2202a–b, and division level profit meter screen display 2203 also show only three instances of a simplified and miniaturized output symbol 2106a–d and historical value functional curve 2107a–d. All other support logical and physical components which enable the generation of process profit meter screen displays 2201a–e, plant profit meter screen displays 2202a–b, and division level profit meter screen display 2203 are not shown but should be apparent given the discussion of the present invention in the specification. Process profit meter screen displays 2201a and process profit meter screen displays 2201b are each associated with two separate instances of manufacturing system 70 which operate in a loosely coordinated manner under the direction of a first supervisory group. The set of equipment, personnel, and material under the direction of the first supervisory group is contained within the first manufacturing process 2204. Process profit meter screen displays 2201c and process profit meter screen displays 2201d are each associated with additional separate instances of manufacturing system 70 which operate in a loosely coordinated manner under the direction of a second supervisory group. The set of equipment, personnel, and material under the direction of the second supervisory group is contained within the second manufacturing process 2205. Process profit meter screen display 2201e is associated with an additional separate instance of manufacturing system 70 which operates under the direction of a third supervisory group. The set of equipment, personnel, and material under the direction of the third supervisory group is contained within the third manufacturing process 2206.

In the example of FIG. 22, the first manufacturing process 2204 and the second manufacturing process 2205 are further coordinated under the direction of a plant management group. The set of equipment, personnel, and material under the direction of the plant management group is contained in manufacturing plant 2207. Note that the set of equipment, personnel, and material under the direction of the plant management group (contained in manufacturing plant 2207) comprises the set of equipment, personnel, and material under the direction of the first supervisory group (which is contained within the first manufacturing process 2204) and, also, the set of equipment, personnel, and material under the direction of the second supervisory group (which is contained within the second manufacturing process 2205). In the example, plant profit meter screen display 2202a, therefore, summarizes the information contained in both process profit meter screen display 2201a and process profit meter screen display 2201b into a more general indicator of profitability for the first manufacturing process 2204 and the second manufacturing process 2205, respectively. This summary depiction of profitability is therefore directed at the needs of the plant management group.

In the example of FIG. 22, the manufacturing plant 2207 and the third manufacturing process 2206 are further coordinated under the direction of a division management group; the set of equipment, personnel, and material under the direction of the division management group is contained in division 2208. Note that the set of equipment, personnel, and material under the direction of the division management group (contained in division 2208) comprises all of the equipment, personnel, and material under the direction of the plant management group (which is contained within the manufacturing plant 2207); it also includes the set of equipment, personnel, and material under the direction of the third supervisory group (which is contained within the third manufacturing process 2206). Note that the third manufacturing process 2206 is also treated organizationally as having the reporting status of a plant. In the example, plant profit meter screen display 2203, therefore, summarizes the information contained in all process profit meter screen displays 2201a–e, and plant profit meter screen displays 2202a–b into a general division-wide profit meter screen display 2203. This more summary depiction of profitability is therefore directed at the needs of the division management group. It is readily appreciated that a large facility, such as a substantial petrochemical facility, would have a large set of such pyramided profit meters to characterize the overall operation of the manufacturing division at various levels of granularity.

Note that instantaneous profit meter" output symbol 2106a, "modulated profit meter" output symbol 2106b, "modulated profit meter" historical graphical symbol 2107b, "rigorous profit meter" output symbol 2106c, and "rigorous profit meter" historical graphical symbol 2107d are all examples of graphical information tokens that symbolically depict the status of data in such a way as to enable a human to readily interpret data into information in a meaningful context with respect to proportion, context, and time, while enabling efficient use of the available communication medium.

FIG. 23 presents illustrative output 2305 in a statistical context relevant to the status regarding predictability of a simulation model used with manufacturing system 70 in its operation over a period of time. FIG. 23 helps to illustrate another functionality enabled by the present invention—the evaluation of the usefulness of simulation models. In this regard, a simulation model is used in conjunction with the present invention as part of the estimation of parameters. Alternatively, other simulation models (which may not necessarily be critical to the estimating of parameters for a particular embodiment of the present invention to define setpoints) are evaluated in preparation for other uses. An overview of this method begins with the collection of a set of comparative data in the following manner: (1) a first set of input signals is separated into simulation model input signals and at least one measured attribute value, and the simulation model input signals are then used to generate a reconciled input signal set after the manufacturing system 70 has been characterized as in a status of steady state. (2) The reconciled input signal set is used in a simulation model to estimate and predict the value of at least one simulated attribute of the manufacturing system 70 (designated as the simulated attribute value). (3) The attribute being simulated in manufacturing system 70 is also measured directly as an input signal at the same time the first set of input signals is then addressed (designated as the associated measured attribute value), and the simulated attribute value and its time-aligned associated measured attribute value are retained as a model status data pair. (4) Over a period of time (at selected intervals), a group of model status data pairs at different operating conditions are acquired to form the set of comparative data; in this regard, the selection of key attributes which are expected to display some variation with different modes of operation respecting manufacturing system 70 is useful in identifying the degree of sophistication with which the model predicts (although the method will operate properly with any degree of variation). (5) After the set of comparative data has been collected, the simulated attribute values and their time-aligned associated measured attribute values are evaluated, in one embodiment, within the context of a linear regression and correlation model to generate derived statistical indicators based upon the presumption that the simulated attribute values and their time-aligned associated measured attribute values will ideally be equal (that is, in a general equation $Y = aX + b$, that $b = 0$, and that a=1). Without prejudice to the scope of derived statistical indicators, examples of the derived statistical indicators include the set of relevant confidence intervals at different levels of confidence, the set of relevant prediction intervals at different levels of confidence, and coefficients of determination. (6) The derived statistical indicators are then compared with predetermined target values for these indicators to establish the status of acceptability concerning the relevant simulation model which is communicated to a human or further used as a status indicator in the execution of the optimizing system 73 in a manner which should be apparent given the information presented in this specification. In the above case, Y is the simulated attribute value and X is the associated measured attribute value also discussed and defined with respect to steady state determination in another part of this specification. FIG. 23 demonstrates individual model status data pairs 2301 plotted on Cartesian coordinates wherein the X axis identifies the directly measured attribute value and the Y axis identifies the attribute as contained in the reconciled input signal set after the manufacturing system 70 has been characterized as in a status of steady state (note that X and Y are both representative of the attribute at the same moment in real-time). The fitted model line 2302 depicts the ideal relationship wherein Y=aX+b, and b =0, and a=1. A relevant confidence interval 2303 is then derived from the statistical relationship of the set of all individual model status data pairs 2301 as they relate to the fitted model line 2302. A relevant prediction interval 2304 is further derived from the statistical relationship of the set of all individual model status data pairs 2301 as they relate to the fitted model line 2302. Both the confidence interval 2303 and prediction interval 2304 comprise derived statistical indicators which are further compared, either visually or automatically, with predetermined target values to establish the status of acceptability concerning the relevant simulation model. Alternatively, a plot such as is shown in FIG. 23 is generated as a printout or an image on computer monitor 74 for pattern fit consideration by a human 78. As the simulation model is further modified to more accurately depict the status and probable operation of manufacturing system 70, a comparison of resultant comparative plots similar to that shown in FIG. 23 with the plots generated prior to the modification can help to demonstrate the improvement afforded by the modification to the simulation.

Another scope of functionality afforded by the present invention is the incorporation of simulated and derived forecast and actual meteorological information and measurements as status values into the set of inputs processed by optimizing system 73 to generate manipulated parameters to manufacturing system 70 and informational output via computer monitor 74. In this regard, optimizing system 73 provides a means for accommodating the operation of a manufacturing system 70 to the reality of the environment in which it executes; these realities include both fluctuating market forces and meteorological attributes. Usually, manufacturing system 70 has very little direct or indirect effect on these outside forces, and the task of optimizing system 73 is to enable the optimal operation of manufacturing system 70 given the reality of an ever changing financial and meteorological environment. Although certain meteorological attributes are acquired as input signals, other meteorological attributes of concern are derived from a simulation or forecast respecting expected meteorological attributes; in this regard, storms, fronts and seasonal fluctuations which may be approaching the demographic location of manufacturing system 70, and (especially in the case of solar powered entities) cloud cover can have an impact on the optimal set of manipulated parameters used in the control of manufacturing system 70. The large chemical and petrochemical facilities which were the initial focus of applicable use of the present invention usually are not contained within protective structures, but are constructed in a manner to be generally exposed to the weather; the massive size of these facilities also is associated with substantial exposure of heat transfer area to the meteorological elements. As an example of this issue, many power generation systems, especially gas turbines, use large quantities of air where fluctuation in temperature can significantly impact the efficiency of the system. Another example of the impact of the meterological status on the operation of a gas turbine is related to the presence of undesirable dust which needs to be filtered from air prior to the use of the air in the compressor; the amount of dust can be significantly impacted by wind velocity and direction; the level of impurities due to smog can also impact the optimal operational attributes of a gas turbine when such a system is comprised within manufacturing system 70. In such a situation, given the case of a forecast relating to either smog or high winds, the optimal operation of a facility might require that a number of systems be slowly throttled down to a lower manufacturing rate and a number of hours prior to the arrival of the undesirable weather to (1) prepare and configure for optimal operation at a lower rate of throughput and (2) minimize the effects of feedback instability related to a sudden step change in a key attribute of the larger manufacturing facility (frequently a plurality or set of inter-related manufacturing systems 70). The massive size of these facilities can further be associated with very long internal time constants for modification of operating conditions and attributes; it therefore is useful for expected weather conditions to be input as a feedforward consideration to logical optimizing routines used in the operation of manufacturing system 70 so that manufacturing system 70 is "ready" and optimized for the weather when it arrives.

With respect to FIGS. 8A and 8B, forecast meteorological information (at least one fluctuating meteorological variable) is acquired in a similar manner to the acquisition of monetary values 77 from an outside system and through the use of an interface engine such as monetary value interface engine 812. Alternatively, forecast meteorological information is acquired as specialized subpart of monetary values 77 through the use of a specialized subpart of monetary value interface engine 812. Alternatively, forecast meteorological information is simulated as specialized subpart of optimizing system 73 in response to measured input signals such as analog inputs 707 and digital inputs 708 from meteorologically oriented field instrumentation within manufacturing system 70. The general method of performing such simulations should be apparent given the benefit of other information in this specification.

Figure 24:
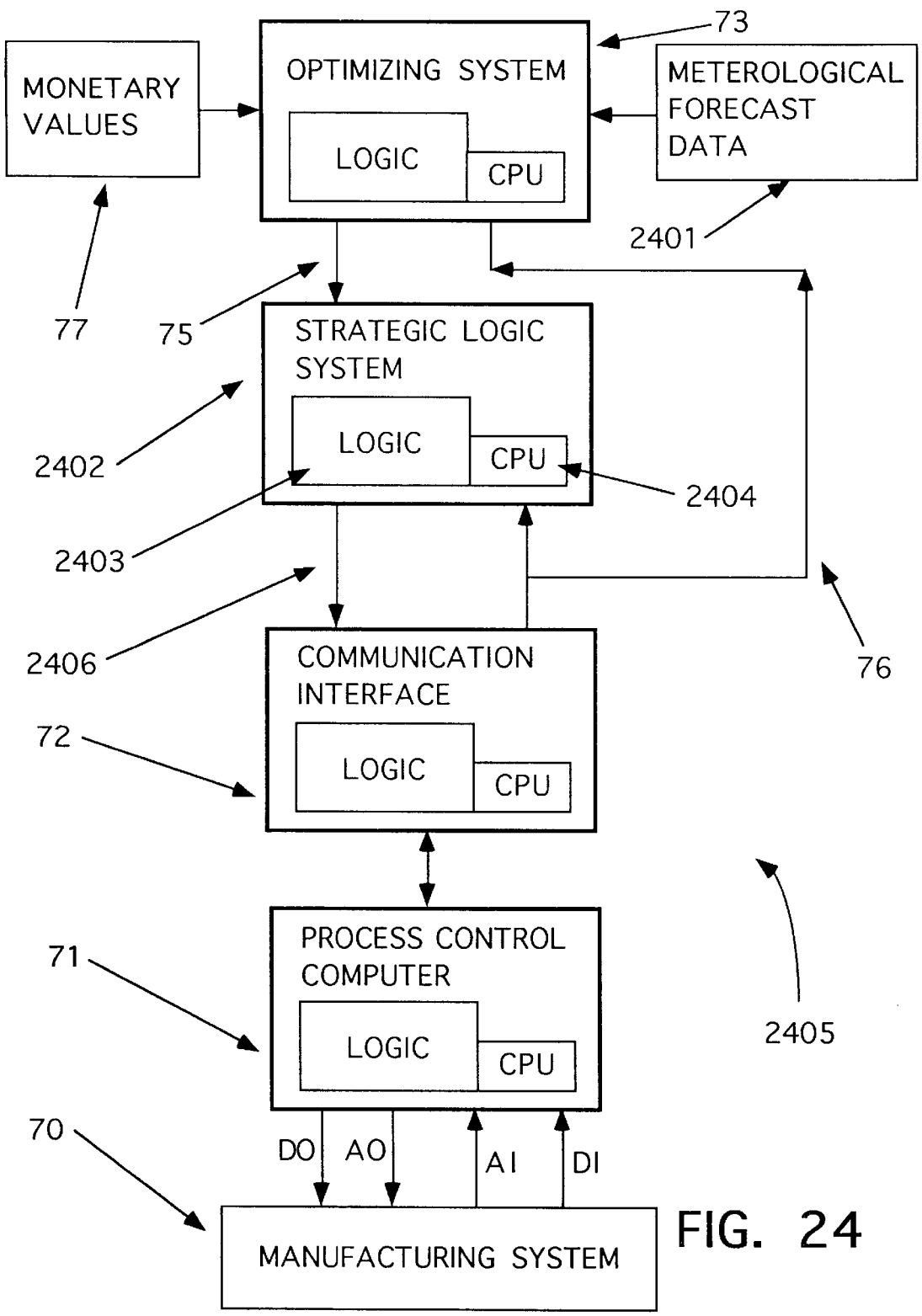
FIG. 24 shows the further acquisition of meteorological data in the present invention in a comprehensive configuration of a process control environment interacting with both a changing financial environment and a changing meteorological environment while implementing control of a manufacturing system.

FIG. 24 shows the further acquisition of meteorological data in the present invention in a comprehensive configuration of a process control environment 2405 designed to facilitate real time interaction with both a changing financial environment and a changing meteorological environment while implementing control of a manufacturing system 70. FIG. 24 presents certain elements first introduced in FIG. 7 while further depicting a source for meteorological information in Meteorological Forecast Data 2401. Meteorological Forecast Data 2401 is incorporated into the LOGIC 706 of Optimizing System 73 in real time in a similar manner to the acquisition of monetary values 77 from an outside system and through the use of an interface engine similar to monetary value interface engine 812, as previously discussed. In deriving plurality of process parameters responsive to the reconciled input signal set, the meteorological value of at least one of the fluctuating meteorological variables is used, then, as an input to facilitate weather related sensitivity of the Optimizing System 73.

The use of Strategic Logic System 2402 is also indicated; in this regard, one embodiment respecting use of the present invention alternatively includes the use of a system focused upon the selection of the best control approach given a multiplicity of alternatives. An example of Strategic Logic System 2402 is a predictive multivariable controller (such as a dynamic matrix type of controller or other such advanced control system) which is designed to evaluate a multiplicity of control approaches to select the most appropriate alternative in real-time. Strategic Logic System 2402 uses its associated CPU 2404 as a central processing unit which interacts with a memory storage area (not shown but which should be apparent) to execute LOGIC 2403 related to strategic control considerations. Read PCS Data Vector 76 from Communication Interface 72 is shown as providing data to both the Optimizing System 73 and the Strategic Logic System 2402. Write to PCS Data Vector 75 is shown providing data to, alternatively and collectively, Strategic Logic System 2402 and Optimizing System 73. Write SLS to PCS Data Vector 2406 is shown providing SLS data to Communication Interface 72 where the SLS data is generated by the execution of the logical processes of Strategic Logic System 2402.

Strategic Logic System 2402 also optionally incorporates and utilizes various display means, data storage means, and communication means to facilitate the useful operation and execution of these elements. In an alternative embodiment, CPU 701 within the Process Control Computer 71, CPU 704 within Communications Interface 72, and CPU 2404 within Strategic Logic System 2402 are combined into one logically identified virtual entity. In another alternative embodiment, CPU 705 within Optimizing System 73 and CPU 2404 within Strategic Logic System 2402 are combined into one logically identified virtual entity.

Alternative embodiments of the present invention also include optimized specialized subsections of the logic and functionality described herein. An example of such an alternative embodiment is a configuration of Optimizing System 73 primarily oriented and configured to profit meter functionality and whose Optimizing Reference Models and Schema 801 are generically structured in such as manner as to be broadly used over a large number of different processes to primarily provide profit meter functionality. In this regard the "modulated profit meter" and the "instantaneous profit meter" can be rapidly and conveniently deployed and used while the more complex information in Optimizing Reference Models and Schema 801 is developed to provide "rigorous profit meter" functionality. With time, the information in Optimizing Reference Models and Schema 801 can be continually improved to enable the full use of the functionality of the present invention.

The present invention has been described in an illustrative manner. In this regard, it is evident that those skilled in the art, once given the benefit of the foregoing disclosure, may now make modifications to the specific embodiments described herein without departing from the spirit of the present invention. Such modifications are to be considered within the scope of the present invention which is limited solely by the scope and spirit of the appended claims.

What is claimed is:

1. An apparatus having physical process equipment, said physical process equipment having sensors for creating sensor output signals indicative of process attributes in said physical process equipment as the apparatus handles at least one raw material, product, or resource in performing a useful function, each product, resource, and raw material having a respective affiliated economic variable whose quantity is defined by a monetary value, said apparatus comprising:

a computer monitor for producing a graphical display of variable manufacturing respective to said physical process equipment;

a real-time computer in communication with said sensor output signals and said computer monitor, said real-time computer further comprising means for reading said sensor output signals as input signals indicative of measured process attributes in said physical process equipment, means for periodically acquiring at least one said monetary value, means for defining a steady state status regarding said input signals, means, responsive to the steady state status, for generating a reconciled input signal set from said input signals, means for determining a first estimate of the variable manufacturing margin from said reconciled input signal set and at least one acquired monetary value, means for determining a second estimate of the variable manufacturing margin from said input signals and at least one acquired monetary value, means for executing a smoothing process on said input signals to determine a smoothed input signal set, means for determining a third estimate of the variable manufacturing margin from said smoothed input signal set and at least one acquired monetary value, means for generating and displaying, on the computer monitor, at least one first graphical information token correspondent to said first estimate of variable manufacturing margin, at least one second graphical information token correspondent to said second estimate of variable manufacturing margin, and at least one third graphical information token correspondent to said third estimate of variable manufacturing margin; and a real-time communication connection between said means for periodically acquiring at least one said monetary value and a market information computer having recent monetary values respective to said products, raw materials, and resources.

2. The apparatus according to claim 1, wherein said monetary value represents the market price of at least one said raw material, product, or resource.

3. The apparatus according to claim 2, wherein said means for generating a reconciled input signal set includes Lagrangian Multiplier means for deriving the reconciled input signal set and at least one associated Lagrangian Multiplier using the Method of Lagrangian Multipliers.

4. The apparatus according to claim 1, wherein said means for generating a reconciled input signal set includes Lagrangian Multiplier means for deriving the reconciled input signal set and at least one associated Lagrangian Multiplier using the Method of Lagrangian Multipliers.

5. The apparatus according to claim 1 wherein the means for defining a steady state status regarding said input signals further comprises noise influence determination means for said input signals and forcing function influence determination means for said input signals.

6. The method according to claim 1, wherein said real-time computer further comprises means for determining at least one significance status value related to said first estimate of the variable manufacturing margin and wherein said apparatus further comprises means for generating and displaying, on the computer monitor, at least one message label associated with said significance status value.

7. The apparatus according to claim 2 wherein the means for defining a steady state status regarding said input signals further comprises noise influence determination means for said input signals and forcing function influence determination means for said input signals.

8. The apparatus according to claim 7, wherein said means for generating a reconciled input signal set includes Lagrangian Multiplier means for deriving the reconciled input signal set and at least one associated Lagrangian Multiplier using the Method of Lagrangian Multipliers.

9. A profit display method for depicting the profitability of an operating apparatus having physical process equipment, said physical process equipment having sensors for creating sensor output signals indicative of process attributes in said physical process equipment as the apparatus handles at least one raw material, product, or resource in performing a useful function, each product, resource, and raw material having a respective affiliated economic variable whose quantity is defined by a monetary value, comprising the steps of:

providing a computer monitor for producing a graphical display of variable manufacturing margins respective to said physical process equipment;

providing a real-time computer in communication with said sensor output signals, said computer monitor and a market information computer having recent monetary values respective to said products and said raw materials and said resources;

reading into said real-time computer said sensor output signals as input signals indicative of measured process attributes in said physical process equipment;

acquiring into said real-time computer the monetary value of at least one said raw material, product, or resource from said market information computer;

determining in said real-time computer a first estimate, a second estimate, and a third estimate of said variable manufacturing margin;

generating, in said real-time computer, display output data for at least one first graphical information token correspondent to said first estimate of variable manufacturing margin, at least one second graphical information token correspondent to said second estimate of variable manufacturing margin, and at least one third graphical information token correspondent to said third estimate of variable manufacturing margin; and displaying, on the computer monitor, at least one said first graphical information token, at least one said second graphical information token, and at least one said third graphical information token respective to said display output data;

said step of determining said first, second, and third estimates of said variable manufacturing margin further comprising the steps of:

defining a steady state status regarding said input signals;

generating a reconciled input signal set from said input signals in response to the steady state status;

determining said first estimate of the variable manufacturing margin from said reconciled input signal set and said monetary values;

determining said second estimate of the variable manufacturing margin from said input signals and said monetary values;

executing a smoothing process on said input signals to determine a smoothed input signal set; and determining said third estimate of the variable manufacturing margin from said smoothed input signal set and said monetary values.

10. The method according to claim 9, wherein said monetary value represents the market price of at least one said raw material, product, or resource.

11. The method according to claim 10, wherein the step of generating a reconciled input signal set further comprises using the Method of Lagrangian Multipliers to further derive at least one associated Lagrangian Multiplier.

12. The method according to claim 10, wherein the step of defining the steady state status further comprises the steps of determining the influence of noise in said input signals and determining the influence of a forcing function in said input signals.

13. The method according to claim 12, wherein the step of generating a reconciled input signal set further comprises using the Method of Lagrangian Multipliers to further derive at least one associated Lagrangian Multiplier.

14. The method according to claim 9, wherein the step of generating a reconciled input signal set further comprises using the Method of Lagrangian Multipliers to further derive at least one associated Lagrangian Multiplier.

15. The method according to claim 9, wherein the step of defining the steady state status further comprises the steps of determining the influence of noise in said input signals and determining the influence of a forcing function in said input signals.

16. The method according to claim 9, wherein said profit display method further comprises the steps of:

determining at least one significance status value related to said first estimate of the variable manufacturing margin;

generating at least one message label associated with said significance status value; and displaying, on the computer monitor, said message label.

17. An apparatus having physical process equipment, said physical process equipment having sensors for creating sensor output signals indicative of process attributes in said physical process equipment as the apparatus handles at least one raw material, product, or resource in performing a useful function, each product, resource, and raw material having a respective affiliated economic variable whose quantity is defined by a monetary value, said apparatus comprising:

a computer monitor for producing a graphical display of variable manufacturing margins respective to said physical process equipment;

a real-time computer in communication with said sensor output signals and said computer monitor, said real-time computer further comprising means for reading said sensor output signals as input signals indicative of measured process attributes in said physical process equipment, means for periodically acquiring at least one said monetary value, means for defining a steady state status regarding said input signals, means, responsive to the steady state status, for generating a reconciled input signal set from said input signals, means for determining a first estimate of the variable manufacturing margin from said reconciled input signal set and at least one acquired monetary value, means for determining a second estimate of the variable manufacturing margin from said input signals and at least one acquired monetary value, and means for generating and displaying, on the computer monitor, at least one first graphical information token correspondent to said first estimate of variable manufacturing margin and at least one second graphical information token correspondent to said second estimate of variable manufacturing margin; and a real-time communication connection between said means for periodically acquiring at least one said monetary value and a market information computer having recent monetary values respective to said products, raw materials, and resources.

18. A profit display method for depicting the profitability of an operating apparatus having physical process equipment, said physical process equipment having sensors for creating sensor output signals indicative of process attributes in said physical process equipment as the apparatus handles at least one raw material, product, or resource in performing a useful function, each product, resource, and raw material having a respective affiliated economic variable whose quantity is defined by a monetary value, comprising the steps of:

providing a computer monitor for producing a graphical display of variable manufacturing respective to said physical process equipment;

providing a real-time computer in communication with said sensor output signals, said display system, and a market information computer having recent monetary values respective to said products and said raw materials and said resources;

reading into said real-time computer said sensor output signals as input signals indicative of measured process attributes in said physical process equipment;

acquiring into said real-time computer the monetary value of at least one said raw material, product, or resource from said market information computer;

determining in said real-time computer a first estimate, a second estimate, and a third estimate of said variable manufacturing margin;

generating, in said real-time computer, display output data for at least one first graphical information token correspondent to said first estimate of variable manufacturing margin, at least one second graphical information token correspondent to said second estimate of variable manufacturing margin, and at least one third graphical information token correspondent to said third estimate of variable manufacturing margin; and displaying, on the computer monitor, at least one said first graphical information token and at least one said second graphical information token respective to said display output data;

said step of determining said first and second estimates of said variable manufacturing margin further comprising the steps of:

defining a steady state status regarding said input signals;

generating a reconciled input signal set from said input signals in response to the steady state status;

determining said first estimate of the variable manufacturing margin from said reconciled input signal set and said monetary values; and determining said second estimate of the variable manufacturing margin from said input signals and said monetary values.

* * * * *